US012042724B2

(12) United States Patent
Kanaya

(10) Patent No.: US 12,042,724 B2
(45) Date of Patent: Jul. 23, 2024

(54) VIDEO MODIFICATION AND TRANSMISSION

(71) Applicant: GREE, Inc., Tokyo (JP)

(72) Inventor: Yosuke Kanaya, Tokyo (JP)

(73) Assignee: GREE, Inc., Tokyo (JP)

( * ) Notice: Subject to any disclaimer, the term of this patent is extended or adjusted under 35 U.S.C. 154(b) by 164 days.

(21) Appl. No.: 17/352,063

(22) Filed: Jun. 18, 2021

(65) Prior Publication Data

US 2021/0394054 A1 Dec. 23, 2021

(30) Foreign Application Priority Data

Jun. 23, 2020 (JP) ................................ 2020-108097
Jul. 17, 2020 (JP) ................................ 2020-122729

(51) Int. Cl.
*A63F 13/355* (2014.01)
*A63F 13/213* (2014.01)
(Continued)

(52) U.S. Cl.
CPC .......... *A63F 13/355* (2014.09); *A63F 13/213* (2014.09); *A63F 13/428* (2014.09);
(Continued)

(58) Field of Classification Search
CPC .... A63F 13/355; A63F 13/213; A63F 13/428; A63F 13/45; A63F 13/67; A63F 13/69;
(Continued)

(56) References Cited

U.S. PATENT DOCUMENTS 9,990,437 B2 6/2018 Onda et al.
10,242,538 B2 * 3/2019 Pierce ................. G07F 17/3276
(Continued)

FOREIGN PATENT DOCUMENTS

JP 2015-173990 A 10/2015
JP 2016-116638 A 6/2016
(Continued)

OTHER PUBLICATIONS

Lazy Tech TV, “Mirrativ: a Live Streaming App for Android”, https://www.youtube.com/watch?v=unxrSLtoT8U, Sep. 5, 2015. (Year: 2015).*
(Continued)

*Primary Examiner* — Michael A Cuff
(74) *Attorney, Agent, or Firm* — Klarquist Sparkman, LLP

(57) ABSTRACT

Methods and apparatus are disclosed for video transmission. According to one example, computer-readable instructions, cause a computer to: generate motion data; distribute, toward terminal devices of a plurality of viewers via a communication line, the motion data; receive a webpage; receive operation data from a user interface; generate a second video related to a computer-implemented game on the basis of the operation data by using the received web page; distribute the second video toward the terminal devices of the plurality of viewers via the communication line; receive at least one of distribution related data; extract a selected game object out of a plurality of game objects to be used in the game; calculate a control parameter related to the selected game object on the basis of the distribution related data; generate the second video including the selected game object; and distribute the second video toward the terminal devices of the plurality of viewers.

19 Claims, 15 Drawing Sheets

(51) Int. Cl.

| | |
|---|---|
| ***A63F 13/428*** | (2014.01) |
| ***A63F 13/45*** | (2014.01) |
| ***A63F 13/67*** | (2014.01) |
| ***A63F 13/69*** | (2014.01) |
| ***A63F 13/87*** | (2014.01) |
| ***A63F 13/92*** | (2014.01) |

(52) U.S. Cl.
CPC .............. *A63F 13/45* (2014.09); *A63F 13/67* (2014.09); *A63F 13/69* (2014.09); *A63F 13/87* (2014.09); *A63F 13/92* (2014.09); *A63F 2300/5553* (2013.01); *A63F 2300/638* (2013.01)

(58) Field of Classification Search
CPC .......... A63F 13/87; A63F 13/92; A63F 13/35; A63F 13/46; A63F 13/86; A63F 2300/5553; A63F 2300/638
USPC ............................................................ 463/42
See application file for complete search history.

(56) References Cited

U.S. PATENT DOCUMENTS

| | | | | |
|---|---|---|---|---|
| 10,345,897 | B2 | 7/2019 | Verfaillie et al. | |
| 10,376,795 | B2 | 8/2019 | Garg et al. | |
| 10,390,064 | B2 | 8/2019 | Dury et al. | |
| 10,463,968 | B1 * | 11/2019 | Patenge | A63F 13/798 |
| 10,484,439 | B2 | 11/2019 | Oates, III | |
| 10,632,372 | B2 | 4/2020 | Gilmore et al. | |
| 10,905,953 | B2 | 2/2021 | Kim et al. | |
| 11,071,919 | B2 | 7/2021 | Willette et al. | |
| 11,633,669 | B2 * | 4/2023 | Kanaya | A63F 13/428<br>463/42 |
| 11,636,735 | B2 * | 4/2023 | Thomas | G07F 17/34<br>463/20 |
| 2017/0001122 | A1 | 1/2017 | Leung et al. | |
| 2017/0106290 | A1 * | 4/2017 | Pierce | A63F 13/798 |
| 2019/0009178 | A1 | 1/2019 | Nakagawa et al. | |
| 2019/0094981 | A1 * | 3/2019 | Bradski | H04N 21/414 |
| 2019/0349625 | A1 | 11/2019 | Watanabe et al. | |
| 2020/0070056 | A1 * | 3/2020 | Laker | A63F 13/47 |
| 2020/0402349 | A1 * | 12/2020 | Karrbrink | G07F 17/3258 |
| 2021/0121778 | A1 | 4/2021 | Kim et al. | |
| 2021/0394052 | A1 * | 12/2021 | Kanaya | A63F 13/213 |
| 2021/0394053 | A1 * | 12/2021 | Kanaya | A63F 13/213 |

FOREIGN PATENT DOCUMENTS

| | | | | |
|---|---|---|---|---|
| JP | 2016-189802 | A | 11/2016 | |
| JP | 2017-164140 | A | 9/2017 | |
| JP | 2017-188833 | A | 10/2017 | |
| JP | 2018-005320 | A | 1/2018 | |
| JP | 2018-073217 | A | 5/2018 | |
| JP | 2018-520772 | A | 8/2018 | |
| JP | 6382468 | B1 | 8/2018 | |
| JP | 2019-195536 | A | 11/2019 | |
| JP | 2020-044136 | A | 3/2020 | |
| JP | 2020-054505 | A | 4/2020 | |
| WO | WO-2018003174 | A1 * | 1/2018 | A63F 13/35 |

OTHER PUBLICATIONS

Decision of Refusal issued in JP 2020-108097, dated Mar. 23, 2021, with English Machine Translation, 8 pages.

Mirrativ, Inc., "Game distribution & game commentary & game recording," downloaded from https://apps.apple.com/jp/app/mirrativ-ミラティブ スマホでかんたんゲーム配信/id1028944599, 7 pp., Nov. 10, 2020, with English translation.

Office Action issued in JP 2020-108097, dated Dec. 22, 2020, with English Machine Translation, 10 pages.

Office Action issued in JP 2020-122729, dated Dec. 22, 2020, with English Machine Translation, 11 pages.

Office Action issued in JP 2020-122729, dated May 11, 2021, with English Machine Translation, 8 pages.

Japanese Language Web Page downloaded from https://gamepedia.jp/archives/19134, with partial English translation, document not dated, 13 pages.

Japanese Language Web Page downloaded from https://www.gamer.ne.jp/news/201902150034/, with partial English translation, document not dated, 10 pages.

Japanese Language Web Page downloaded from https://web.archive.org/web/20190321123936/https://www.applibot.co.jp/news/20181207150042/, with partial English translation, document not dated, 8 pages.

Japanese Language Web Page downloaded from https://www.maguravr.com/reality-2/ with partial English translation, document not dated, 4 pages.

Japanese Language Web Page downloaded from https://prtimes.jp/main/html/rd/p/000000078.000023821.html, with partial English translation, document not dated, 7 pages.

Japanese Language Web Page downloaded from https://panora.tokyo/78856/, with partial English translation, document not dated, 5 pages.

Office Action issued in Japan Application No. 2020-108097 (together with English translation), dated Mar. 7, 2023, 32 pages.

Reconsideration Report by Examiner before Appeal for Japan Patent Application No. 2020-108097, Aug. 18, 2021, 8 pages (with English machine translation).

* cited by examiner

1000

| | GAME TYPE | SELECTED GAME OBJECT | CONTROL PARAMETER | CALCULATION ON THE BASIS OF DISTRIBUTION RELATED DATA |
|---|---|---|---|---|
| 1 | FIGHTING GAME A | AVATER OF DISTRIBUTOR | ATTACK POWER | >NUMBER OF CONSECUTIVE DISTRIBUTION DAYS IS 3 TO 6: DOUBLE<br>>NUMBER OF CONSECUTIVE DISTRIBUTION DAYS IS 7 OR MORE: FIVE TIMES |
| | | | DEFFENCE POWER | >NUMBER OF CONSECUTIVE DISTRIBUTION DAYS IS 3 TO 6 AND DISTRIBUTED IN SAME TIME SLOT IN EACH DAY: DOUBLE<br>>NUMBER OF CONSECUTIVE DISTRIBUTION DAYS IS 7 OR MORE AND DISTRIBUTED IN SAME TIME SLOT IN EACH DAY: FIVE TIMES |
| | | FRIEND CHARACTER | NUMBER OF APPEARANCES | >ACCUMULATED TOTAL NUMBER OF RECEIVED TOKENS IS 100 OR MORE: ONE IS ADDED<br>>ACCUMULATED TOTAL NUMBER OF RECEIVED COMMENTS IS 500 OR MORE: ONE IS ADDED |
| 2 | ROLE PLAYING GAME B | ITEMS | NUMBER OF GIVING AND THE LIKE | >POSSESSING FIVE OR MORE BADGES THAT CAN BE OBTAINED IN ACCORDANCE WITH GAME ACHIEVEMENT LEVEL: ONE "JAPANESE SWORD" AS WEAPON IS ADDED<br>>REACHED LEVEL 20 IN GAME B: ONE NEW "SPELL" IS ADDED |
| ⋮ | ⋮ | ⋮ | ⋮ | ⋮ |

FIG. 8

VIDEO MODIFICATION AND TRANSMISSION

CROSS-REFERENCE TO RELATED APPLICATIONS

This application claims priority to Japanese Patent Application No. 2020-108097, filed on Jun. 23, 2020, and Japanese Patent Application No. 2020-122729, filed on Jul. 17, 2020, both entitled "Computer Program, Method, and Server Device". These applications are incorporated herein by reference in their entirety as if set forth fully herein.

FIELD

The technology disclosed in the present application relates to a computer program, a method, and a server device that are used for distributing a video related to a game from a terminal device of a distributor to a terminal device of each viewer.

BACKGROUND

As one example of a service used for distributing a video related to a computer game from a terminal device of a distributor to a terminal device of each viewer, a service called "mirrativ" provided on a website identified by the following URL is known.

https://apps.apple.com/jp/app/mirrativ-ミラティブ-スマホでかんたんゲーム配信 /id1028944599

With this service, a distributor uses a terminal device to be able to distribute, to a terminal devices of a plurality of viewers, a video including an animation of an avatar generated on the basis of motion data related to the motion of the distributor and a video related to a computer-implemented game generated on the basis of operation data related to the operation of the distributor.

SUMMARY

Recently an approach for encouraging users as a distributor or a viewer to use a video distributing/viewing service is needed. Method and apparatus for distributing and modifying video in a networked computer environment are disclosed. In some examples of a video streaming service used with computer-implemented games, each viewer can exchange data with a distributor including game metadata, comments, video data, audio data, image data, location data, and/or video or game commands. Each viewer can also determine to transmit one or more messages or packets encoded with one or more tokens to the distributor. In the disclosed technology field, such tokens may also be referred to as elective tokens or "gifts." Similarly, token data may be referred to as "gift data."

Computer-readable storage media according to one aspect of the disclosed technology can be "computer-readable storage media storing computer-readable instructions, which when executed by a computer having at least one processor, cause the computer to: generate motion data; distribute, toward terminal devices of a plurality of viewers via a communication line, the motion data or a first video including an animation of an avatar of the distributor generated on the basis of the motion data; receive a webpage via the communication line; receive operation data from a user interface; generate a second video related to a computer-implemented game on the basis of the operation data by using the received web page; distribute the second video toward the terminal devices of the plurality of viewers via the communication line; receive, via the communication line, at least one of distribution related data; extract a selected game object out of a plurality of game objects to be used in the game; calculate a control parameter related to the selected game object on the basis of the distribution related data; generate the second video including the selected game object; and distribute, via the communication line, the second video toward the terminal devices of the plurality of viewers."

A method according to one aspect of the disclosed technology can be "a computer-implemented method for automatically generating customized video in an interactive network application, the method comprising: with at least one processor: generating motion data by using a sensor; distributing, toward terminal devices of a plurality of viewers via a communication line, the motion data or a first video including an animation of an avatar of the distributor generated on the basis of the motion data; receiving a webpage via the communication line; receiving operation data from a user interface; generating a second video related to a computer-implemented game on the basis of the operation data by using the received web page; distributing the second video toward the terminal devices of the plurality of viewers via the communication line; receiving, via the communication line, at least one of distribution related data; extracting a selected game object out of a plurality of game objects to be used in the game; calculating a control parameter related to the selected game object on the basis of the distribution related data; generating the second video including the selected game object; and distributing, via the communication line, the second video toward the terminal devices of the plurality of viewers."

A terminal device according to one aspect of the disclosed technology can be "A terminal device, comprising: at least one processor coupled to a communication line, wherein the at least one processor is configured to: generate motion data by using a sensor; distribute, toward terminal devices of a plurality of viewers via the communication line, the motion data or a first video including an animation of an avatar of the distributor generated on the basis of the motion data; receive a webpage via the communication line; receive operation data from a user interface; generate a second video related to a computer-implemented game on the basis of the operation data by using the received web page; distribute the second video toward the terminal devices of the plurality of viewers via the communication line; receive, via the communication line, at least one of distribution related data; extract a selected game object out of a plurality of game objects to be used in the game; calculate a control parameter related to the selected game object on the basis of the distribution related data; generate the second video including the selected game object; and distribute, via the communication line, the second video toward the terminal devices of the plurality of viewers."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF THE DRAWINGS

FIG. 8 is a view showing an example of calculation data included in an data table.

DETAILED DESCRIPTION

Figure 1:
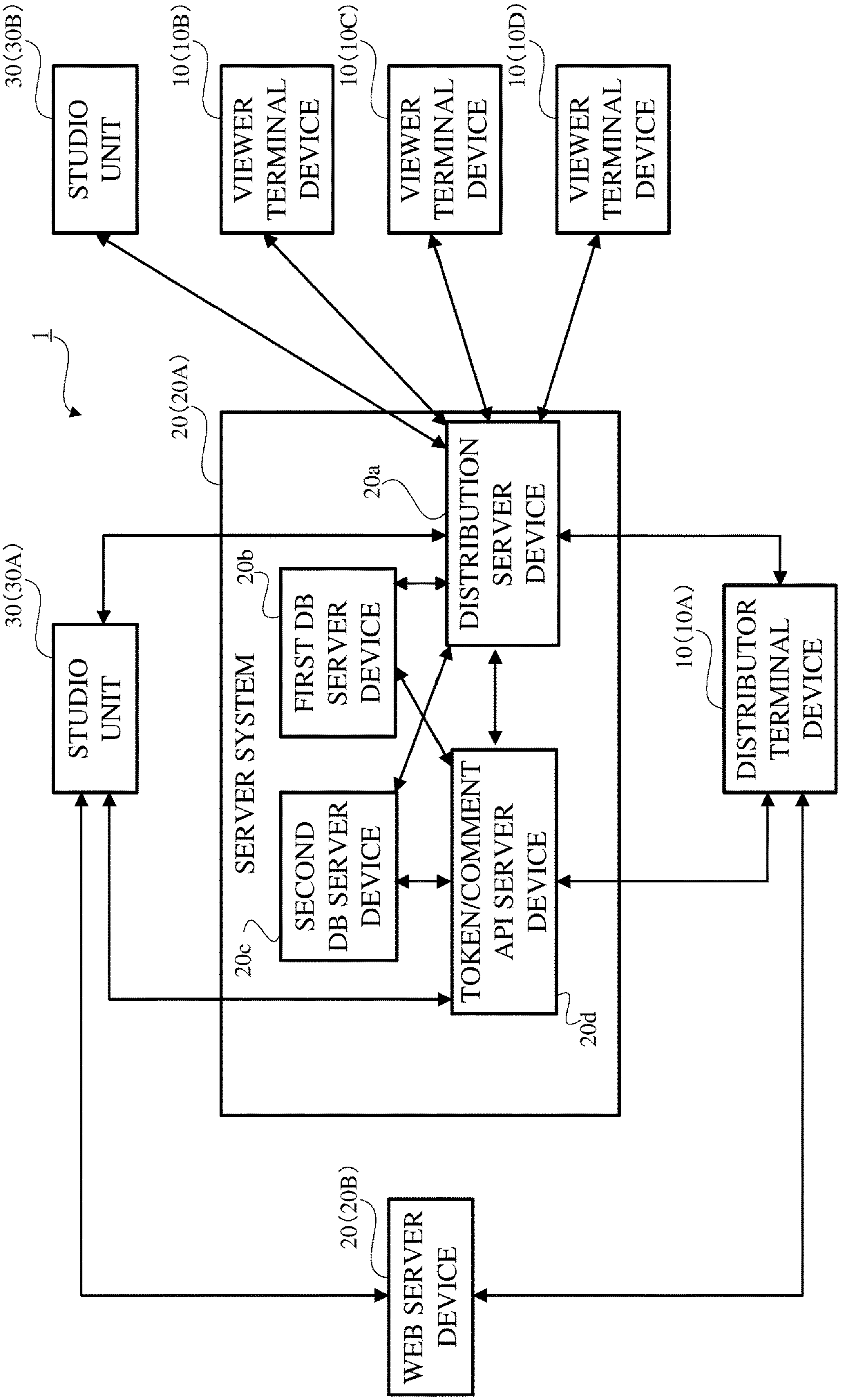
FIG. 1 is a block diagram showing an example of a configuration of a video distribution system according to an embodiment.

This disclosure is set forth in the context of representative embodiments that are not intended to be limiting in any way.

As used in this application the singular forms “a,” “an,” and “the” include the plural forms unless the context clearly dictates otherwise. Additionally, the term “includes” means “comprises.” Further, the term “coupled” encompasses mechanical, electrical, magnetic, optical, as well as other practical ways of coupling or linking items together, and does not exclude the presence of intermediate elements between the coupled items. Furthermore, as used herein, the term “and/or” means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like “produce,” “generate,” “display,” “receive,” “evaluate,” and “distribute” to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As will be described in further detail herein, certain examples of the disclosed technology can be used in a networked video transmission system to provide interactive applications, such as games, social media, and other forms of interactive communication. In some examples, token data can be transmitted from a viewer terminal device to a distributor terminal device operating concurrently to provide an interactive application. A server at the distributor, or the distributor terminal device itself, can process the data to render modified video data that is encoded and sent to the viewer terminal device. The video encoder comprises a processor (e.g., a central processing unit or a graphics processing unit) configured to generate video files or streams according to one or more video coding formats. Example of suitable video coding formats include but are not limited to: H.264, H.265, VC-1, MPEG-1, MPEG-2, and MPEG-4. Rendering and encoding the data at the server allows for interactive applications to be processed at the distributor, which can reduce the amount of computing resources required at the viewer terminal devices to render the modified video data locally. Further, in some examples, the modified video data is transmitted not just to the viewer device that sent token data, but can also be transmitted to other viewer devices participating in the interactive application. This can further reduce computing resources required at each of the additional viewer devices or allow for more extensive effects to be added to the transmitted video. In addition, certain disclosed techniques allow security and maintenance operations associated with interactive applications such as game programs to be performed at the distributor, further reducing complexity of the application.

In the following, various embodiments will be described with reference to the accompanied drawings. Additionally, common elements as shown in drawings are assigned with a same reference sign. Also, it should be noted that there are cases where an element as shown in one drawing is omitted in another drawing for the purposes of explanation. Further, it should be noted that the accompanied drawings are not necessarily described to scale. Furthermore, the term "application" can also be referred to as "software" or "program", and can be instructions to a computer that are combined so as to be able to obtain certain results.

I. First Embodiment

1. Configuration of Video Distribution System

In a video distribution system 1 disclosed in the present application, simply put, a user who performs distribution (hereinafter referred to as "distributor") can distribute, by using his terminal device, a first video and a second video to a terminal device of a user who views the video (hereinafter referred to as "viewer") via a communication line. The first video is a video including an animation of a distributor's avatar generated on the basis of motion data regarding the motion of the distributor. The second video is a video regarding a game generated on the basis of operation data regarding the operation of the distributor.

FIG. 1 is a block diagram showing an example of the configuration of the video distribution system 1 according to an embodiment. As shown in FIG. 1, the video distribution system 1 can include a plurality of terminal devices 10 connected to a communication line (communication network) not illustrated, and one or more server devices 20 connected to the communication line. Each terminal device 10 can be connected to one or more server devices 20 via the communication line.

Note that as the plurality of terminal devices 10, FIG. 1 shows, for example, terminal devices 10A to 10D, but one or more terminal devices 10 other than them can be used similarly. Similarly, FIG. 1 shows as one or more server devices 20, for example, a server system 20A (server system 20A includes a plurality of servers as described later) and a server device 20B (web server device 20B), but one or more server devices 20 other than them can be used similarly. The communication line not illustrated can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

In an embodiment, the video distribution system 1 can include one or more studio units 30 connected to the communication line. Each studio unit 30 can be connected to one or more server devices 20 or the plurality of terminal devices 10 via the communication line. Note that as one or more studio units 30, FIG. 1 shows, for example, studio units 30A and 30B, but one or more studio units 30 other than them can be used similarly.

1-1. Terminal Device 10

As shown in FIG. 1, the plurality of terminal devices 10 can include one or more distributor terminal devices 10 (here, terminal device 10A) and one or more viewer terminal devices 10 (here, terminal device 10B to the terminal device 10D). By having a common configuration, each terminal device 10 can be either a terminal device for distributing a video (distributor terminal device 10) or a terminal device for viewing a video (viewer terminal device 10). Similarly, the user using the video distribution system 1 can be a distributor in one scene and a viewer in another scene.

In a case of operating as a terminal device (distributor terminal device) for distributing a video, each terminal device 10 can execute an installed video distribution application (may also be middleware or a combination of an application and middleware. The same shall apply hereinafter). Thus, each terminal device 10 can acquire motion data regarding the motion of the distributor, and can generate the first video including an animation of a virtual character (avatar) changed according to the acquired data. Further, each terminal device 10 can transmit the first video to the server device 20 (server system 20A) via the communication line. Such first video is distributed from the server device 20 (server system 20A) to the terminal device (viewer's terminal device) 10 for receiving the video via the communication line. Such the terminal device 10 of the viewer can receive the video by executing the installed video viewing application (may also be middleware or a combination of an application and middleware. The same shall apply hereinafter).

When operating as a terminal device of the distributor, each terminal device 10 can execute a browser function incorporated in the installed video distribution application and/or execute an installed web browser application. This allows each terminal device 10 to receive a web page (HTML document) from the server device 20 (web server device 20B) and to execute a game program included in this web page. By executing this game program, each terminal device 10 can generate the second video in which at least one game object is operated on the basis of operation data regarding the operation of the distributor.

When operating as a terminal device of the distributor, by executing the above-described video distribution application, each terminal device 10 can transmit the second video generated as described above to the server device 20 (server system 20A) via the communication line. Such the second video is also distributed from the server device 20 (server system 20A) via the communication line to the terminal device (viewer terminal device) 10 for receiving the video, which executes the installed video viewing application.

Furthermore, when operating as a terminal device of the distributor, by executing the above-described video distribution application, each terminal device 10 can receive, via the server device 20 (server system 20A), from the terminal device 10 of the viewer viewing the first video and/or second video distributed by the terminal device 10 of this distributor, token data indicative of giving a token to this distributor, and/or comment data indicative of transmitting a comment to this distributor. When operating as a distributor terminal device, by executing the above-described video distribution application, each terminal device 10 can distribute comment data, via the server device 20 (server system 20A), to the terminal device 10 of the viewer viewing the first video and/or the second video distributed by the terminal device 10 of this distributor.

On the other hand, when operating as a terminal device (viewer terminal device) for viewing a video, by executing the installed video viewing application, each terminal device 10 can receive, via the server device 20 (server system 20A), the first video and/or the second video distributed by the terminal device 10 of the distributor.

When operating as a viewer terminal device, by executing the video viewing application, each terminal device 10 can transmit, via the server device 20 (server system 20A) to the terminal device 10 (terminal device 10A of the distributor in FIG. 1) of this distributor, token data indicative of giving a token to the distributor distributing the video, and/or comment data indicative of transmitting a comment to this distributor.

The above-described video distribution application and video viewing application can be installed and executed in each terminal device 10 as one integrated application or as separate applications.

Each terminal device 10 is any terminal device capable of executing such operation, and can include a smartphone, a tablet, a mobile phone (feature phone), and/or a personal computer, without limiting to them.

1-2 Server Device 20

FIG. 1 shows the server system 20A and the web server device 20B as an example of one or a plurality of server devices 20.

The server system 20A can distribute, to each terminal device (terminal device of each viewer) 10 (for example, terminal devices 10B to 10D of the viewer in FIG. 1), the first video and/or the second video transmitted by each terminal device (terminal device of each distributor) 10 (terminal device 10A of the distributor in FIG. 1, for example). Furthermore, the server system 20A can transmit, to the terminal device 10 of a certain distributor, token data indicative of giving a token to the distributor and/or comment data indicative of transmitting a comment to the distributor that have been transmitted by each terminal device (terminal device of each viewer) 10.

In order to execute such an operation, the server system 20A can, in an embodiment, include a distribution server device 20*a*, a first database (DB) server device 20*b*, a second DB server device 20*c*, and a token/comment API server device 20*d* that are connected to one another via the communication line (including a wireless line and/or a wired line not illustrated).

The distribution server device 20*a* can distribute, to the terminal device 10 (for example, the terminal devices 10B to 10D of the viewer) of each viewer, the first video and/or the second video transmitted by the terminal device 10 (for example, the terminal device 10A of the distributor) of each distributor. The distribution server device 20*a* can receive comment data regarding the first video and/or the second video to the terminal device 10 of each viewer via the token/comment API server device 20*d* from the terminal device 10 of each distributor, and distribute the comment data to the terminal device 10 of each viewer. The distribution server device 20*a* can receive token data and/or comment data regarding the first video and/or the second video transmitted from the terminal device 10 of each viewer, and transmit the received token data and/or comment data to the token/comment API server device 20*d*.

The distribution server device 20*a* can manage (acquire) distribution related data regarding the distribution by the distributor of the first video transmitted by the terminal device 10 of each distributor, and store the distribution related data in the first DB server device 20*b*. Furthermore, the distribution server device 20*a* can manage (acquire) distribution related data regarding the distribution by the distributor of the second video transmitted by the terminal device 10 of each distributor, and store the distribution related data in the second DB server device 20*c*. Furthermore, the distribution server device 20*a* can read out, from the first DB server device 20*b* and/or the second DB server device 20*c*, the distribution related data inquired from the terminal device 10 of each distributor, and transmit the distribution related data to the terminal device 10 of the distributor.

The first DB server device 20*b* can store token data and/or comment data (includes both those transmitted from the terminal device 10 of each viewer and those transmitted from the terminal device 10 of each distributor) related to the first video received from the token/comment API server device 20*d*. The first DB server device 20*b* can store distribution related data regarding the first video received from the distribution server device 20*a*. The first DB server device 20*b* can read out the distribution related data inquired by the distribution server device 20*a* and transmit the distribution related data to the distribution server device 20*a*.

The second DB server device 20*c* can store token data and/or comment data (includes both those transmitted from the terminal device 10 of each viewer and those transmitted from the terminal device 10 of each distributor) related to the second video received from the token/comment API server device 20*d*. The second DB server device 20*c* can store distribution related data regarding the second video received from the distribution server device 20*a*. The second DB server device 20*c* can read out the distribution related data inquired by the distribution server device 20*a* and transmit the distribution related data to the distribution server device 20*a*.

When inquired (or automatically) from the terminal device 10 of each distributor about the token data and/or the comment data on the first video and/or the second video received from the distribution server device 20*a*, the token/comment API server device 20*d* can transmit, to the terminal device 10 of the distributor, the token data and/or the comment data to the distributor. The token/comment API server device 20*d* can store, in the first DB server device 20*b*, token data and/or comment data (including both those transmitted from the terminal device 10 of each viewer and those transmitted from the terminal device 10 of each distributor) regarding the first video received from the distribution server device 20*a*. Furthermore, the token/comment API server device 20*d* can store, in the second DB server device 20*c*, token data and/or comment data (including both those transmitted from the terminal device 10 of each viewer and those transmitted from the terminal device 10 of each distributor) regarding the second video received from the distribution server device 20*a*.

The token/comment API server device 20*d* can receive, from the terminal device 10 of each distributor, comment data regarding the first video and/or the second video to the terminal device 10 of each viewer, and transmit the comment data to the distribution server device 20*a*. Furthermore, the token/comment API server device 20*d* can store, in the first DB server device 20*b*, comment data regarding the first video received from the terminal device 10 of each distributor. Furthermore, the token/comment API server device 20*d* can store, in the second DB server device 20*c*, comment data regarding the second video received from the terminal device 10 of each distributor.

The example shown in FIG. 1 shows a configuration in which for the purpose of load dispersion and the like, the server system 20A has four server devices including the distribution server device 20*a*, the first DB server device 20*b*, the second DB server device 20*c*, and the token/comment API server device 20*d*. However, at least one server device of these four server devices may be integrated with at least one of the remaining server devices. Each operation of the four server devices described above is an example, and for example, the operation of at least one server device may be replaced with the operation of another server device.

Next, the web server device 20B can transmit, to the terminal device 10 of each distributor having accessed, a web page (document created according to HTML, for example, HTML5) in which a game program is incorporated. This game program can execute various operations related to the distribution of the video, including the operations exemplified below, on the terminal device 10 having received and decoded the game program.

- Operation of executing the game
- Operation of transmitting the game screen (second video) generated with the execution of the game to the server system 20A (distribution server device 20*a*)
- Operation of acquiring, from the server system 20A (token/comment API server device 20*d*), the token data and/or comment data transmitted to the identified distributor 1-3 Studio Unit 30

The studio unit 30 can be placed in a studio room, a room, a hall, or the like that is a place where the distributor (performer) distributes a video. The studio unit 30 can perform the same function as that of the terminal device 10 and/or the server device 20 as described above.

2. Hardware Configuration of Each Device

Next, an example of the hardware configuration of each of the terminal device 10, the server device 20, and the studio unit 30 will be described.

2-1. Hardware Configuration of Terminal Device 10

Figure 2:
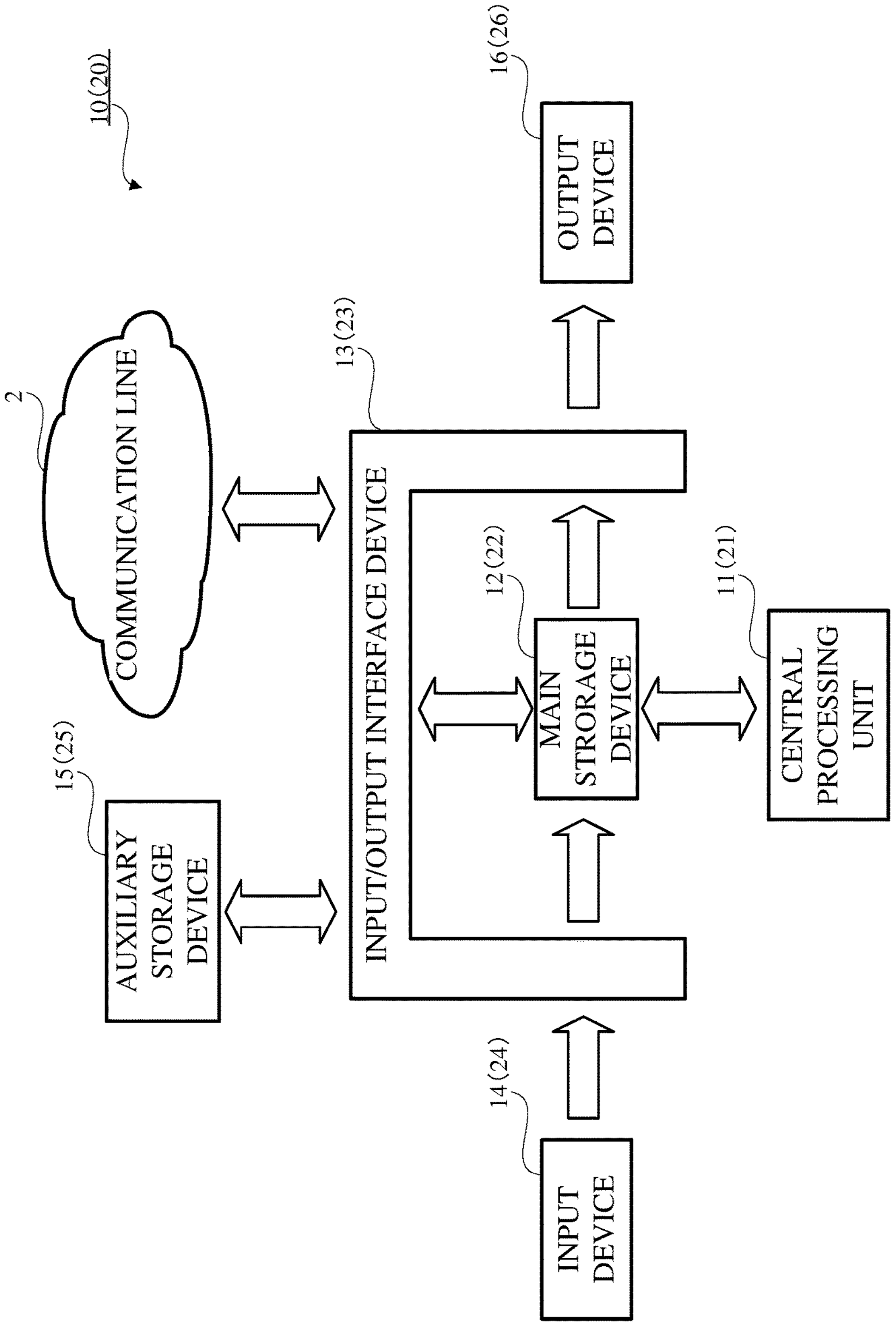
FIG. 2 is a block diagram schematically showing an example of a hardware configuration of a terminal device (server device) shown in FIG. 1 (and FIG. 9).

An example of the hardware configuration of each terminal device 10 will be described with reference to FIG. 2. FIG. 2 is a block diagram schematically showing an example of the hardware configuration of the terminal device 10 (server device 20) shown in FIG. 1 (in FIG. 2, reference numerals in parentheses are given in relation to the server device 20, as will be described later).

As shown in FIG. 2, each terminal device 10 can mainly include a central processing unit 11, a main storage device 12, an input/output interface device 13, an input device 14, an auxiliary storage device 15, and an output device 16. These devices are interconnected via a data bus and/or a control bus.

The central processing unit 11, which is referred to as a "CPU", can perform operations on instructions and data stored in the main storage device 12, and store the results of the operations in the main storage device 12. The central processing unit 11 can control the input device 14, the auxiliary storage device 15, the output device 16, and the like via the input/output interface device 13. The terminal device 10 can include one or more such central processing units 11.

The main storage device 12, which is referred to as a "memory", can store instructions and data received from the input device 14, the auxiliary storage device 15, and a communication line 2 (server device 20 or the like) via the input/output interface device 13, as well as calculation results of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device having a capacity larger than that of the main storage device 12. The auxiliary storage device 15 can store an instruction and data (computer program) constituting the above-mentioned specific application (video distribution application, video viewing application, and the like) and a web browser application. By being controlled by the central processing unit 11, the auxiliary storage device 15 can transmit these instructions and data (computer program) to the main storage device 12 via the input/output interface device 13. The auxiliary storage device 15 can include a magnetic disk device and/or an optical disk device, without limiting to them.

The input device 14 is a device that fetches data from the outside, and can include a touch screen, a button, a keyboard, a mouse, and/or a sensor, without limiting to them. The sensor can include a sensor including one or more cameras or the like and/or one or more microphones or the like, without limiting to them, as described below.

The output device 16 can include a display device, a touch screen, and/or a printer device, without limiting to them.

With such hardware configuration, the central processing unit 11 can sequentially load, into the main storage device 12, an instruction and data (computer program) constituting a specific application stored in the auxiliary storage device 15, and calculate the loaded instruction and data. Thus, the central processing unit 11 can control the output device 16 via the input/output interface device 13 or transmit/receive various data to/from another device (e.g., server device 20, other terminal device 10, studio unit 30, and/or like) via the input/output interface device 13 and a communication network 2.

Thus, by executing the installed specific application, the terminal device 10 can execute at least one operation of the following operations exemplified below, for example (including various operations described in detail later).

- Operation used for distributing the first video and/or the second video
- Operation used for receiving the token data and/or the comment data transmitted from another terminal device 10 to the own terminal device 10
- Operation used for receiving the first video and/or the second video distributed by another terminal device 10
- Operation used for transmitting token data and/or comment data to another terminal device 10

The terminal device 10 can include one or more microprocessors and/or graphics processing units (GPU) in place of the central processing unit 11 or together with the central processing unit 11.

2-2. Hardware Configuration of Server Device 20

An example of the hardware configuration of each server device 20 will be described similarly with reference to FIG. 2. The hardware configuration of each server device 20 (each of distribution server device 20*a*, first DB server device 20*b*, second DB server device 20*c*, token/comment API server device 20*d*, and web server device 20B) can be, for example, one identical to the hardware configuration of each terminal device 10 described above. Therefore, reference numerals for the components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are interconnected via a data bus and/or a control bus.

The central processing unit 21, the main storage device 22, the input/output interface device 23, the input device 24, the auxiliary storage device 25, and the output device 26 may be substantially identical to the central processing unit 11, the main storage device 12, the input/output interface device 13, the input device 14, the auxiliary storage device 15, and the output device 16, respectively, included in each terminal device 10 described above.

With such hardware configuration, the central processing unit 21 can sequentially load, into the main storage device 22, an instruction and data (computer program) constituting a specific application stored in the auxiliary storage device 25, and calculate the loaded instruction and data. Thus, the central processing unit 21 can control the output device 26 via the input/output interface device 23 or transmit/receive various data to/from another device (e.g., other terminal device 10, studio unit 30, and/or like) via the input/output interface device 23 and the communication network 2.

Thus, the server device 20 can execute at least one operation of the following operations exemplified below, for example (including various operations described in detail later).

- Operation used for distributing, to the terminal device 10 of each viewer, the first video and/or the second video transmitted by the terminal device 10 of each distributor
- Operation used for transmitting, to the terminal device 10 of the distributor, token data and/or comment data transmitted by the terminal device 10 of each viewer to the terminal device 10 of a certain distributor
- Operation used for transmitting, to the terminal device 10 of each viewer, comment data transmitted from the terminal device 10 of each distributor to the terminal device 10 of each viewer
- Operation used for managing and storing distribution related data related to the distribution of the first video and/or the second video by each distributor
- Operation used for transmitting, to the terminal device 10 of each distributor, distribution status information regarding the distribution of the first video and/or the second video by each distributor The server device 20 can include one or more microprocessors and/or graphics processing units (GPU) in place of the central processing unit 21 or together with the central processing unit 21.

2-3. Hardware Configuration of Studio Unit 30

The studio unit 30 is mountable by a data processing device such as a personal computer and, although not illustrated, can mainly include a central processing unit, a main storage device, an input/output interface device, an input device, an auxiliary storage device, and an output device, as with the above-described terminal device 10 and the server device 20. These devices are interconnected via a data bus and/or a control bus.

The studio unit 30 having such a hardware configuration can perform the same function as that of the above-described terminal device 10 and/or the server device 20.

3. Function of Each Device

Next, an example of the function of each of the terminal device 10, the server device 20, and the studio unit 30 will be described.

3-1. Function of Terminal Device 10

Figure 3:
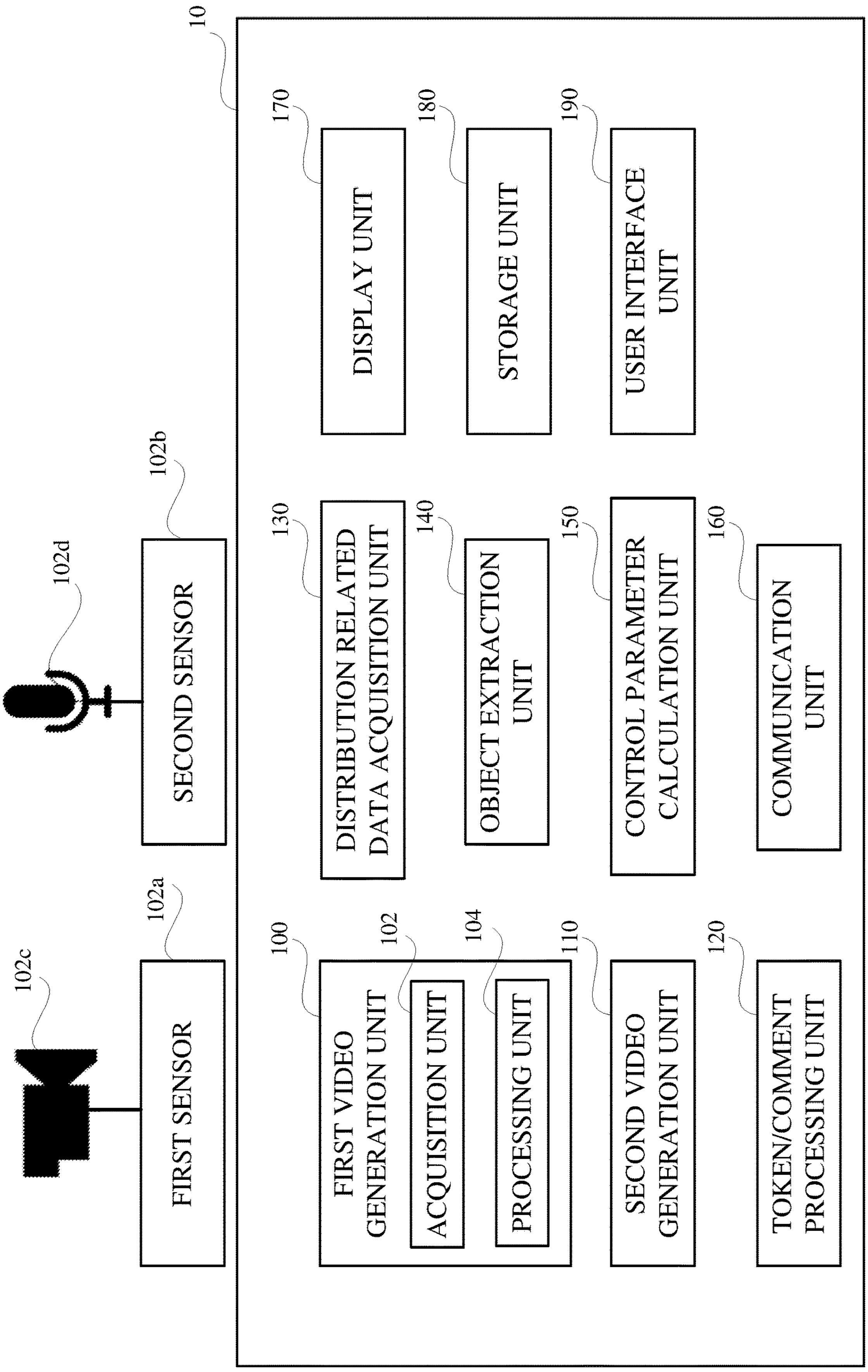
FIG. 3 is a block diagram schematically showing an example of a function of the terminal device shown in FIG. 1

An example of the function of the terminal device 10 will be described with reference to FIG. 3. FIG. 3 is a block diagram schematically showing an example of a function of the terminal device 10 shown in FIG. 1.

As shown in FIG. 3, the terminal device 10 can mainly include a first video generation unit 100, a second video generation unit 110, a token/comment processing unit 120, a distribution related data acquisition unit 130, an object extraction unit 140, a control parameter calculation unit 150, a communication unit 160, a display unit 170, a storage unit 180, and a user interface unit 190.

(1) First Video Generation Unit 100

The first video generation unit 100 can generate the first video including an animation of an avatar of a distributor on the basis of motion data regarding the motion of the distributor. In order to realize this, the first video generation unit 100 can include an acquisition unit 102 and a processing unit 104, for example.

The acquisition unit 102 can include one or more first sensors (not illustrated) that acquire data regarding the body of the distributor, and one or more second sensors (not illustrated) that acquire voice data regarding an utterance and singing emitted by the distributor.

In a preferred embodiment, the first sensor can include an RGB camera that captures visible light and a near-infrared camera that captures near-infrared light. As such a camera, it is possible to use one included in True Depth camera of iPhone X (registered trademark), for example. The second sensor can include a microphone for recording voice.

First, as for the first sensor, the acquisition unit 102 captures the body of the distributor by using the first sensor placed close to the body (e.g., face or hand and foot) of the distributor. Thus, the acquisition unit 102 can generate data (e.g., MPEG file) in which an image acquired by the RGB camera is recorded over a unit time in association with a time code (code indicating the time acquired). The acquisition unit 102 can generate data (e.g., TSV file) in which a numerical value (e.g., numerical value of floating point number) indicating a predetermined number (e.g., 51) of depths acquired by the near-infrared camera is recorded over a unit time in association with the time code. The TSV file is a file in a format where a plurality of data are recorded with data separated by tabs.

As for the near-infrared camera, specifically, a dot projector radiates, to the body of the distributor (performer), an infrared laser that forms a dot pattern, and the near-infrared camera captures the infrared dots projected and reflected on the body of the distributor and generates an image of the infrared dots thus captured. The acquisition unit 102 can compare an image of the dot pattern emitted by the dot projector registered in advance with an image captured by the near infrared camera. Thus, the acquisition unit 102 can calculate the depth (distance between each point or each feature point and the near-infrared camera) of each point (each feature point) by using the positional deviation at each point (each feature point) (e.g., each of 51 points and feature points) in the both images. The acquisition unit 102 can generate data in which a numerical value indicating the thus calculated depth is recorded over a unit time in association with the time code as mentioned above.

Next, as for the second sensor, the acquisition unit 102 acquires voice related to an utterance and singing emitted by the distributor using the second sensor placed close to the body of the distributor. Thus, the acquisition unit 102 can generate data (e.g., MPEG file) recorded over a unit time in association with a time code. In an embodiment, the acquisition unit 102 can acquire data regarding the body of the distributor using the first sensor, and at the same time, acquire voice data regarding an utterance and singing emitted by the distributor using the second sensor. In this case, the acquisition unit 102 can generate data (e.g., MPEG file) in which the image acquired by the RGB camera and the voice data regarding the utterance and singing emitted by the distributor using the second sensor are recorded over a unit time in association with the identical time code.

The acquisition unit 102 can output, to the processing unit 104, the data (MPEG file, TSV file, or the like) related to the body of the distributor thus generated and/or the voice data (MPEG file or the like) related to the utterance and singing emitted by the distributor.

The case where the first sensor includes an RGB camera and an infrared camera has been described here. However, the first sensor can include, for example, any of the following (A) to (C).

(A) A camera that detects infrared rays emitted by an infrared laser and reflected on the face of the performer (B) A plurality of RGB cameras that capture visible light (C) A single camera that captures visible light In the case of (A) above, the acquisition unit 102 can calculate the depth for each feature point in the body of the distributor by the same method as that mentioned above. In the case of (B) above, the acquisition unit 102 can calculate the depth of each feature point of the body of the distributor using a plurality of images captured by a plurality of RGB cameras. In the case of (C) above, the acquisition unit 102 can calculate, by using deep learning or the like, the depth of each feature point in the body of the distributor from an image captured by a single camera. In the case of (C) above, the acquisition unit 102 can calculate the depth of each feature point of the body of the distributor by analysis processing (image processing and the like) for the image captured by the single camera.

The processing unit 104 can generate a video including an animation of a virtual character (avatar of the distributor) on the basis of the data regarding the body of the distributor from the acquisition unit 102. As for the video itself of the virtual character, the processing unit 104 can also generate the video of the virtual character by causing a rendering unit not illustrated to execute rendering using various data (e.g., geometry data, bone data, texture data, shader data, blend shape data, and so on) stored in a character storage unit not illustrated.

By using various known techniques, the processing unit 104 can generate a video (e.g., a video in which the facial expression of the avatar changes in synchronization with the movement of the mouth and both eyes of the distributor, e.g., a video in which the facial expression of the avatar changes in response to lip-sync and gaze tracking with respect to the face of the distributor) in which the facial expression of the avatar or the like is changed by using the data (data regarding the depth of each feature point in the body of the distributor) related to the body of the distributor from the acquisition unit 102.

Any other known technique can be used for generating the first video including an animation of the avatar of the distributor on the basis of the motion data regarding the motion of the distributor. Such well-known technology includes a technique referred to as "blend shapes" described in a website specified by the following URL.

https://developer.apple.com/documentation/arkit/arfaceanchor/2928251-blendshapes The contents described in this website are incorporated herein by reference in their entirety.

When using this technique, the processing unit 104 can adjust each parameter of one or more feature points corresponding to the motion of the distributor among a plurality of feature points of the upper body (face or the like) of the distributor. This allows the processing unit 104 to generate a video of a virtual character that follows the motion of the distributor.

(2) Second Video Generation Unit 110

The second video generation unit 110 can generate the second video regarding the game on the basis of the operation data regarding the operation of the distributor by using the web page received from the web server device 20B.

Specifically, the second video generation unit 110 executes a game program incorporated in the web page received from the web server device 20B. Thus, the second video generation unit 110 can render the second video (game video) related to the game on the basis of the operation data indicating the operation of the distributor input by the user interface unit 190 and at least one game object in which the related control parameter has been calculated by the control parameter calculation unit 150.

(3) Token/Comment Processing Unit 120

The token/comment processing unit 120 can process token data and/or comment data transmitted/received regarding distribution and/or viewing of a video. For example, when the terminal device 10 operates as the terminal device 10 (e.g., the terminal device 10A of the distributor A in FIG. 1) of a certain distributor (hereinafter also referred to as "distributor A"), the token/comment processing unit 120 can process the token data and/or comment data transmitted to this distributor A and the comment data distributed (transmitted) to the terminal device 10 (in FIG. 1, the terminal devices 10B to 10D of the viewer) of each viewer by the distributor A. When the terminal device 10 operates as the terminal device 10 of the viewer, the token/comment processing unit 120 can process the token data and/or comment data to be transmitted by the viewer.

When the video distribution application and/or the video viewing application is installed in the terminal device 10 (the terminal device 10 of the distributor and the terminal device 10 of the viewer), the token/comment processing unit 120 can store the token data set in advance in these applications. The token data can include data such as names, shapes, colors, and places for the avatars to be attached of various types of tokens, and price data set in advance for each token.

Specifically, for example, using the user interface unit 190 of the terminal device 10 of the viewer, a certain viewer can purchase a discretionary token for the distributor A (the terminal device 10 of the distributor A), and then execute an operation of transmitting the purchased token to the distributor A. By the operation related to the transmission of a token (also called gifting) by the viewer, the token data of giving (gifting) target is transmitted from the terminal device 10 of the viewer to the terminal device 10 of the distributor A via the server device 20 (distribution server device 20*a*). Thus, the token/comment processing unit 120 in the terminal device 10 of the distributor A can execute the processing of reading the received token data. The token/comment processing unit 120 can be implemented with a processor coupled to a memory storing computer-readable instructions executed by the processor to process token data and comment data.

(4) Distribution Related Data Acquisition Unit 130

The distribution related data acquisition unit 130 can receive, from the server device 20 (distribution server device 20*a*), at least one piece of distribution related data regarding the distribution of the first video and/or the second video distributed from the terminal device 10 of each distributor (e.g., terminal device 10A of the distributor A) to the terminal device 10 of each viewer via the server device 20 (distribution server device 20*a*). The distribution related data can include distribution action data regarding distribution action by the distributor and/or distributor status data regarding the distributor. The distribution related data acquisition unit 130 can be implemented with a processor coupled to a memory storing computer-readable instructions executed by the processor to process distribution data.

Here, the distribution action data can include the distribution frequency by the distributor and the distribution time slot distributed by the distributor regarding distribution of the first video and/or the second video. The distribution frequency can include, for example, the number of distribution days (e.g., the total number of days of distribution in a period of one week) for a predetermined number of days, the total distribution time (e.g., the total distribution time of distribution in a period of one week) for a predetermined number of days, and the number of consecutive distribution days in the case of distribution in consecutive days (in the case of distribution in consecutive days, it may be distributed in different time slots of consecutive days or may be distributed in the same time slot [e.g., 21 o'clock to 22 o'clock] of consecutive days).

The distributor status data includes data calculated on the basis of token data and/or comment data transmitted/received by the terminal device 10 of the distributor. More specifically, with respect to the viewer receiving the first video and/or the second video of the distributor, the distributor status data can include data such as the number of times of being given (receiving) a token, the number of times of being given (receiving) a comment, and the number of times of transmitting a comment that are calculated on the basis of the comment data (first transmission data) transmitted from the terminal device 10 of the distributor to the terminal device 10 of the viewer and/or the token data and/or the comment data (reception data) received by the terminal device 10 of the distributor from the terminal device 10 of the viewer via the server device 20 (distribution server device 20*a*).

The distributor status data can also include data such as the number of times of giving (transmitting) a token, the amount of money for purchase of a token, and the number of times of transmitting a comment that are calculated on the basis of the token data and/or comment data (second transmission information) transmitted from the terminal device 10 of the distributor A (in this case, the terminal device 10 of the distributor A becomes the terminal device 10 of the viewer) to the terminal device 10 of the distributor B in the case where the distributor becomes a viewer in another scene (e.g., in the case where there is a distributor B different from the distributor A, and the distributor A becomes a viewer viewing the first video and/or the second video distributed by the distributor B).

Furthermore, the distributor status data can include game progress data by the distributor regarding the second video. The game progress data can include the game progress in a role-playing game or the like, any title (badge, level, and the like) regarding the game given to the user in accordance with the game score or the game progress (achievement level), and record data in a sports game, a card game, or the like.

Furthermore, the distributor status data can include various kinds of data other than the data regarding the distributor described above without limitation.

The distribution related data acquisition unit 130 may manage and store by itself some or all pieces of the above-mentioned distribution related data without receiving them from the distribution server device 20*a*.

(5) Object Extraction Unit 140

The object extraction unit 140 can extract at least one selected game object to be controlled on the basis of the distribution related data acquired (or stored) by the distribution related data acquisition unit 130, from among a plurality of game objects used in a game generated on the basis of operation data related to the operation of the distributor. The at least one selected game object to be controlled can include at least one game object acquired and/or operated by the distributor in the game. The at least one game object to be "acquired" or "operated" by the distributor in the game can include an item, equipment, a point, a reward, a coin, a card, a character, and/or an avatars. The object extraction unit 140 can be implemented with a processor coupled to a memory storing computer-readable instructions executed by the processor.

(6) Control Parameter Calculation Unit 150

On the basis of the distribution related data acquired by the distribution related data acquisition unit 130, the control parameter calculation unit 150 can calculate the control parameter related to the selected game object extracted by the object extraction unit 140. The specific calculation of the control parameter related to the selected game object will be described later. As described above, the selected game object extracted by the object extraction unit 140 can include at least one game object acquired and/or operated by the distributor in the game. The control parameter calculation unit 150 can be implemented with a processor coupled to a memory storing computer-readable instructions executed by the processor.

(7) Communication Unit 160

The communication unit 160 can communicate various data used for distribution and/or viewing of a video with the server system 20A and the web server device 20B. For example, when the terminal device 10 operates as the terminal device 10 of the distributor, the communication unit 160 can access the web server device 20B and receive a web page (HTML document) or the like containing a game program used for executing a game or the like. When the terminal device 10 operates as the terminal device 10 of the distributor, the communication unit 160 can receive at least one piece of distribution related data from the distribution server device 20*a*. Furthermore, when the terminal device 10 operates as the terminal device 10 of the distributor, the communication unit 160 can transmit the first video and/or the second video to the server system 20A, and can receive, from the server system 20A (token/comment API server device 20*d*), token data and/or comment data and the like transmitted from the terminal device 10 of the viewer to the distributor. Furthermore, when the terminal device 10 operates as the terminal device 10 of the distributor, the communication unit 160 can transmit, to the server system 20A (token/comment API server device 20*d*), comment data or the like to the terminal device 10 of the viewer. The communication unit 160 may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

When the terminal device 10 operates as the terminal device 10 of the viewer, the communication unit 160 can receive, from the server system 20A (distribution server device 20*a*), the first video and/or the second video and the comment data transmitted by the terminal device 10 of the distributor, and can transmit, to the server system 20A (distribution server device 20*a*), the token data and/or the comment data to the distributor (terminal device 10 of the distributor).

(8) Display Unit 170

The display unit 170 can display various data used for distribution and/or viewing of a video. Specifically, the display unit 170 can display the first video and/or the second video to be distributed, the first video and/or the second video having been received, and/or the like. The display unit 170 can also display token data/comment data and the like transmitted/received between the distributor and the viewer.

(9) Storage Unit 180

The storage unit 180 can store various data used for distribution and/or viewing of a video using computer-readable memory or storage devices. Specifically, the storage unit 180 can store at least part of various data regarding the first video, various data regarding the second video, token data and comment data transmitted/received between the terminal device 10 of the distributor and the terminal device 10 of the viewer, the above-mentioned distribution related data, and the like.

(10) User Interface Unit 190

The user interface unit 190 can input, via the user (distributor or viewer) operation, various data used for distribution and/or viewing of a video. For example, the user interface unit 190 can input, from the distributor, operation data indicating the contents or commands of the operation by the distributor when executing the game, and output the data to the second video generation unit 110. The user interface unit 150 may include a touch input device, such as a keyboard, keypad, mouse, touch screen display, pen, or trackball, a voice input device, a camera, an image sensor, a scanning device, or another device, that provides user input.

3-2. Function of Server Device 20

Figure 4:
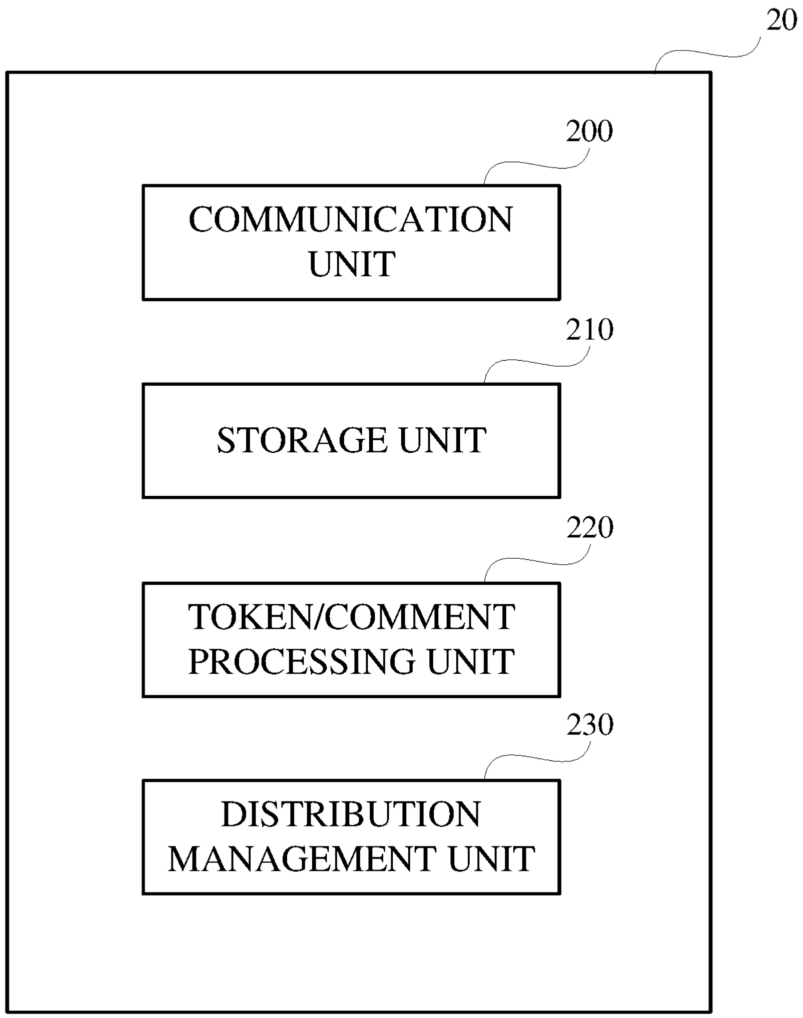
FIG. 4 is a block diagram schematically showing an example of a function of the server device shown in FIG. 1.

Next, an example of the function of the server device 20 will be described with reference to FIG. 4. FIG. 4 is a block diagram schematically showing an example of a function of the server device 20 shown in FIG. 1.

As shown in FIG. 4, the server device 20 can mainly include a communication unit 200, a storage unit 210, a token/comment processing unit 220, and a distribution management unit 230. These may be included in any one of the distribution server device 20*a*, the first DB server device 20*b*, the second DB server device 20*c*, and the token/comment API server device 20*d* constituting the server system 20A, or may be included redundantly and/or dispersedly in at least one server device of the distribution server device 20*a*, the first DB server device 20*b*, the second DB server device 20*c*, and the token/comment API server device 20*d*.

The communication unit 200 can communicate various data used for distribution and/or viewing of a video between the terminal device 10 of the distributor and/or the terminal device 10 of the viewer. For example, when operating as the server system 20A, the server device 20 can receive the first video and/or the second video from the terminal device 10 of each distributor and can distribute the received video to the terminal device 10 of each viewer. When operating as the server system 20A, the server device 20 can receive token data and/or comment data to the terminal device 10 of a certain distributor from the terminal device 10 of a certain viewer regarding the first video and/or the second video, and can transmit them to the terminal device 10 of the distributor. Furthermore, when operating as the server system 20A, the server device 20 can receive comment data to the terminal device 10 of each viewer from the terminal device 10 of a certain distributor, and can transmit this comment data to the terminal device 10 of each viewer. Furthermore, when operating as the server system 20A, the server device 20 can transmit the distribution related data managed by the distribution management unit 230 (and stored in the storage unit 210) to the terminal device 10 of the inquired distributor. Furthermore, when operating as the web server device 20B, the server device 20 can transmit, to the terminal device 10 of each distributor having accessed, a web page in which a game program is incorporated.

The storage unit 210 can store various distribution related data used for distribution and/or viewing of a video, and received from the communication unit 200, the token/comment processing unit 220, and/or the distribution management unit 230.

The token/comment processing unit 220 can process the token data and/or the comment data transmitted from each viewer (terminal device 10 of each viewer) to each distributor (terminal device 10 of each distributor). The token/ comment processing unit 220 can also process the comment data transmitted from each distributor (terminal device 10 of each distributor) to each viewer (terminal device 10 of each viewer).

The distribution management unit 230 can manage, for example, at least one piece of the following distribution related data regarding the distribution of each distributor (terminal device 10 of each distributor), without limiting to this.

(a) Distribution Action Data (e.g., Including the Following Data) Regarding the Distribution Action by the Distributor (e.g., Distributor A)

The distribution action data includes data regarding the distribution frequency of the distributor (e.g., distributor A) and data regarding the distribution time slot for distribution by the distributor regarding distribution of the first video and/or the second video. Here, the distribution frequency includes the number of distribution days (e.g., the total number of days of distribution in a period of one week) for a predetermined number of days, the total distribution time (e.g., the total distribution time of distribution in a period of one week) for a predetermined number of days, and the number of consecutive distribution days in the case of distribution in consecutive days (in the case of distribution for three consecutive days, the number of consecutive distribution days becomes "3"). In the case of distribution in consecutive days, the distribution in consecutive days includes both the case of distribution in different time slots of consecutive days and the case of distribution in the same time slot (e.g., 21 o'clock to 22 o'clock) of consecutive days (such a case can be referred to as fixed-hour distribution). The data regarding the distribution time slot can include data regarding which of the three time slots of 0 o'clock to 8 o'clock, 8 o'clock to 16 o'clock, and 16 o'clock to 24 o'clock in a certain day, for example, distribution was performed.

(b) Distributor Status Data (e.g., Includes the Following Data) Regarding the Distributor (e.g., Distributor A)

The distributor status data can include data calculated on the basis of token data and/or comment data transmitted/received by the terminal device 10 of the distributor (e.g., distributor A). More specifically, with respect to the viewer receiving the first video and/or the second video of the distributor, the distributor status data can include data (distributor status information) such as the number of times of being given (receiving) a token, the number of times of being given (receiving) a comment, and the number of times of transmitting a comment that are calculated on the basis of the comment data (first transmission data) transmitted from the terminal device 10 of the distributor to the terminal device 10 of the viewer and/or the token data and/or the comment data (reception information) received by the terminal device 10 of the distributor from the terminal device 10 of the viewer via the server device 20 (distribution server device 20*a*).

The distributor status data can also include data (distributor status data) such as the number of times of giving (transmitting) a token, the amount of money for purchase of a token, and the number of times of transmitting a comment that are calculated on the basis of the token data and/or comment data (second transmission information) transmitted from the terminal device 10 of the distributor A (in this case, the terminal device 10 of the distributor A becomes the terminal device 10 of the viewer) to the terminal device 10 of the distributor B in the case where a certain distributor (e.g., distributor A) becomes a viewer in another scene (in the case where there is a distributor B different from the distributor A, and the distributor A becomes a viewer viewing the first video and/or the second video distributed by the distributor B).

The distributor status data can include game progress information by the distributor regarding the second video. The game progress information can include the game progress in a role-playing game or the like, any title (badge, level, and the like) regarding the game given to the user in accordance with the game score or the game progress (achievement level), and record data in an event or tournament of a sports game, a fighting game, or the like (these pieces of data are also distributor status data).

Regarding distribution of the first video and/or the second video, the distributor status data can also include data (these pieces of data are also distributor status data) such as the number of times of performing together with another distributor, the total number of viewers viewing (viewed) the first video and/or the second video currently distributed and/or previously distributed, the number of following viewers, and evaluation data such as "Like!" from the viewers regarding the first video and/or the second video (these data as well as the distributor status data of the distributor).

The server system 20A is provided for the purpose of performing a function of distributing, to each terminal device 10 of the plurality of viewers, the first video and/or the second video transmitted by the terminal device 10 of each distributor. In the terminal device 10 of a distributor and the terminal device 10 of a viewer having a specific application (video distribution application, video viewing application, or the like) installed, an identification ID is given to each user (regardless of the distributor or the viewer).

The server system 20A relays token data and comment data exchanged between each distributor and each viewer.

Therefore, regarding the first video and/or the second video, the server system 20A can recognize the following: which distributor's terminal device 10 to distribute (to have distributed) from; which viewer's terminal device 10 to receive; when; and how many hours. The server system 20A can also recognize as to which distributor's terminal device 10 and which viewer's terminal device 10 to transmit/receive (to have transmitted/received) the token data and/or comment data between. Therefore, by managing the history (log) of such distribution, the history of transmission/reception of token data and/comment data, and the history regarding the game progress (for example, saved data), the server system 20A can manage various data listed as described above.

When the server device 20 operates as the web server device 20B, the token/comment processing unit 220 and the distribution management unit 230 may be omitted.

3-3 Function of Studio Unit 30

As described above, the studio unit 30 can perform the same function as that of the terminal device 10 and/or the server device 20. Therefore, the studio unit 30 can have the function of the terminal device 10 described with reference to FIG. 3 and/or the function of the server device 20 described with reference to FIG. 4.

When the studio unit 30 is used for the purpose of performing a function similar to that of the terminal device 10 of the distributor, a first video generation unit 300 (not illustrated) in the studio unit 30 may have a function similar to that of the first video generation unit 100 in the above-mentioned terminal device 10, or may have yet another function added thereto.

4. Overall Operation of Video Distribution System 1

Figure 5A:
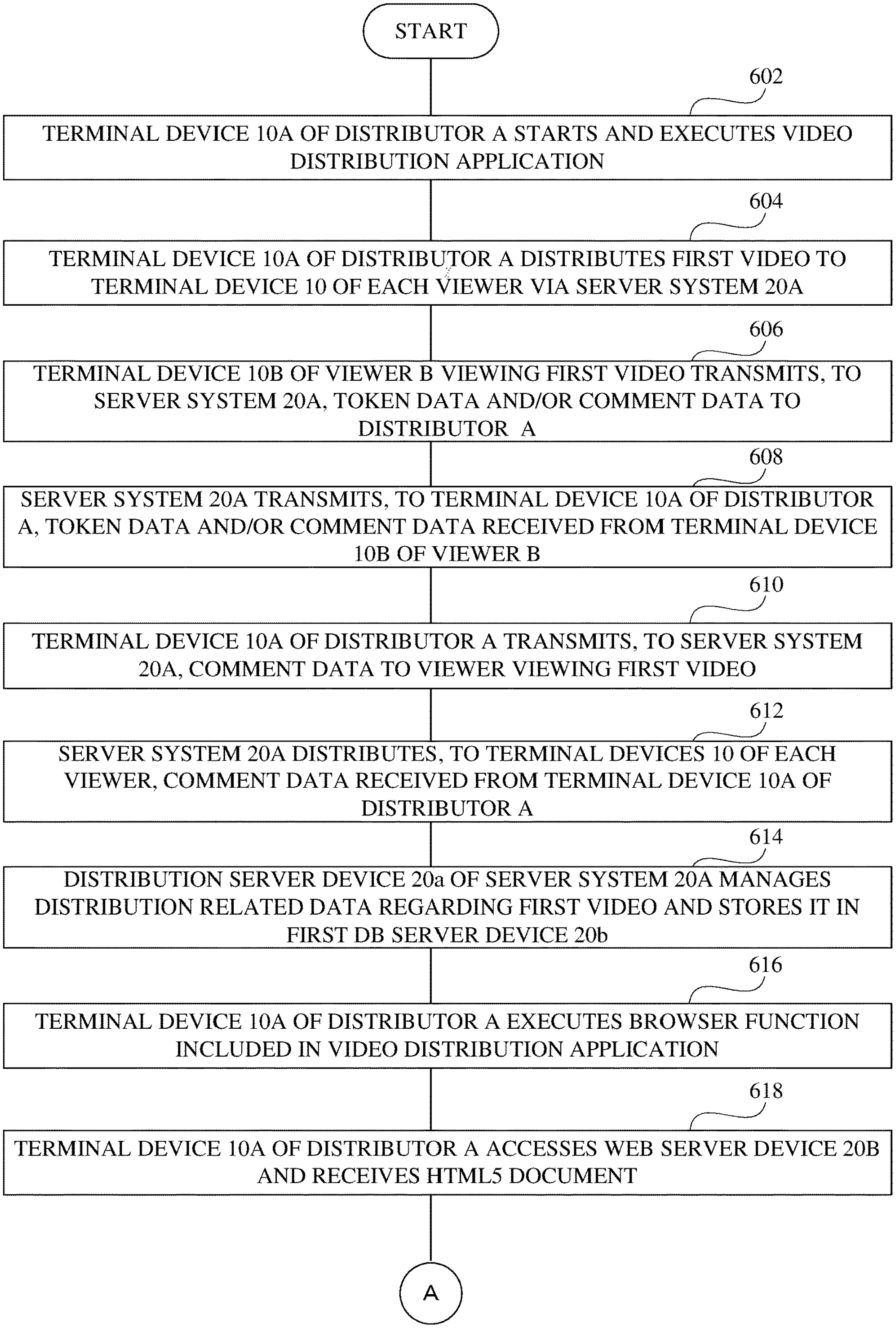
FIG. 5A is a flowchart showing an example of an operation performed in the video distribution system shown in FIG. 1.
Figure 5B:
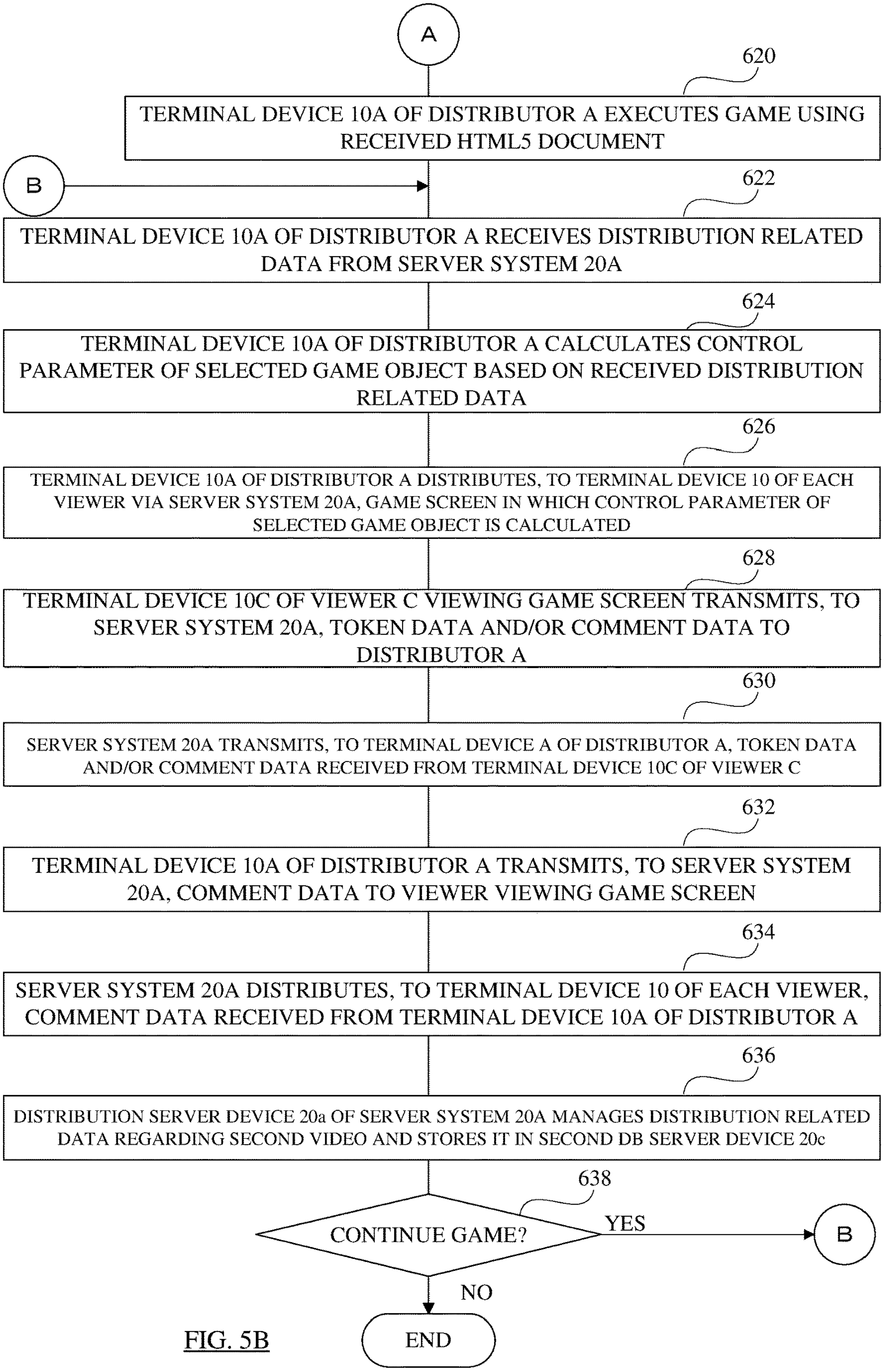
FIG. 5B is a flowchart showing an example of an operation performed in the video distribution system shown in FIG. 1.
Figure 6:
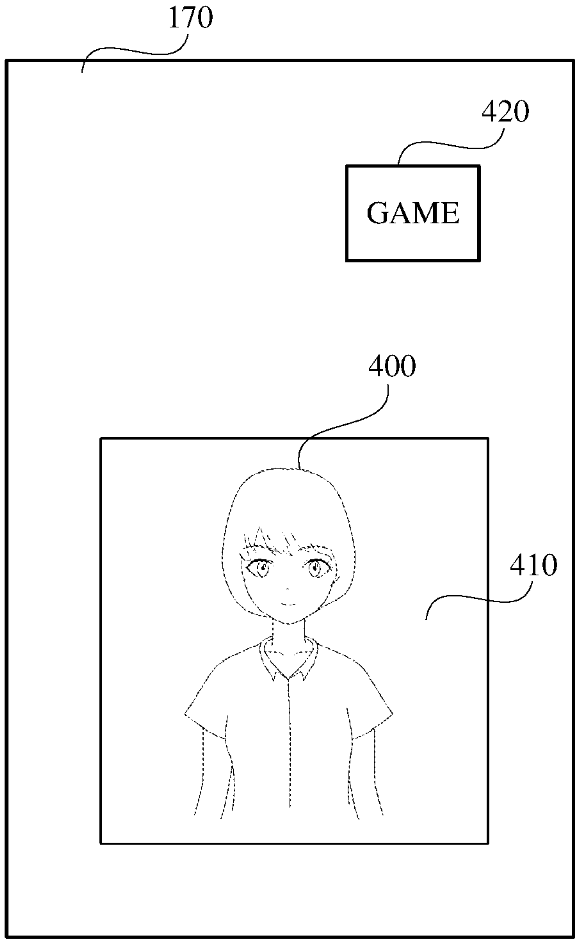
FIG. 6 is a view showing an example of a first video displayed on a terminal device used in the video distribution system shown in FIG. 1.
Figure 7:
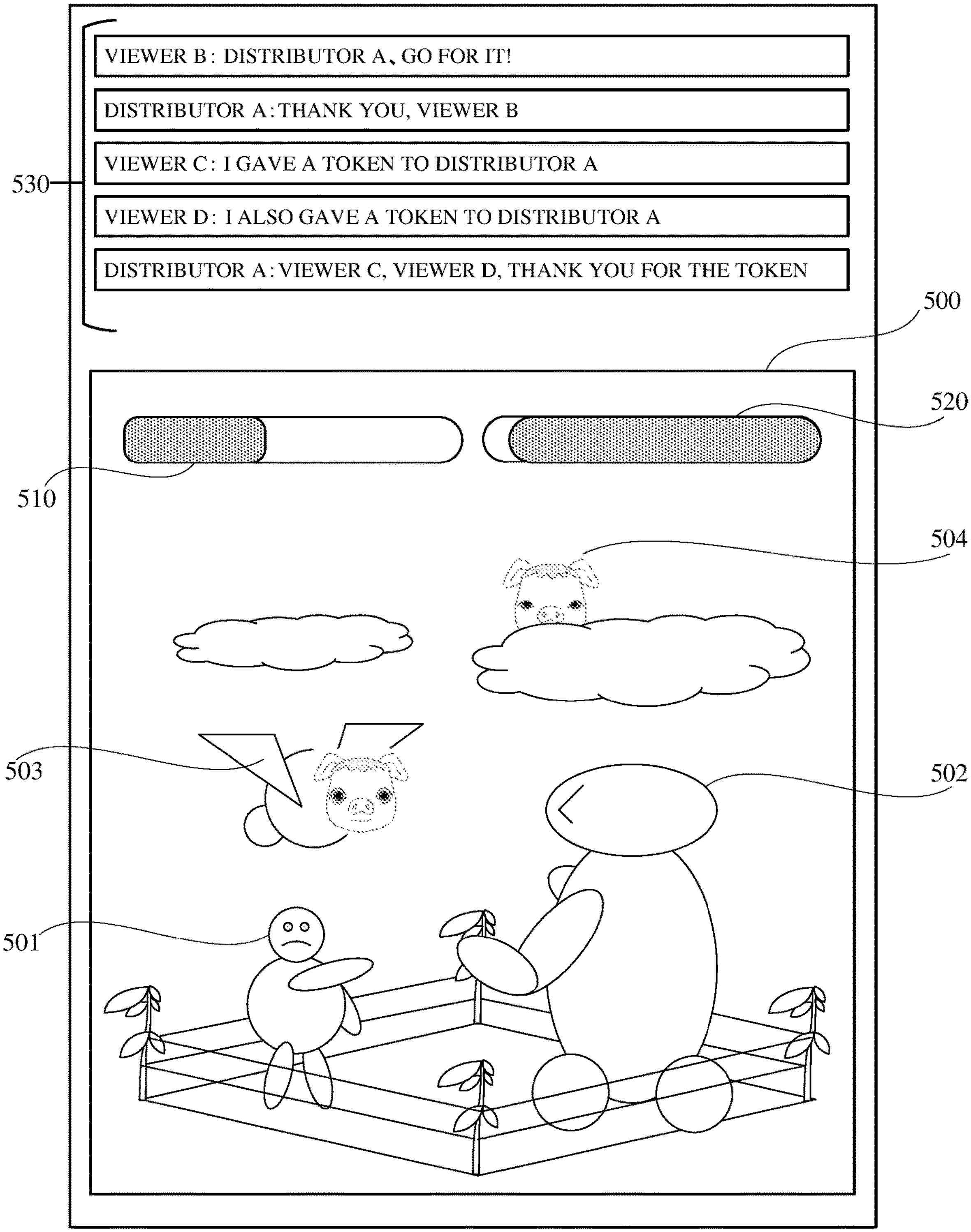
FIG. 7 is a view showing an example of a second video displayed on the terminal device used in the video distribution system shown in FIG. 1.

Next, the overall operation executed in the video distribution system 1 having the above-mentioned configuration will be described with reference to FIGS. 5A to 7. FIGS. 5A and 5B are flowcharts showing an example of the video performed in the video distribution system 1 shown in FIG. 1. FIG. 6 is a view showing an example of the first video displayed on the terminal device 10 used in the video distribution system 1 shown in FIG. 1. FIG. 7 is a view showing an example of the second video displayed on the terminal device 10 used in the video distribution system 1 shown in FIG. 1.

First, referring to FIG. 5A, in step (hereinafter referred to as "ST") 602, in response to the operation of the distributor (here, for example, the distributor A), the terminal device 10 (here, for example, the terminal device 10A of the distributor A) starts and executes the video distribution application.

Next, in ST604, the terminal device 10A of the distributor A generates the first video including an animation of an avatar of the distributor A on the basis of the motion data regarding the motion of the distributor A. Thus, as illustrated in FIG. 6, a first video 410 including an animation of an avatar 400 of the distributor A is displayed on the display unit 170 of the terminal device 10A of the distributor A.

In ST604, the terminal device 10A of the distributor A transmits the generated first video 410 to the distribution server device 20*a* of the server system 20A. From the terminal device 10 of each viewer having accessed the distribution server device 20*a* by executing the video viewing application, the distribution server device 20*a* can receive a request signal for requesting the first video 410 distributed by the terminal device 10A of the distributor A. In response to this request signal, the distribution server device 20*a* can distribute, to the terminal device 10 of each viewer, the first video 410 received from the terminal device 10A of the distributor A. In this manner, the first video 410 as illustrated in FIG. 6 is displayed also on the display unit 170 of the terminal device 10 of each viewer.

Next, in ST606, a case is assumed in which a viewer (here, the viewer B) viewing the first video 410 distributed by the terminal device 10A of the distributor A gives (gifts) a token (token G1 as an example here) to the distributor A. By operating the user interface unit 190 of the terminal device 10B (here, the terminal device 10B of the viewer B), the viewer B can select (purchase) the token G1 from among a plurality of preset tokens, and can select a command for gifting the token G1 to the distributor A. Thus, the terminal device 10B of the viewer B can transmit, to the token/comment API server device 20*d* of the server system 20A (via the distribution server device 20*a*), token data indicative of gifting the token G1 to the distributor A. This token data can include, for example, recipient identification data for identifying the recipient (in this case, the distributor A) of the token, token identification data for identifying content of the token (in this case, the token G1), and sender identification data for identifying the sender (in this case, for example, the viewer B) of the token.

By operating the terminal device 10B, the viewer B can also transmit a comment to the distributor A. In this case, the terminal device 10B of the viewer B can transmit the comment data to the token/comment API server device 20*d* of the server system 20A (via the distribution server device 20*a*). The comment data can include recipient identification data for identifying the recipient (in this case, the distributor A) of the comment, comment content data (e.g., a comment, "Go for it") regarding the content of the comment, and sender identification data for identifying the sender (in this case, the viewer B) of the comment.

Next, in ST608, the token/comment API server device 20*d* of the server system 20A transmits, to the terminal device 10A of the distributor A without delay (or every unit time), the token data and/or comment data received from the terminal device 10B of the viewer B via the distribution server device 20*a*. Thus, the token and comment corresponding to the received token data and/or comment data are displayed on the display unit 170 of the terminal device 10A of the distributor A. The token/comment API server device 20*d* of the server system 20A stores the received token data and/or comment data in the first DB server device 20*b*.

Next, in ST610, a case is assumed in which the distributor A transmits a comment to all viewers or a specific viewer viewing the first video 410. The distributor A can comment to all or a specific viewers by operating the user interface unit 190 of the terminal device 10A of the distributor A. That is, the terminal device 10A of the distributor A can transmit the comment data to the token/comment API server device 20*d* of the server system 20A. The comment data in this case can also include the above-mentioned recipient identification data, comment content data, and sender identification data.

Next, in ST612, the token/comment API server device 20*d* of the server system 20A transmits, to the distribution server device 20*a*, the comment data received from the terminal device 10A of the distributor A, and the distribution server device 20*a* distributes this comment data to the terminal device 10 of each viewer. The token/comment API server device 20*d* stores the received comment data in the first DB server device 20*b*.

Next, in ST614, the distribution server device 20*a* of the server system 20A manages the distribution related data regarding the first video 410 associated with the series of processes of ST604 to ST612. The distribution server device 20*a* can recognize all the distribution of the first video 410 and the transmission/reception of token data and/or comment data between the terminal device 10A of the distributor A and the terminal device 10 of each viewer. Thus, the (distribution management unit 230 of) distribution server device 20*a* can manage (acquire) various distribution related data (distribution action data and distributor status data) such as when, how many hours, and which (how many) viewer's terminal device 10 the first video 410 is distributed (or have been distributed) to, the number of tokens received by distributor A, the number of comments received by distributor A, and the number of times for which the distributor A transmitted comment. The distribution server device 20*a* stores the distribution related data on each user regarding the first video 410 in the first DB server device 20*b*. An example of distribution related data regarding the distributor A has been described above. Since a user (as a distributor and as a viewer) using the video distribution system 1 is given individual identification data (e.g., identification ID that can be the recipient identification data and the sender identification data. That is, the user can sometimes become a distributor and sometimes a viewer by being given individual identification ID), the distribution server device 20*a* (or the server system 20A) can manage the distribution related data for each distributor, and store the distribution related data for each distributor in the first DB server device 20*b*. The same applies to the distribution related data regarding the second video.

ST602 to ST614 described above are a series of operations that distributes the first video 410 from the terminal device 10A of the distributor A. ST614 does not necessarily have to be executed after ST612, and each time the operations of ST604 to ST612 are executed, distribution related data corresponding to the operations may be managed (acquired) and the distribution related data may be stored in the first DB server device 20*b*.

Next, in ST616, when the distributor A taps or the like an icon 420 of "Game" (see FIG. 6) displayed on the display unit 170 of the terminal device 10A of the distributor A, the terminal device 10A of the distributor A executes the browser function equipped on the video distribution application. Thus, in ST618, the terminal device 10A of the distributor A can access the web server device 20B in a state of having executed the video distribution application (e.g., having distributed the first video 410 to the terminal device 10 of each viewer). Therefore, the terminal device 10A of the distributor A can receive, from the web server device 20B, the HTML5 document in which the game program is incorporated.

Next, FIG. 5B is referred to. In ST620, the terminal device 10A of the distributor A can generate a video (second video) regarding the game by executing the game program incorporated in the received HTML5 document. FIG. 7 shows an example of a second video 500 thus generated by the terminal device 10A of the distributor A.

Next, in ST622, when the terminal device 10A of the distributor A inquires the distribution server device 20*a* of the server system 20A for the distribution related data, the distribution server device 20*a* reads out at least one piece of distribution related data regarding the distributor A stored in the first DB server device 20*b* and/or the second DB server device 20*c*. Thus, the terminal device 10A of the distributor A can receive the at least one piece of distribution related data from the distribution server device 20*a*. Note that the transmission of the distribution related data from the distribution server device 20*a* to the terminal device 10A of the distributor A does not necessarily have to be on the basis of the above-mentioned inquiry from the terminal device 10A of the distributor A, and may be automatically performed at predetermined time intervals, for example, from the distribution server device 20*a* to the terminal device 10A of the distributor A.

In this ST622, in response to the inquiry from the terminal device 10A of the distributor A, the distribution server device 20*a* may read out only at least part of the distribution related data regarding the first video 410 stored in the first DB server device 20*b*, may read out only at least part of the distribution related data regarding the second video 500 stored in the second DB server device 20*c*, or may read out both of them. The distribution related data regarding the second video 500 stored in the second DB server device 20*c* is stored in ST636, which will be described later. That is, the distribution related data regarding the second video 500 does not exist at all when the user (may be as a distributor or may be as a viewer) uses the video distribution system 1 for the first time, but gradually increases as the user uses the video distribution system 1 many times. The same applies to the distribution related data regarding the first video 410.

Next, in ST624, the terminal device 10A of the distributor A having received the distribution related data on the distributor A from the distribution server device 20*a* calculates the control parameter related to the selected game object to be controlled from among the plurality of game objects used in the game on the basis of (at least a part of) the received distribution related data. Here, the selected game object to be controlled can include at least one game object acquired and/or operated by the distributor A in the game. The at least one game object to be "acquired" or "operated" by the distributor A in the game can include an item, equipment, a point, a reward, a coin, a card, a character, and/or an avatar (including an avatar of the distributor A). The details of the calculation of the control parameters related to the selected game object will be described later in a specific example of the second video 500.

Thus, in ST626, the terminal device 10A of the distributor A can generate the second video (game) 500 (at this time, the display unit 170 of the terminal device 10A of the distributor A displays the second video 500) in which the control parameters related to the selected game object are calculated, and can distribute the generated second video 500 to the terminal device 10 of each viewer via the server system 20A (distribution server device 20*a*). The details of the game screen on which the control parameters related to the selected game object are calculated will be described later in the specific example of the second video.

When transmitting the second video 500 generated in ST626 to the distribution server device 20*a* of the server system 20A, the terminal device 10A of the distributor A may stop the transmission of the first video 410 to the distribution server device 20*a*, or may transmit the first video 410 together with the transmission of the second video 500. The distribution server device 20*a* distributes, to the terminal device 10 of each viewer receiving the first video 410 by executing the video viewing application, the second video 500 received from the terminal device 10A of the distributor A (note that in a case of having received not only the second video 500 but also the first video 410 from the terminal device 10A of the distributor A, the distribution server device 20*a* may transmit, to the terminal device 10 of each viewer, only the second video 500 or both the second video 500 and the first video 410). Thus, the second video 500 can be displayed also on the display unit 170 of the terminal device 10 of each viewer (in a state of being covered on the first video 410 as illustrated in FIG. 6 and hiding the first video 410).

ST622 to ST626 are provided between ST620 and ST628 for convenience in FIG. 5B. However, they are not limited thereto, and may be executed at predetermined time intervals, for example, regardless of the order of processing, while the terminal device 10A of the distributor A is executing a game and distributes the second video 500 to the terminal device 10 of the viewer.

Next, in ST628, a case is assumed in which the viewer (here, viewer C) viewing the second video (game) 500 distributed by the terminal device 10A of the distributor A gives (gifts) a token (token G2 as an example here) to the distributor A. By operating the user interface unit 190 of the terminal device 10C (here, the terminal device 10C of the viewer C), the viewer C can select (purchase) the token G2 from among a plurality of preset tokens, and can select a command for gifting the token G2 to the distributor A. Thus, the terminal device 10C of the viewer C can transmit, to the token/comment API server device 20*d* of the server system 20A (via the distribution server device 20*a*), token data indicative of gifting the token G2 to the distributor A. This token data can include, for example, recipient identification data for identifying the recipient (in this case, the distributor A) of the token, token identification data for identifying the token (in this case, the token G2), and sender identification data for identifying the sender (in this case, the viewer C) of the token.

By operating the terminal device 10C, the viewer C can also transmit a comment to the distributor A. In this case, the terminal device 10C of the viewer C can transmit the comment data to the token/comment API server device 20*d* of the server system 20A (via the distribution server device 20*a*). The comment data can include recipient identification data for identifying the recipient (in this case, the distributor A) of the comment, comment content data (e.g., a comment, "I'm rooting for you") regarding the content of the comment, and sender identification data for identifying the sender (in this case, the viewer C) of the comment.

Next, in ST630, the token/comment API server device 20*d* of the server system 20A transmits, to the terminal device 10A of the distributor A without delay (or every unit time), the token data and/or comment data received from the terminal device 10C of the viewer C via the distribution server device 20*a*. Thus, the token and comment corresponding to the received token data and/or comment data are displayed on the display unit 170 of the terminal device 10A of the distributor A. The token/comment API server device 20*d* of the server system 20A stores the received token data and/or comment data in the second DB server device 20*c*.

Next, in ST632, a case is assumed in which the distributor A transmits a comment to all viewers or a specific viewer viewing the second video (game) 500. The distributor A can comment to all or a specific viewers by operating the user interface unit 190 of the terminal device 10A of the distributor A. That is, the terminal device 10A of the distributor A can transmit the comment data to the token/comment API server device 20*d* of the server system 20A. The comment data in this case can also include the above-mentioned recipient identification data, comment content data, and sender identification data.

Next, in ST634, the token/comment API server device 20*d* of the server system 20A transmits, to the distribution server device 20*a*, the comment data received from the terminal device 10A of the distributor A, and the distribution server device 20*a* distributes this comment data to the terminal device 10 of each viewer. The token/comment API server device 20*d* stores the received comment data in the second DB server device 20*c*.

Next, in ST636, the distribution server device 20*a* of the server system 20A manages the distribution related data regarding the second video 500 associated with the series of processes of ST626 to ST634. The distribution server device 20*a* can recognize all the distribution of the second video 500 and the transmission/reception of token data and/or comment data between the terminal device 10A of the distributor A and the terminal device 10 of each viewer. Thus, the (distribution management unit 230 of) distribution server device 20*a* can manage (acquire) various distribution related data (distribution action data and distributor status data) such as when, how many hours, and which (how many) viewer's terminal device 10 the second video 500 is distributed (or have been distributed) to, the number of tokens received by distributor A, the number of comments received by distributor A, the number of times for which the distributor A transmitted comment, the game progress data by the distributor A, and the game setting data by the distributor A. The distribution server device 20*a* stores the distribution related data on each user regarding the second video 500 in the second DB server device 20*c*. An example of distribution related data regarding the distributor A has been described above. Since a user (as a distributor and as a viewer) using the video distribution system 1 is given individual identification data (e.g., identification ID that can be the recipient identification data and the sender identification data. That is, the user can sometimes become a distributor and sometimes a viewer by being given individual identification ID), the distribution server device 20*a* (or the server system 20A) can manage the distribution related data for each distributor, and store the distribution related data for each distributor in the second DB server device 20*c*.

Next, in ST638, if the terminal device 10A of the distributor A continues the game, it is possible to repeat the processing in and after ST622 mentioned above. On the other hand, if the terminal device 10A of the distributor A does not continue the game, the processing ends.

5. Specific Example of Second Video 500

Next, a specific example of the second video 500 will be described with reference to FIGS. 7 and 8. FIG. 8 is a view showing an example of calculation data included in an data table. FIG. 7 shows, as an example, a scene is shown in which the second video 500 regarding a fighting game (one type of action game) being played by a certain distributor (here, the distributor A) is displayed on the terminal device 10A of the distributor A and displayed on the terminal device 10 of each viewer by ST626 mentioned above.

In this game, as shown in FIG. 7, the distributor A plays against a foe character 502 by operating an avatar (or character) 501 of the distributor A. The avatar 501 of the distributor A basically aims to defeat the foe character 502 by performing various attacks such as punches and kicks. The foe character may be preset in the game program, or may be an avatar of another distributor (e.g., distributor X) if the game is a fighting game between a plurality of distributors.

The terminal device 10A of the distributor A can control at least one game object used in this game on the basis of the distribution related data received from the distribution server device 20*a* of the server system 20A in ST622 described above. Specifically, the terminal device 10A of the distributor A can first extract a game object to be controlled ("selected game object") from among a plurality of game objects used in the game. The terminal device 10A of the distributor A can calculate the control parameter related to the selected game object on the basis of the received distribution related data.

The distribution related data received by the terminal device 10A of the distributor A in ST622 described above can include at least one of the following examples. It should be noted that the following examples may be any of the latest data starting from the present, data related to all the accumulated data traced back for a predetermined period (e.g., a week or a month), and the best data.

(a) Distribution Action Data (e.g., Including the Following Data) Regarding the Distribution Action by the Distributor A The distribution action data includes data regarding the distribution frequency of the distributor A and data regarding the distribution time slot distributed by the distributor A associated with the distribution of the first video 410 and/or the second video 500. Here, the distribution frequency includes the number of distribution days (e.g., the total number of days of distribution in a period of one week) for a predetermined number of days, the total distribution time (e.g., the total distribution time of distribution in a period of one week) for a predetermined number of days, and the number of consecutive distribution days in the case of distribution in consecutive days (in the case of distribution for three consecutive days, the number of consecutive distribution days becomes “3”). In the case of distribution in consecutive days, the distribution frequency includes both the case of distribution in different time slots of consecutive days and the case of distribution in the same time slot (e.g., 21 o’clock to 22 o’clock) of consecutive days (such a case can be referred to as fixed-hour distribution). The data regarding the distribution time slot can include data regarding which of the three time slots of 0 o’clock to 8 o’clock, 8 o’clock to 16 o’clock, and 16 o’clock to 24 o’clock in a certain day, for example, distribution was performed.

(b) Distributor Status Data (e.g., Includes the Following Data) Regarding the Distributor (e.g., Distributor A)

The distributor status data can include data calculated on the basis of token data and/or comment data transmitted/received by the terminal device 10A of the distributor A. More specifically, focusing on the relationship with the viewer receiving the first video 410 and/or the second video 500 of the distributor A, the distributor status data can include data (distributor status data) such as the number of times of being given (receiving) a token, the number of times of being given (receiving) a comment, and the number of times of transmitting a comment that are calculated on the basis of the comment data (first transmission information) transmitted from the terminal device 10 of the distributor A to the terminal device 10 of the viewer and/or the token data and/or the comment data (reception data) received by the terminal device 10 of the distributor A from the terminal device 10 of the viewer via the server device 20 (distribution server device 20*a*).

The distributor status data can also include data (distributor status data) such as the number of times of giving (transmitting) a token, the amount of money for purchase of a token, and the number of times of transmitting a comment that are calculated on the basis of the token data and/or comment data (second transmission information) transmitted from the terminal device 10A of the distributor A (in this case, the terminal device 10A of the distributor A becomes the terminal device 10 of the viewer) to the terminal device 10 of the distributor B in the case where the distributor A becomes a viewer in another scene (in the case where there is a distributor B different from the distributor A, and the distributor A becomes a viewer viewing the first video 410 and/or the second video 500 distributed by the distributor B).

The distributor status data can include game progress data by the distributor A regarding the second video 500. The game progress data can include the game progress in a role-playing game or the like, any title (badge, level, and the like) given to the user in accordance with the game score or the game progress (achievement level), and record data in an event or tournament of a sports game, a fighting game, or the like (these pieces of data are also distributor status data).

Regarding distribution of the first video 410 and/or the second video 500, the distributor status data can also include data (these pieces of data are also distributor status data) such as the number of times of performing together with another distributor, the total number of viewers viewing (viewed) the first video 410 and/or the second video 500 currently distributed and/or previously distributed, the number of following viewers, and evaluation data such as “Like!” from the viewers regarding the first video 410 and/or the second video 500.

In order for the terminal device 10A of the distributor A to extract a selected game object to be controlled from among the plurality of game objects, in one embodiment, an data table 1000 (see FIG. 8) received from the web server device 20B and/or the (distribution server device 20*a* of the) server system 20A can be used. This data table can include calculation data (calculation instructions) indicating, in association with each game, how to calculate (mainly, but not limited to, increase or decrease) which control parameter of each selected game object, on the basis of which distribution related data. The terminal device 10A of the distributor A can identify at least one selected game object by searching the data table by using the currently executed game as a search key, and can identify how to calculate the control parameter related to the selected game object. Note that the terminal device 10A of the distributor A may identify at least one selected game object related to the currently executed game, identify in advance distribution related data that becomes an assumption for calculating the selected game object, and make an inquiry to the distribution server device 20*a* for that effect so as to receive only the distribution related data from the distribution server device 20*a*.

With reference to FIG. 8, for example, in a fighting game A (see FIG. 7, for example), an avatar of the distributor (in FIG. 7, the avatar 501 of the distributor A) and a friend character are extracted as selected game objects. In the data table, “attack power” and “defense power” are set as control parameters related to the avatar of the distributor, and “number of appearances” is set as control parameters related to the friend character. Regarding the distribution related data on the distributor A, the “attack power” is calculated so that the “attack power” of the distributor’s avatar becomes “double” if the number of consecutive distribution days is “3” to “6”, and the “attack power” of the distributor’s avatar becomes “5 times” if the number of consecutive distribution days becomes “7 or more”.

With reference to FIG. 8, regarding the distribution related data on the distributor A, one friend character is added (given) when the accumulated total number of received tokens (here, it may be regarding the distribution of the first video 410, may be regarding the distribution of the second video 500, or may be regarding the distribution of both the first video 410 and the second video 500) becomes 100 or more. Regarding the distribution related data of the distributor A, the accumulated value of received tokens may be used in place of the accumulated total number of received tokens described above (or together with the accumulated total number of received tokens). The “value” in this case means points, purchase amounts, and the like that are associated with each token in advance. Therefore, the “accumulated value of received tokens” means the accumulation of the points and purchase amounts associated with each received token.

Furthermore, with reference to FIG. 8, regarding the distribution related data on the distributor A, one friend character is added (given) when the accumulated total number of received comments (here, it may be regarding the distribution of the first video 410, may be regarding the distribution of the second video 500, or may be regarding the distribution of both the first video 410 and the second video 500) becomes 500 or more. Regarding the distribution related data of the distributor A, the accumulated total number of specific keywords included in the received comments, the accumulated total number of characters of the received comments, or the like may be used in place of the accumulated total number of received comments described above (or together with the accumulated total number of received comments). In this case, by registering a specific keyword in advance in the server system 20A or the terminal device 10A of the distributor A, the server system 20A or the terminal device 10A of the distributor A can manage the specific keyword.

Regarding the distribution related data of the distributor A, in place of the accumulated total number of received comments described above (or together with the accumulated total number of received comments), the accumulated total number of received comments that are classified into "positive" by using a machine-learned computer program that can classify certain character information into any one of, for example, "positive", "neutral", and "negative" may be used as the distribution related data. In this case, the machine-learned program is installed in the server system 20A or the terminal device 10A of the distributor A. Regarding the distribution related data of the distributor A, the number of characters of the received or distributed comment text can be used as the distribution related data. In this case, the large number of characters in the comment body text can mean that there is a viewer enthusiastic about the distributor A or the second video distributed by the distributor A.

In FIG. 7, the above-mentioned two conditions (e.g., the accumulated total number of received tokens is 100 or more and the accumulated total number of received comments is 500 or more) regarding tokens and comments are satisfied, and two friend characters 503 and 504 are displayed on the game. The friend character means a character that plays (fights) against the foe character 502 in favor of the avatar of the distributor.

The above-mentioned "attack power" becoming "double" or "5 times" means that in FIG. 7, when the avatar 501 of the distributor attacks the foe character 502, an energy gauge 520 of the foe character is reduced by double or 5 times compared to the normal state. The "defense power" becoming "double" or "5 times" as shown in FIG. 8 means that in FIG. 7, when the avatar 501 of the distributor is attacked by the foe character 502, an energy gauge 510 of the avatar 501 of the distributor is reduced by only ½ or ⅕ times the normal state.

As shown in FIG. 8, the selected game object described above is not limited to the avatar of the distributor or the like, and can be various things depending on the type of game, for example, such as equipment, a point, a reward, a coin, and a card. The distribution related data used as the basis for the calculation such as "consecutive distribution days" and "accumulated total number of received tokens" shown in FIG. 8 for example may be only those regarding the first video 410, may be only those regarding the second video 500, or may be the total (sum) of both those regarding the first video 410 and those regarding the second video 500.

It is possible to regard that calculating the control parameters related to the selected game object on the basis of at least one piece of distribution related data means, in other words, occurrence of at least one of the following events that would be more advantageous for the distributor.

- Reduce the difficulty level of the game.
- Allow the distributor to acquire more game objects (characters, points, rewards, and the like).
- Allow the distributor to acquire more valuable game objects (rarer items, higher points and rewards, and the like).

In particular, the higher the frequency of distribution by the distributor becomes and/or the more frequent tokens and comments are exchanged associated with the distributor, the more such events occur and the more advantageously the distributor can proceed with the game. Also in a case where the distributor distributes the game in all time slots (e.g., three time slots of 0 o'clock to 8 o'clock, 8 o'clock to 16 o'clock, and 16 o'clock to 24 o'clock) in a certain day (such a case can be referred to as designated time distribution), the above-mentioned event occurs and the distributor can proceed with the game more advantageously though the frequency of distribution by the distributor increases.

As shown in FIG. 7, in distributing the second video (game) 500, comment data (ST628 to ST634 described above) exchanged between the terminal device 10A of the distributor A and the terminal device 10 of each viewer is displayed in a comment region 530 on the display unit 170 of the terminal device 10A of the distributor A and the terminal device 10 of each viewer.

6. Variations

In the various embodiments described above, the case in which the terminal device 10A of the distributor A distributes the second video 500 regarding the fighting game has been described. However, the terminal device 10A of the distributor A can distribute the second video 500 regarding a discretionary game. The discretionary game can include, for example, action games, simulation games, role-playing games, card games, puzzle games, shooter games, quiz games, social simulation games, board games, loot box games, and/or sports games, without limiting to them.

In one embodiment as described above with reference to FIGS. 7 and 8, the selected game object is an avatar of the distributor and friend character as an example, but the present invention is not limited to this, and may be, for example, the foe character 502. In this case, if the control parameter of the foe character 502 is "attack power", the attack power of the foe character 502 may be calculated to be ½ or ¼.

The calculation of control parameter shown in FIG. 8 is merely an example, and may be set in more detail.

In the various embodiments described above, the case in which in order to generate a video (second video 500) regarding the game, the terminal device 10 of the distributor receives, from the web server device 20B, an HTML (HTML5, in particular) document in which a game program is incorporated has been described. However, instead of the configuration of receiving, from the web server device 20B, an HTML document in which a game program is incorporated, the terminal device 10 of the distributor can also generate the second video 500 including a screen regarding the game by executing the installed video distribution application and receiving necessary data from a data server device not illustrated (or a certain server device not illustrated included in the server system 20A).

In the various embodiments described above, the terminal device 10 of the distributor may be a smartphone or the like used by a general user or may be a dedicated terminal device placed in a studio or the like. In this case, at least one server device of the distribution server device 20*a*, the first DB server device 20*b*, the second DB server device 20*c*, and the token/comment API server device 20*d* included in the server system 20A (furthermore, the web server device 20B) may be provided together with the dedicated terminal device in the studio or the like.

In the various embodiments described above, the case in which, on the basis of the motion data regarding the motion of the distributor and voice data regarding the voice of the distributor, the terminal device 10 of the distributor generates the first video 410 including the animation including the avatar of this distributor, and transmits the first video 410 to the server device 20 (server system 20A) has been described. However, the terminal device 10 of the distributor may transmit the motion data regarding the motion of the distributor and the voice data regarding the voice of the distributor to the server device 20, and the server device 20 may generate the first video 410 on the basis of the motion data and the voice data and distribute the first video 410 to the terminal device 10 of each viewer. This can reduce the amount of data transmitted from the terminal device 10 of the distributor to the server system 20A.

Alternatively, the terminal device 10 of the distributor may transmit the motion data regarding the motion of the distributor and the voice data regarding the voice of the distributor to a separately provided server device, this separate server device may generate the first video 410 on the basis of the motion data and the voice data and return the first video 410 to the terminal device 10 of the distributor, and the terminal device 10 of the distributor may transmit the received first video 410 to the server device 20 (server system 20A). This can reduce the amount of data transmitted from the terminal device 10 of the distributor to the separately provided server device 20.

Furthermore, the terminal device 10 of the distributor may transmit the motion data regarding the motion of the distributor and the voice data regarding the voice of the distributor to the terminal device 10 of each viewer via the server device 20 (server system 20A) or the separately provided server device, and the terminal device 10 of each viewer may generate (render) and display the first video 410 on the basis of the received motion data and voice data (this technique is sometimes referred to as "client rendering"). This can reduce the amount of data transmitted from the server device 20 (server system 20A) or the separately provided server device to the terminal device 10 of each viewer.

In any of the above cases, the generation of the first video 410 on the basis of the motion data and the voice data transmitted by the terminal device 10 of the distributor may be shared by at least two devices from among the server device 20, the separate server device, and the terminal device 10 of each viewer. In either case, the device responsible for generation of the video can receive and store, from, for example, the server device 20 or the like, data (image and the like) regarding the avatar to move.

In the various embodiments described above, the motion of each of the terminal devices 10 described above can be executed similarly by the studio unit 30 having a similar configuration to that of the terminal device 10. In this case, the studio unit 30A illustrated in FIG. 1 can have a similar function to that of the terminal device 10 for distributing a video. Similarly, the studio unit 30B illustrated in FIG. 1 can have a similar function to that of the terminal device 10 for viewing a video. The motion of each of the server devices 20 mentioned above can be executed also by the studio unit 30 having the similar configuration to that of the server device 20.

In general, if a game program is installed in the terminal device 10, or if a game program is incorporated in a video distribution application installed in the terminal device 10, execution of a new game requires the terminal device 10 to have a new game program or video distribution application installed. In this case, from the point of view of the creator of the game program, it is necessary to prepare a game program corresponding to each of a plurality of operating systems, and thus there is a problem of an increase in the man-hour required for the creation of the game program. On the other hand, from the point of view of the user, it is necessary to download a new game program and/or to update an existing game program in order to obtain a new game, and thus there is a problem of requiring communication load, communication cost, time, and labor.

On the other hand, according to the technology disclosed in the present application, in order to execute the game, the terminal device 10 of the distributor can call the browser function incorporated in the video distribution application, instead of executing the game program installed in this terminal device 10, can receive a web page (HTML document, particularly HTML5 document) from the web server device 20B by using this browser function, and can execute the game program incorporated in the web page. This allows the terminal device 10 of the distributor to easily execute the new game. Therefore, when providing a new game, the creator of the game program only has to incorporate the new game program into the web page (HTML document, particularly HTML5 document) transmitted by the web server device 20B, and it is hence possible to reduce the number of man-hours required for creation of the new game program. Since the user does not need to download a new game program or the like in order to be provided with the new game, it is possible to suppress communication load, communication cost, time, and labor.

In the above-described various embodiments, during executing the video distribution application, communicating with the server system 20A, and distributing the first video 410, the terminal device 10 of the distributor executes the browser function incorporated in this video distribution application, whereby the terminal device 10 of the distributor can execute the program included in the web page received from the web server device 20B, and can distribute the second video 500 to the terminal device 10 of each viewer via the server system 20A. However, such configuration is merely an example.

For example, the terminal device 10 of the distributor can also distribute the second video 500 without distributing the first video 410. Specifically, in the first example, by executing the video distribution application and executing the browser function incorporated in the video distribution application, the terminal device 10 of the distributor can execute the program included in the web page received from the web server device 20B (without distributing the first video 410 by using the video distribution application) and distribute the second video 500 to the terminal device 10 of each viewer via the server system 20A. In this configuration, the distributor A does not distribute the first video 410 on the basis of the performance of the distributor himself (stop the distribution of the first video 410) but can distribute only the second video 500 showing the situation of the game that the distributor himself executes.

In the second example, by executing the installed game application and accessing the server system 20A, which also functions as a game server device, the terminal device 10 of the distributor can distribute the screen of the game being executed to the terminal device 10 of each viewer via this server system 20A. Also in these first and second examples, as in the various embodiments described above, the terminal device 10A of the distributor A can generate the second video 500 by using the distribution related data received from the server system 20A.

In a third example, the terminal device 10 of the distributor can transmit operation data of the distributor to the server system 20A or the web server device 20B without generating the game screen (second video 500). In this case, the server system 20A or the web server device 20B generates the game screen (second video 500) by using the operation data, and the server system 20A can distribute the generated second video 500 to the terminal device 10 of each viewer. In this third example, when the web server device 20B generates the second video 500, the web server device 20B can use distribution related data received from the server system 20A (distribution server device 20*a*). When the server system 20A generates the second video 500, the server system 20A can use distribution related data managed and stored by the server system 20A itself.

The various embodiments mentioned above can be used in combination with one another as long as no contradiction or inconvenience occurs.

7. Effects of Various Embodiments

As described above, according to various aspects including an embodiment and a variation, it is possible to generate the second video in which a control parameter related to a selected game object is calculated on the basis of at least one piece of distribution related data regarding the distribution of each distributor. Thus, the distributor is induced to use the service of the video distribution system 1 as a distributor for the purpose of proceeding with his own game more advantageously. The distributor is induced not only to use the video distribution system 1 as a distributor but also to use the video distribution system 1 as a viewer.

Thus, the technology disclosed in the present application can provide a computer program, a method, a server device, a terminal device and a system that can induce users to use a service regarding video distribution as a distributor or as a viewer.

Also, according to the technology disclosed in the present application, there is no need to create or draw an additional game object to be the selected game object in order to calculate the control parameter, because calculating the control parameter related to the selected game object is automatically executed on the basis of actual actions, including but not limited to distribution of the first video and/or the second video, by the distributor. Therefore, that enables decreasing loads on the video distribution system 1, specifically decreasing CPU/memory loads in the server device or the terminal device of the distributor or the viewer. Also, that enables all users of the video distribution system 1 to easily view the game through a small display of a smart phone or the like.

Further, according to the technology disclosed in the present application, a viewer is able to view the first video and/or the second video distributed by a distributor (or distributors) which is/are the viewer's favorite at any time the viewer wants, because the distributor (or the distributors) is/are motivated to frequently distribute the first video and/or the second video. Therefore, that enables decreasing communication network loads and decreasing CPU/memory loads in the server device or the terminal device of the distributor by eliminating access concentration to the server device or the terminal device of the distributor(s) by many viewers, who are trying to view the first video and/or the second video at the same time.

8. Various Aspects

The computer program according to the first aspect "causes, by being executed by at least one processor, the processor to function so as to distribute, to terminal devices of a plurality of viewers via a communication line, a first video including an animation of an avatar of a distributor generated on the basis of motion data regarding a motion of the distributor or the motion data, and a second video regarding a game generated on the basis of operation data regarding an operation of the distributor using a received web page, acquire at least one piece of distribution related data regarding the distribution, extract a selected game object to be controlled from among a plurality of game objects used in the game, and calculate a control parameter related to the selected game object on the basis of the at least one piece of distribution related data".

The computer program according to the second aspect, in which in the first aspect, "the at least one piece of distribution related data includes distribution action data regarding a distribution action of the distributor and/or distributor status data regarding the distributor".

The computer program according to the third aspect, in which in the second aspect, "the distribution action data includes a distribution frequency by the distributor and/or a distribution time slot for distribution by the distributor".

The computer program according to the fourth aspect, in which in the third aspect, "the distribution frequency is the number of distribution days by the distributor for a predetermined number of days and/or a total distribution time by the distributor for the predetermined number of days".

The computer program according to the fifth aspect, in which in the third aspect, "the distribution frequency is the number of continuous distribution days of distribution in consecutive days by the distributor".

The computer program according to the sixth aspect, in which in the fifth aspect, "the distribution frequency is the number of continuous distribution days of distribution in consecutive days in a same time slot by the distributor".

The computer program according to the seventh aspect, in which in the third aspect, "a plurality of the distribution time slots are set in advance within a same day".

The computer program according to the eighth aspect, in which in the second aspect, "the distributor status data includes first transmission data transmitted from the distributor's terminal device to the viewer's terminal device via the communication line in the distribution action and/or status data of the distributor calculated on the basis of reception data received by the distributor's terminal device from the viewer's terminal device via the communication line in the distribution action".

The computer program according to the ninth aspect, in which in the second aspect, "in a case where, in relation to another distributor's terminal device, the distributor's terminal device is used as the viewer's terminal device receiving the first video or the motion data and the second video distributed by said another distributor, the distributor status data includes the distributor's status data calculated on the basis of second transmission data transmitted from the distributor's terminal device to said another distributor's terminal device".

The computer program according to the tenth aspect, in which in the second aspect, "the distributor status data includes game progress data by the distributor".

The computer program according to the eleventh aspect, in which in any of the first to tenth aspects, "the at least one piece of distribution related data relates to the second video having been distributed".

The computer program according to the twelfth aspect, in which in any of the first to eleventh aspects, "the selected game object is the game object acquired by the distributor or operated by the distributor in the game".

The computer program according to the thirteenth aspect, in which in the twelfth aspect, "the specific game object includes an item, equipment, a point, a reward, a coin, a card, a character, and/or an avatar".

The computer program according to the fourteenth aspect, in which in any of the first to thirteenth aspects, "the processor includes a central processing unit (CPU), a microprocessor, and/or a graphics processing unit (GPU)".

The computer program according to the fifteenth aspect, in which in any of the first to fourteenth aspects, "the communication line includes the Internet".

The computer program according to the sixteenth aspect "causes, by being executed by at least one processor, the processor to function so as to receive, from a terminal device of a distributor via a communication line, a first video including an animation of an avatar of the distributor generated on the basis of motion data regarding a motion of the distributor or the motion data, and a second video regarding a game generated on the basis of operation data regarding an operation of the distributor using a received web page, and cause the second video to include a selected game object which is extracted as an object to be controlled from among a plurality of game objects used in the game and for which a related control parameter is calculated on the basis of at least one piece of distribution related data regarding distribution of the first video or the motion data and the second video by the distributor".

The computer program according to the seventeenth aspect, in which in the sixteenth aspect, "the processor includes a central processing unit (CPU), a microprocessor, and/or a graphics processing unit (GPU)".

The computer program according to the eighteenth aspect, in which in the sixteenth or seventeenth aspect, "the communication line includes the Internet".

The method according to the nineteenth aspect is "a method executed by at least one processor that executes a computer-readable instruction, the method including a step in which by executing the instruction, the processor distributes, to terminal devices of a plurality of viewers via a communication line, a first video including an animation of an avatar of a distributor generated on the basis of motion data regarding a motion of the distributor or the motion data, and a second video regarding a game generated on the basis of operation data regarding an operation of the distributor using a received web page, a step of acquiring at least one piece of distribution related data regarding the distribution, a step of extracting a selected game object to be controlled from among a plurality of game objects used in the game, and a step of calculating a control parameter related to the selected game object on the basis of the at least one piece of distribution related data".

The method according to the twentieth aspect, in which in the nineteenth aspect, "the processor includes a central processing unit (CPU), a microprocessor, and/or a graphics processing unit (GPU)".

The method according to the twenty-first aspect, in which in the nineteenth or twentieth aspect, "the communication line includes the Internet".

The method according to the twenty-second aspect is "a method executed by at least one processor that executes a computer-readable instruction, the method including a step in which by executing the instruction, the processor receives, from a terminal device of a distributor via a communication line, a first video including an animation of an avatar of the distributor generated on the basis of motion data regarding a motion of the distributor or the motion data, and a second video regarding a game generated on the basis of operation data regarding an operation of the distributor using a received web page, in which the second video includes a selected game object which is extracted as an object to be controlled from among a plurality of game objects used in the game and for which a related control parameter is calculated on the basis of at least one piece of distribution related data regarding distribution of the first video or the motion data and the second video by the distributor".

The method according to the twenty-third aspect, in which in the twenty-second aspect, "the processor includes a central processing unit (CPU), a microprocessor, and/or a graphics processing unit (GPU)".

The method according to the twenty-fourth aspect, in which in the twenty-second or twenty-third aspect, "the communication line includes the Internet".

The server device according to the twenty-fifth aspect is "a server device including at least one processor and causing the at least one processor to function so as to receive, from a terminal device of a distributor, a first video including an animation of an avatar of the distributor generated on the basis of motion data regarding a motion of the distributor or the motion data, and a second video regarding a game generated on the basis of operation data regarding an operation of the distributor using a received web page, and distribute, to terminal devices of a plurality of viewers via a communication line, the received first video or the motion data and the second video, in which the second video includes a selected game object which is extracted as an object to be controlled from among a plurality of game objects used in the game and for which a related control parameter is calculated on the basis of at least one piece of distribution related data regarding distribution of the first video or the motion data and the second video by the distributor".

The server device according to the twenty-sixth aspect, in which in the twenty-fifth aspect, "the processor includes a central processing unit (CPU), a microprocessor, and/or a graphics processing unit (GPU)".

The server device according to the twenty-seventh aspect, in which in the twenty-fifth or twenty-sixth aspect, "the communication line includes the Internet".

The server device according to the twenty-eighth aspect is "a server device including at least one processor, and the processor transmits a web page including a computer program via a communication line to a terminal device of a distributor configured so as to distribute, to terminal devices of a plurality of viewers via a communication line, a first video including an animation of an avatar of the distributor generated on the basis of motion data regarding a motion of the distributor or the motion data, and a second video regarding a game generated on the basis of operation data regarding an operation of the distributor using a received web page, in which the computer program causes a terminal device of the distributor to function so as to acquire at least one piece of distribution related data regarding the distribution, extract a selected game object to be controlled from among a plurality of game objects used in the game, and calculate a control parameter related to the selected game object on the basis of the at least one piece of distribution related data".

The server device according to the twenty-ninth aspect, in which in the twenty-eighth aspect, "the processor includes a central processing unit (CPU), a microprocessor, and/or a graphics processing unit (GPU)".

The server device according to the thirtieth aspect, in which in the twenty-eighth or twenty-ninth aspect, "the communication line includes the Internet".

The method according to the thirty-first aspect is "a method executed by at least one processor that executes a computer-readable instruction, the method including a step in which by executing the instruction, the processor receives, from a terminal device of a distributor, a first video including an animation of an avatar of the distributor generated on the basis of motion data regarding a motion of the distributor or the motion data, and a second video regarding a game generated on the basis of operation data regarding an operation of the distributor using a received web page, and a step of distributing, to terminal devices of a plurality of viewers via a communication line, the received first video or the motion data and the second video, in which the second video includes a selected game object which is extracted as an object to be controlled from among a plurality of game objects used in the game and for which a related control parameter is calculated on the basis of at least one piece of distribution related data regarding distribution of the first video or the motion data and the second video by the distributor".

The method according to the thirty-second aspect, in which in the thirty-first aspect, "the processor includes a central processing unit (CPU), a microprocessor, and/or a graphics processing unit (GPU)".

The method according to the thirty-third aspect, in which in the thirty-first or thirty-second aspect, "the communication line includes the Internet".

The method according to the thirty-fourth aspect is "a method executed by at least one processor that executes a computer-readable instruction, the method including a step in which by executing the instruction, the processor transmits a web page including a computer program via a communication line to a terminal device of a distributor configured so as to distribute, to terminal devices of a plurality of viewers via a communication line, a first video including an animation of an avatar of the distributor generated on the basis of motion data regarding a motion of the distributor or the motion data, and a second video regarding a game generated on the basis of operation data regarding an operation of the distributor using a received web page, in which the computer program causes a terminal device of the distributor to function so as to acquire at least one piece of distribution status information regarding the distribution, extract a selected game object to be controlled from among a plurality of game objects used in the game, and calculate a control parameter related to the selected game object on the basis of the at least one piece of distribution related data".

The method according to the thirty-fifth aspect, in which in the thirty-fourth aspect, "the processor includes a central processing unit (CPU), a microprocessor, and/or a graphics processing unit (GPU)".

The method according to the thirty-sixth aspect, in which in the thirty-fourth or thirty-fifth aspect, "the communication line includes the Internet".

II. Second Embodiment

1. Configuration of Video Distribution System

In short, the video distribution system of the present disclosure enables a user (hereinafter referred to as a "distributor") performing distribution to distribute, using his/her terminal device, a first video including an animation of an avatar (avatar object) generated based on motion data regarding the motion of the distributor and a second video regarding a game generated based on operation data regarding the operation of this distributor to a terminal device of a user (hereinafter referred to as a "viewer") viewing the video via a communication line. A first example will hereinafter be described with reference to FIGS. 9 to 12B.

Figure 9:
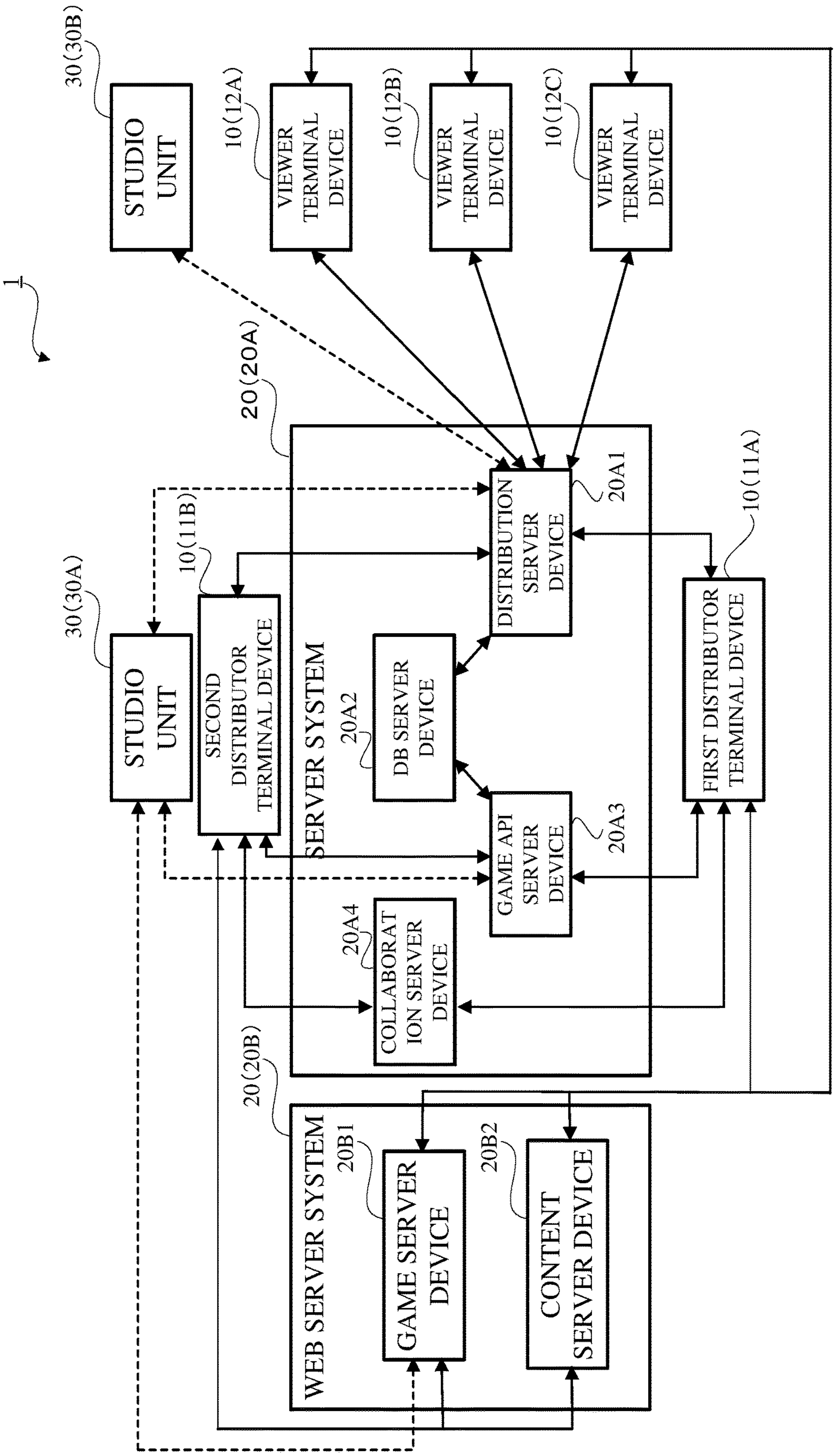
FIG. 9 is a block diagram showing an example of the configuration of the video distribution system according to an embodiment.

FIG. 9 is a block diagram showing an example of the configuration of the video distribution system according to an embodiment. As shown in FIG. 9, the video distribution system 1 can include a plurality of terminal devices 10 connected to a communication line (communication network) not illustrated, and one or a plurality of server devices 20 connected to the communication line. Each terminal device 10 can be connected to one or the plurality of server devices 20 via the communication line.

Note that as the plurality of terminal devices 10, FIG. 9 shows, for example, a first distributor terminal device 11A, a second distributor terminal device 11B, a viewer terminal device 12A, a viewer terminal device 12B, and a viewer terminal device 12C, but one or more terminal devices 10 other than them can be used similarly. In the following description, the first distributor terminal device 11A and the second distributor terminal device 11B shall sometimes be collectively referred to as a distributor terminal device 11X, and the viewer terminal devices 12A to 12C shall sometimes be collectively referred to as a viewer terminal device 12X. As one or the plurality of server devices 20, FIG. 9 shows, for example, server devices 20X and 20Y, but one or more server devices 20 other than them can be used similarly. The communication line not illustrated can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

In an embodiment, the video distribution system 1 can include one or more studio units 30 connected to a communication network. Each studio unit 30 can be connected to one or the plurality of server devices 20 or the plurality of terminal devices 10 via the communication line. Note that as one or more studio units 30, FIG. 9 shows, for example, studio units 30X and 30Y, but one or more studio units 30 other than them can be used similarly. Each studio unit 30 can have a similar function to that of the terminal device 10 or the server device 20 described later.

Hereinafter, in order to simplify the description, attention will be paid to a case where one or the plurality of server devices 20 transmit/receive a video or the like to/from each terminal device 10. In place of this or in addition to this, as will be described later, it is also possible for one or the plurality of server devices 20 to transmit/receive a video or the like to/from each studio unit 30. In place of this or in addition to this, as will be described later, it is also possible for the studio unit 30 to transmit/receive a video or the like to/from each terminal device 10.

1-1. Terminal Device 10

The plurality of terminal devices 10 can include, for example, the plurality of distributor terminal devices 11X (e.g., first distributor terminal device 11A and second distributor terminal device 11B) and one or more viewer terminal devices 12X (e.g., viewer terminals 12A to 12C). The distributor corresponding to the first distributor terminal device 11A is referred to as a first distributor, and the distributor corresponding to the second distributor terminal device 11B is referred to as a second distributor. In the following description, when the first distributor terminal device 11A of the plurality of distributor terminal devices 11X independently distributes a game, the second distributor terminal device 11B does not have to function as a terminal device that distributes the game, and may be configured to function similarly to the viewer terminal device 12X, for example.

By having a common configuration, each terminal device 10 can be any of a terminal device (distributor terminal device 11X) for distributing a video and a terminal device (viewer terminal device 12X) for viewing a video.

When operating as a terminal device (distributor terminal device) for distributing a video, by executing an installed video distribution application (may be middleware or a combination of an application and middleware. The same shall apply hereinafter), each terminal device 10 can acquire motion data regarding the motion of the distributor, and can transmit, to the server device 20 (distribution server system 20A1) via the communication line, a first video including an animation of a virtual character (avatar/avatar object) changed according to the acquired data. Such first video is distributed to the terminal device (viewer terminal device) 12X for receiving the video via the communication line by the server device 20 (distribution server system 20A1). Such viewer terminal device 12X can receive a video by executing an installed video viewing application (may be middleware or a combination of an application and middleware. The same shall apply hereinafter).

By executing a browser function incorporated in an installed video distribution application and/or by executing an installed web browser application, each terminal device 10 can receive a web page (e.g., HTML document) from the server device 20 (web server system 20B) and execute a game program included in this web page. By executing this game program, each terminal device 10 can generate a second video in which at least one game object is operated based on operation data regarding the operation of the distributor. In independent distribution and/or collaborative distribution (to be described later), the user can start the browser by using his/her own terminal device 10, receive game rendering data from the server device 20, and view the game via a game screen (Web View).

When operating as a distributor terminal device, by executing the video distribution application, each terminal device 10 can transmit the thus generated second video to the server device 20 (distribution server system 20A) via the communication line. Such second video is also distributed to the terminal device (viewer terminal device) 10 for receiving the video that executes the installed video viewing application via the communication line by the server device 20 (distribution server system 20A).

Furthermore, when operating as a distributor terminal device, by executing the above-described video distribution application, each terminal device 10 can receive, via the server device 20 (distribution server system 20A), from the viewer terminal device 12X viewing the second video (distributed by this distributor terminal device 11X), token data indicative of giving (gifting) a token to this distributor, and/or comment data indicative of transmitting a comment to this distributor.

On the other hand, when operating as a terminal device (viewer terminal device) for viewing a video, by executing the installed video viewing application, each terminal device 10 can receive, via the server device 20 (distribution server system 20A), the first video and/or the second video distributed by the distributor terminal device 11X.

When operating as a viewer terminal device, by executing the video viewing application, each terminal device 10 can transmit, to the first distributor terminal device 11A via the server device 20 (distribution server system 20A), token data indicative of giving a token to this distributor, and/or comment data indicative of transmitting a comment this distributor.

The above-mentioned video distribution application and the video viewing application can be installed and executed in each terminal device 10 as one integrated application or as separate applications.

Each terminal device 10 is any terminal device capable of executing such operation, and can include a smartphone, a tablet, a mobile phone (feature phone), and/or a personal computer, without limiting to them. Each terminal device 10 is configured to be capable of performing, for example, collaborative distribution (joint distribution/collaborative distribution).

In the following description, the collaborative distribution means, for example, a distribution performed jointly by a plurality of distributors using their own terminal devices. The collaborative distribution can include, for example, video distribution using the avatar of the first distributor and the avatar of another distributor, and game distribution performed by the first distributor and another distributor. The game distributed by the game distribution is, for example, a game (live game) distributed live. In the game distributed by the collaborative distribution, by inputting operation data and/or voice to the terminal device 10 owned by each user, the user distributing and/or viewing the game can transmit the input data to the terminal device 10 operated by the other user, thereby allowing the users to communicate with each other.

In the case of performing collaborative distribution, for example, each of a plurality of distributors can be treated separately. For example, one distributor of the plurality of distributors can be treated as, for example, a host distributor, and the remaining of the plurality of distributors can be treated as, for example, a guest. Specifically, for example, when two distributors (first distributor and second distributor) execute collaborative distribution, the first distributor can be treated as a host distributor, and the second distributor can be treated as a guest. In this case, when the collaborative distribution is terminated, the first distributor is still able to continue the distribution, and the second distributor becomes impossible to continue the distribution. It can be configured so that the second distributor can view the distribution as a viewer, for example, in a case where the second distributor becomes impossible to continue the distribution.

When the plurality of distributors are treated separately, the display content displayed on the display screen of the terminal device operated by the host distributor, for example, may be configured to be different from the display content displayed on the display screen of the terminal operated by the guest. When the plurality of distributors are treated separately, the number of commands operable by the host distributor, for example, may be configured to be larger than the number of commands operable by the guest.

An example in which a plurality of distributors are treated separately in the case of performing collaborative distribution has been described. However, the present invention is not limited to this example, and may be configured so that the plurality of distributors can be treated without being separated from each other in the case of performing collaborative distribution.

1-2 Server Device 20

As shown in FIG. 9, the server device 20 includes, for example, the distribution server system 20A and the web server system 20B.

The distribution server system 20A can distribute, to each terminal device (each viewer terminal device) 10, the first video and/or the second video transmitted by each terminal device (each distributor terminal device) 10. The distribution server system 20A can transmit, to the distributor terminal device 11X, token data indicative of giving (gifting) a token to a certain distributor and/or comment data indicative of transmitting a comment to a certain distributor, transmitted by each terminal device (each viewer terminal device) 10.

In order to execute such an operation, the distribution server system 20A can, in an embodiment, include the distribution server device 20A1, a database (DB) server device 20A2, a game API server device 20A3, and a collaboration server device 20A4 that are connected to one another via the communication line (including a wireless line and/or a wired line not illustrated).

The distribution server device 20A1 can distribute, to each terminal device 10, the first video and/or the second video transmitted by each distributor terminal device 11X. The distribution server device 20A1 can store, in the DB server device 20A2, the token data and/or the comment data transmitted by each viewer terminal 12X.

The DB server device 20A2 can store the token data and/or the comment data received from the distribution server device 20A1, read out the token data and/or the comment data inquired by the game API server device 20A3, and transmit them to the game API server device 20A3.

When receiving an inquiry regarding token data and/or comment data from each distributor terminal device 11X, the game API server device 20A3 can read out the token data and/or the comment data for the distributor terminal device 11X from the DB server device 20A2, and transmit them to the distributor terminal device 11X. In order to decide a user to perform collaborative distribution, the game API server device 20A3 acquires data of a candidate user other than the first distributor, and stores it in the DB server device 20A2. Here, the "candidate user other than the first distributor" is, for example, the second distributor or viewer.

The collaboration server device 20A4 communicates voice data and/or motion data with each terminal device 10 during collaborative distribution, for example. In a case where the first distributor emits a voice to the first distributor terminal device 11A during collaborative distribution, for example, the collaboration server device 20A4 receives data regarding the voice from the first distributor terminal 11A and transmits the data regarding the voice to the second distributor terminal device 11B and/or the viewer terminal device 12X. In a case where the second distributor emits a voice to the second distributor terminal device 11B during collaborative distribution, for example, the collaboration server device 20A4 receives data regarding the voice from the second distributor terminal device 11B and transmits the data regarding the voice to the first distributor terminal device IA and/or the viewer terminal device 12X.

The example shown in FIG. 9 shows a configuration in which for the purpose of load dispersion and the like, the distribution server system 20A has four server devices having the distribution server device 20A1, the DB server device 20A2, the game API server device 20A3, and the collaboration server device 20A4. However, at least one server device of these four server devices may be integrated with at least one of the remaining server devices.

As shown in FIG. 9, the web server system 20B includes, for example, a game server device 20B1 and a content server device 20B2.

The game server device 20B1 transmits, to each distributor terminal device 11X having accessed, a web page (document created according to HTML, for example, HTML5) in which a game program is incorporated. This game program can cause the received and decoded terminal 10 to execute various motions related to video distribution including the motions illustrated in (a) to (c) below.

(a) Operation of executing the game (b) Operation of transmitting the game screen generated with the execution of the game to the distribution server system 20A (distribution server device 20A1)

(c) Operation of acquiring, from the distribution server system 20A (game API server device 20A3), token data and/or comment data transmitted to this distributor When distributing a game by collaborative distribution, for example, the game server device 20B1 integrates operation data in the game, and performs calculation of a game logic. When distributing a game by collaborative distribution, for example, the game server device 20B1 transmits/receives game operation data and/or calculation data to/from the terminal device 10 operated by a user distributing and/or viewing the game. The game server device 20B1 stores data regarding the second distributor and/or the viewer of the game distributed by the collaborative distribution during the collaborative distribution.

The content server device 20B2 is a device that stores, for example, game related data (e.g., live game content) and provides game rendering data to the terminal device 10 operated by the user distributing and/or viewing the game.

1-3. Studio Unit 30

The studio unit 30 can be placed in a studio, a room, a hall, or the like that is a place where a performer (distributor) distributes a video. The studio unit 30 can perform the same function as that of the terminal 10 and/or the server device 20 as described above. In FIG. 9, broken lines indicate that data can be communicated among the studio unit 30 and other devices, and solid lines indicate that data can be communicated among the other devices.

2. Hardware Configuration of Each Device

Next, an example of the hardware configuration of each of the terminal device 10, the server device 20, and the studio unit 30 will be described.

2-1. Hardware Configuration of Terminal Device 10

A hardware configuration example of each terminal device 10 will be described with reference again to FIG. 2, which was referred to with respect to the first embodiment above. FIG. 2 is a block diagram schematically showing an example of the hardware configuration of the terminal 10 (server device 20) shown in FIG. 9 (in FIG. 2, reference numerals in parentheses are given in relation to the server device 20, as will be described later).

As shown in FIG. 2, each terminal device 10 can mainly include a central processing unit 11, a main storage device 12, an input/output interface device 13, an input device 14, an auxiliary storage device 15, and an output device 16. These devices are interconnected via a data bus and/or a control bus.

The central processing unit 11, which is referred to as a "CPU", can perform operations on instructions and data stored in the main storage device 12, and store the results of the operations in the main storage device 12. The central processing unit 11 can control the input device 14, the auxiliary storage device 15, the output device 16, and the like via the input/output interface device 13. The terminal device 10 can include one or more such central processing units 11.

The main storage device 12, which is referred to as a "memory", can store instructions and data received from the input device 14, the auxiliary storage device 15, and a communication line 2 (server device 20 or the like) via the input/output interface device 13, as well as calculation results of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device having a capacity larger than that of the main storage device 12. The auxiliary storage device 15 can store an instruction and data (computer program) constituting the above-mentioned specific application (video distribution application, video viewing application, and the like) and a web browser application. By being controlled by the central processing unit 11, the auxiliary storage device 15 can transmit these instructions and data (computer program) to the main storage device 12 via the input/output interface device 13. The auxiliary storage device 15 can include a magnetic disk device and/or an optical disk device, without limiting to them.

The input device 14 is a device that fetches data from the outside, and includes a touch screen, a button, a keyboard, a mouse, and/or a sensor, without limiting to them. The sensor can include a sensor including one or more cameras or the like and/or one or more microphones or the like, without limiting to them, as described below.

The output device 16 can include a display device, a touch screen, and/or a printer device, without limiting to them.

With such hardware configuration, the central processing unit 11 sequentially loads, into the main storage device 12, an instruction and data (computer program) constituting a specific application stored in the auxiliary storage device 15, and calculate the loaded instruction and data, whereby the central processing unit 11 can control the output device 16 via the input/output interface device 13 or transmit/receive various information to/from another device (e.g., server device 20, other terminal device 10, studio unit 30, and/or like) via the input/output interface device 13 and a communication line 2.

Thus, by executing the installed specific application, the terminal device 10 can execute at least one motion of the following motions (a) to (d) below, for example.

(a) Operation used for distributing the first video and/or the second video (b) Operation used for receiving the token data and/or the comment data transmitted from another terminal device 10 to the own terminal device 10

(c) Operation used for receiving the first video and/or the second video distributed by another terminal device 10

(d) Operation used for transmitting token data and/or comment data to another terminal device 10

The terminal device 10 may include one or more microprocessors and/or graphics processing units (GPU) in place of the central processing unit 11 or together with the central processing unit 11.

2-2. Hardware Configuration of Server Device 20

A hardware configuration example of each server device 20 will be described similarly with reference again to FIG. 2. The hardware configuration of each server device 20 (each of distribution server device 20A1, DB server device 20A2, game API server device 20A3, game server device 20B1, and content server device 20B2) can be, for example, one identical to the hardware configuration of each terminal device 10 described above. Therefore, reference numerals for the components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are interconnected via a data bus and/or a control bus.

The central processing unit 21, the main storage device 22, the input/output interface device 23, the input device 24, the auxiliary storage device 25, and the output device 26 can be substantially the identical to the central processing unit 11, the main storage device 12, the input/output interface device 13, the input device 14, the auxiliary storage device 15, and the output device 16, respectively, included in each terminal device 10 described above.

With such hardware configuration, the central processing unit 21 can sequentially load, into the main storage device 22, an instruction and data (computer program) constituting a specific application stored in the auxiliary storage device 25, and calculate the loaded instruction and data, whereby the central processing unit 21 can control the output device 26 via the input/output interface device 23 or transmit/receive various data to/from another device (e.g., each terminal device 10, studio unit 30, and/or like) via the input/output interface device 23 and the communication line 2.

Thus, the server device 20 can execute an operation necessary for distributing, to each viewer terminal device 12X, the first video and/or the second video transmitted by each distributor terminal device 11X, an operation necessary for transmitting, to the distributor terminal device 11X, token data and/or comment data transmitted by each viewer terminal device 12X to a certain distributor terminal device 11X, and the like (including various operations described later in detail).

The server device 20 may include one or more microprocessors and/or graphics processing units (GPU) in place of the central processing unit 21 or together with the central processing unit 21.

2-3. Hardware Configuration of Studio Unit 30

The studio unit 30 can perform the same function as that of the terminal device 10 and/or the server device 20 as described above. Therefore, the studio unit 30 can have the same hardware configuration as that of the terminal device 10 or the server device 20 described above.

3. Function of Each Device

Next, an example of the function of each of the terminal device 10, the server device 20, and the studio unit 30 will be described.

3-1. Function of Terminal 10

Figure 10:
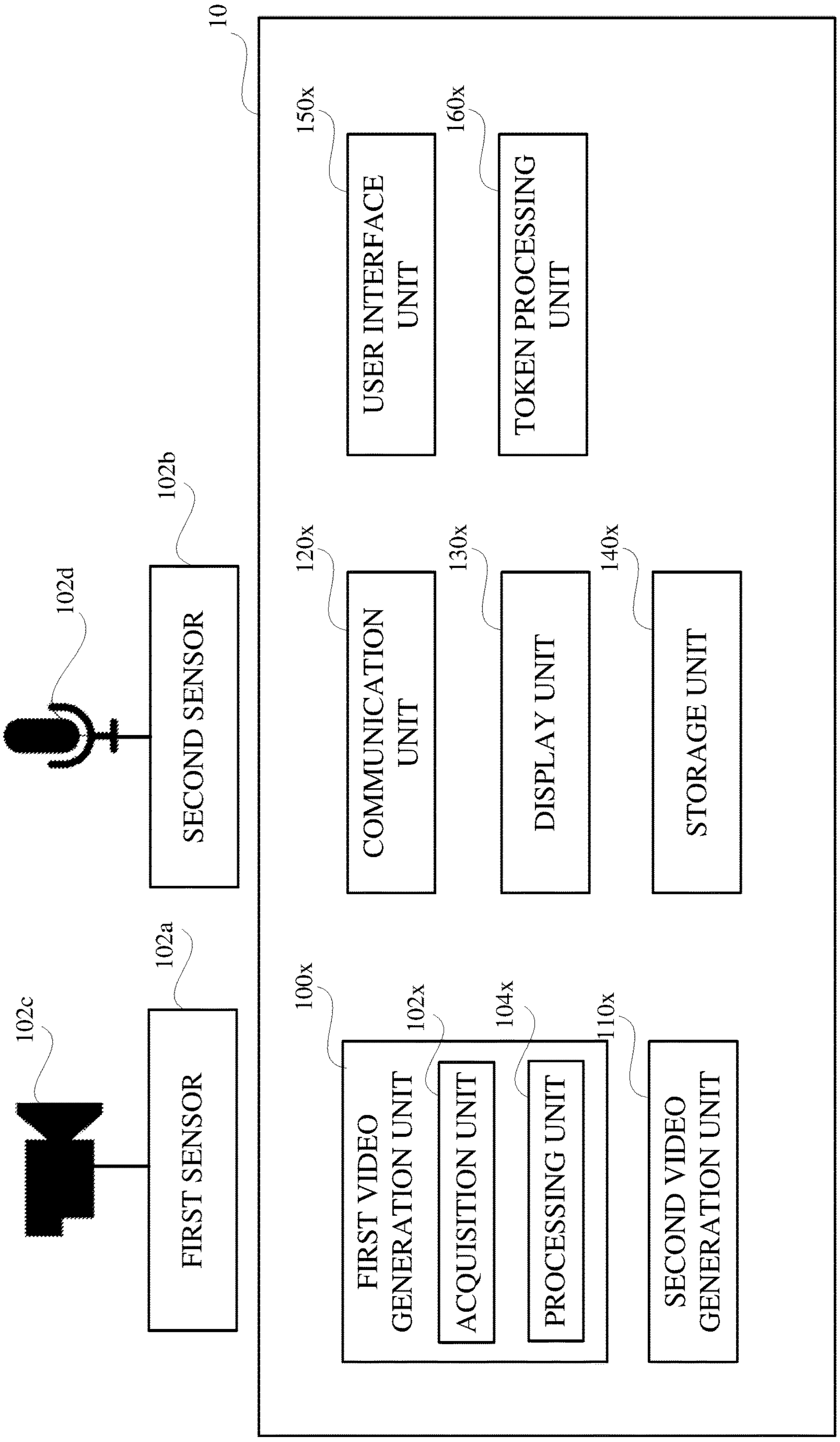
FIG. 10 is a block diagram schematically showing an example of a function of the terminal device shown in FIG. 9.

An example of the function of the terminal device 10 will be described with reference to FIG. 10. FIG. 10 is a block diagram schematically showing an example of a function of the terminal device 10 shown in FIG. 9.

As shown in FIG. 10, the terminal device 10 can mainly include a first video generation unit 100*x*, a second video generation unit 110*x*, a communication unit 120*x*, a display unit 130*x*, a storage unit 140*x*, a user interface unit 150*x*, and a token processing unit 160*x*

(1) First Video Generation Unit 100*x*

The first video generation unit 100*x* can generate the first video including an animation of an avatar object of a distributor on the basis of motion data regarding the motion of this distributor. In order to realize this, the first video generation unit 100*x* can include an acquisition unit 102*x* and a processing unit 104*x*, for example.

The acquisition unit 102*x* can include one or more first sensors 102*a* that acquire data regarding the body of the distributor, and one or more second sensors 102*b* that acquire voice data regarding an utterance and/or singing emitted by the distributor.

In a preferred embodiment, the first sensor 102*a* can include an RGB camera that captures visible light and a near-infrared camera that captures near infrared rays. As such a camera, it is possible to use one included in True Depth camera of iPhone X (registered trademark), for example. The second sensor 102*b* can include a microphone to record voice.

First, as for the first sensor 102*a*, the acquisition unit 102*x* captures the body of the distributor by using the first sensor 102*a* placed close to the body of the distributor. Thus, the acquisition unit 102*x* can generate data (e.g., MPEG file) in which an image acquired by the RGB camera is recorded over a unit time in association with a time code (code indicating the time acquired). The acquisition unit 102*x* can generate data (e.g., TSV file) in which a numerical value (e.g., numerical value of floating point number) indicating a predetermined number (e.g., 51) of depths acquired by the near-infrared camera is recorded over a unit time in association with the time code. The TSV file is a file in a format where a plurality of data are recorded with data separated by tabs.

As for the near-infrared camera, specifically, a dot projector radiates, to the body of the performer, an infrared laser that forms a dot pattern, and the near-infrared camera captures the infrared dots projected and reflected on the body of the performer and generates an image of the infrared dots thus captured. By comparing an image of a dot pattern radiated by a dot projector registered in advance with an image captured by the near-infrared camera, the acquisition unit 102*x* can calculate the depth (distance between each point or each feature point and the near-infrared camera) of each point (each feature point) by using the positional deviation at each point (each feature point) (e.g., each of 51 points and feature points) in the both images. The acquisition unit 102*x* can generate data in which a numerical value indicating the thus calculated depth is recorded over a unit time in association with the time code as described above.

Next, as for the second sensor 102*b*, the acquisition unit 102*x* acquires voice related to an utterance and/or singing emitted by the distributor using the second sensor 102*b* placed close to the body of the distributor. Thus, the acquisition unit 102*x* can generate data (e.g., MPEG file) recorded over a unit time in association with a time code. In an embodiment, the acquisition unit 102*x* can acquire data regarding the body of the distributor using the first sensor 102*a*, and at the same time, acquire voice data regarding an utterance and/or singing emitted by the distributor using the second sensor 102*b*. In this case, the acquisition unit 102*x* can generate data (e.g., MPEG file) in which an image acquired by the RGB camera and voice data related to speech and/or vocal given by the distributor using the second sensor 102*b* are recorded over a unit time in association with an identical time code.

The acquisition unit 102*x* can output, to the processing unit 104*x*, the data (MPEG file, TSV file, or the like) related to the body of the distributor thus generated and/or the voice data (MPEG file or the like) related to the utterance and/or singing emitted by the distributor.

The case where the first sensor 102*a* includes an RGB camera and an infrared camera has been described here. However, the first sensor 102*a* can include, for example, any of the following (A) to (C).

(A) A camera that detects infrared rays emitted by an infrared laser and reflected on the face of the performer (B) A plurality of RGB cameras that capture visible light (C) A single camera that captures visible light In the case of (A) above, the acquisition unit 102*x* can calculate the depth for each feature point in the body of the distributor by the same method as that described above. In the case of (B) above, the acquisition unit 102*x* can calculate the depth of each feature point of the body of the distributor using a plurality of images captured by a plurality of RGB cameras. In the case of (C) above, the acquisition unit 102*x* can calculate, by using deep learning or the like, the depth of each feature point in the body of the distributor from an image captured by a single camera. In the case of (c) above, the acquisition unit 102*x* can calculate the depth of each feature point of the body of the performer by analysis processing (image processing and the like) for the image captured by the single camera.

The processing unit 104*x* can generate a video including an animation of a virtual character (avatar object of the distributor) on the basis of the data regarding the body of the distributor from the acquisition unit 102*x*. As for the video itself of the virtual character, the processing unit 104*x* can generate the video of the virtual character by causing a rendering unit not illustrated to execute rendering using various data (e.g., geometry data, bone data, texture data, shader data, blend shape data, and so on) stored in a character data storage unit not illustrated.

By using various known techniques, the processing unit 104*x* can generate a video (e.g., a video in which the facial expression of the avatar object changes in synchronization with the movement of the mouth and both eyes of the performer, e.g., a video in which the facial expression of the avatar object changes in response to lip-sync and gaze tracking with respect to the face of the performer) in which the facial expression of the avatar object or the like is changed by using the data (data regarding the depth of each feature point in the body of the performer) related to the body of the distributor from the acquisition unit 102*x*.

Any other known technique can be used for generating the first video including an animation of the avatar object of the distributor based on the motion data regarding the motion of this distributor.

(2) Second Video Generation Unit 110*x*

The second video generation unit 110*x* can generate the second video regarding the game on the basis of the operation data regarding the operation of the distributor by using the web page received from the web server system 20B.

Specifically, the second video generation unit 110*x* executes a game program incorporated in the web page received from the web server system 20B. Thus, the second video generation unit 110*x* can render a second video (game video) related to a game in which at least one game object operates, on the basis of the operation data indicating the operation of the distributor input by the user interface unit 150*x*.

The second video generation unit 110*x* can control at least one game object that should be displayed on the second video, on the basis of the token data generated by the viewer terminal device of each viewer viewing the second video and transmitted to the user (distributor) of the terminal device 10. The token data is data indicative of giving (gifting) a token to the distributor.

(3) Communication Unit 120*x*

The communication unit 120*x* can communicate various data used for distribution and/or viewing of a video between the distribution server system 20A and the web server system 20B. For example, when the terminal device 10 operates as the distributor terminal device 11X, the communication unit 120*x* can access the web server system 20B and receive a web page (HTML document) or the like containing a game program used for executing a game or the like. When the terminal device 10 operates as a distributor terminal device, the communication unit 120*x* can transmit the first video and/or the second video to the distribution server system 20A, and receive, from the distribution server system 20A, the token data and/or comment data transmitted to this distributor.

When the terminal device 10 operates as a viewer terminal, the communication unit 120*x* can receive, from the distribution server system 20A, the first video and/or the second video transmitted by the distributor terminal device 11X, and transmit, to the distribution server system 20A, the token data and/or comment data to the distributor. The communication unit 120*x* may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

(4) Display Unit 130*x*

The display unit 130*x* can display various information required for distribution and/or viewing of a video. For example, the display unit 130*x* can display the first video to be distributed and/or the second video to be distributed, the first video having been received and/or the second video having been received, and/or the like.

(5) Storage Unit 140*x*

The storage unit 140*x* can store various data used for distribution and/or viewing of a video using computer-readable memory or storage devices.

(6) User Interface Unit 150*x*

The user interface unit 150*x* can input various data used for distribution and/or viewing of the video through a user operation. For example, the user interface unit 150*x* can input, from the distributor, operation data indicating the contents of the operation by the distributor when executing the game, and output the data to the second video generation unit 110*x*. The user interface unit 150*x* may include a touch input device, such as a keyboard, keypad, mouse, touch screen display, pen, or trackball, a voice input device, a camera, an image sensor, a scanning device, or another device, that provides user input.

(7) Token Processing Unit 160*x*

The token processing unit 160*x* can process token data transmitted/received regarding the distribution and/or viewing of the video. For example, when the terminal device 10 operates as the distributor terminal device 11X, the token processing unit 160*x* can process the token data transmitted to this distributor. When the terminal device 10 operates as the viewer terminal device 12X, the token processing unit 160*x* can process the token data that should be transmitted by the viewer. The token processing unit 160*x* can be implemented with a processor coupled to a memory storing computer-readable instructions executed by the processor to process token data.

3-2. Function of Server Device 20

Figure 11:
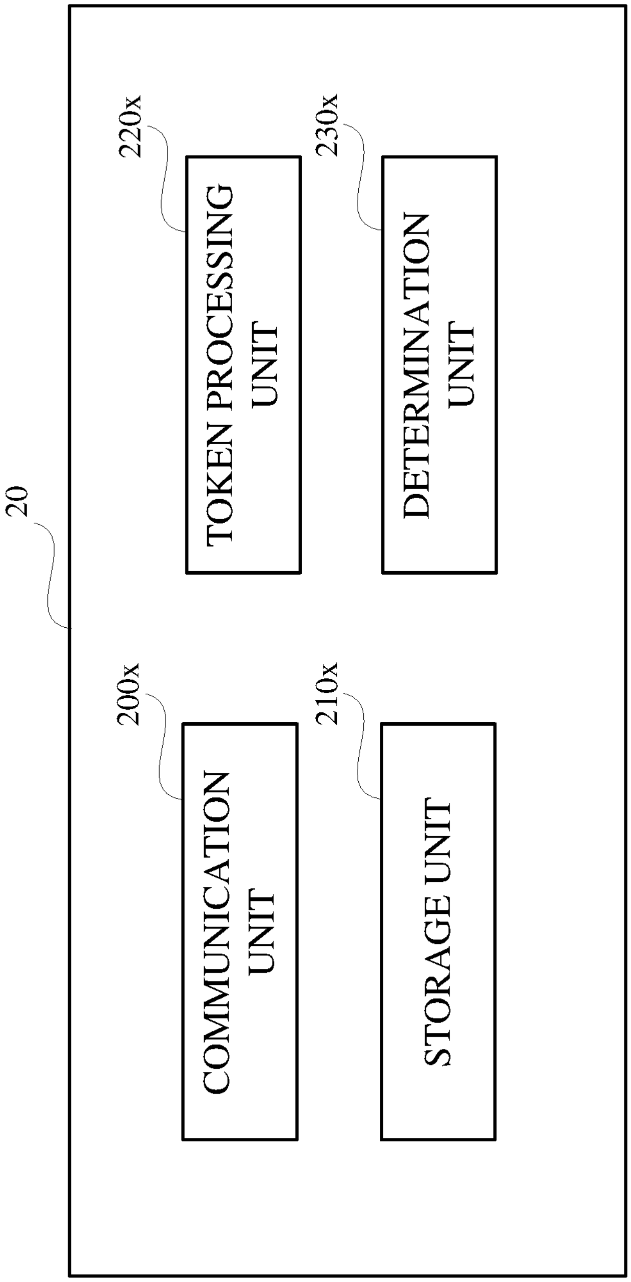
FIG. 11 is a block diagram schematically showing an example of a function of the server device shown in FIG. 9.

An example of the function of the server device 20 will be described with reference to FIG. 11. FIG. 11 is a block diagram schematically showing an example of a function of the server device 20 shown in FIG. 9. As shown in FIG. 11, the server device 20 includes, for example, a communication unit 200*x*, a storage unit 210*x*, a token processing unit 220*x*, a determination unit 230*x*, and an extraction unit 240*x*.

(1) Communication Unit 200*x*

The communication unit 200*x* can communicate various data used for distribution and/or viewing of a video between the distributor terminal device 11X and/or the viewer terminal device 12X. For example, when operating as the distribution server system 20A, the server device 20 can receive, from each distributor terminal device 11X, the first video and/or the second video, and distribute them to each viewer terminal device 12X. When operating as the web server system 20B, the server device 20 can transmit, to each distributor terminal device 11X having accessed, a web page in which a game program is incorporated. The communication unit 200*x* may be adapted to communicate using any suitable technology, including a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto.

(2) Storage Unit 210*x*

The storage unit 210*x* can store various data used for distribution and/or viewing of the video using computer-readable memory or storage devices. The storage unit 210*x* stores data indicating the relationship between, for example, the first distributor and another distributors (e.g., the second distributor) and/or the viewer. The storage unit 210*x* stores, for example, data regarding the distribution history of the collaborative distribution performed by the first distributor together with another distributor. The data stored in the storage unit 210*x* is updated, for example, every time the terminal device 10 executes distribution and/or views the distribution.

The data stored in the storage unit 210*x* includes data regarding at least any of, for example, "collaboration data", "distribution time/viewing time", "game progress", "match history", "number of followers", "move", "special move", "pet", "plant", and "token data".

The "collaboration data" includes data indicating a parameter in the game distributed or viewed in the past by another distributor distributed the game by collaborative distribution together with the first distributor, for example. The "collaboration data" can include data regarding video distribution using the avatar of the first distributor and the avatar of said another distributor, for example. The "distribution time/viewing time" refers to the time when a user operating each terminal device 10 distributed or viewed the game in the past. The storage unit 210*x* stores the accumulated time of the time in which each user distributed and/or viewed in the past each game, for example.

The "game progress" indicates the progress of the game distributed in the past by the distributor. The "match history" indicates the number of wins, the number of losses, and the number of draws for the user participated in the game, for example, in a case where the game to be executed is a match game. The "match history" may be a ranking of the users participated in the game, for example, in a case where the game to be executed is a match game. The "match history" may be a score calculated by quantification performed by applying a predetermined weight to a win, a loss, a draw, and ranking.

The "number of followers" is a number corresponding to the number of follows of one user followed by other users. The larger the number of followers of the one user is, the higher the degree of interest from many users is.

The "move" is a skill possessed by the avatar of the distributor, and it includes a special skill and a killer move. The move may be related to a body move including, for example, punching, kicking, throwing, jumping, or a combination of these. The move data may include moves using a weapon including, for example, a sword skill, a spear skill, a cane skill, an ax skill, a bow skill, or a combination of these. The move data may also be related to magic including, for example, attack magic, defense magic, summon magic, auxiliary magic, or a combination of these. The special skill and/or the killer move gives the opponent a larger damage than the damage caused by the normal attack, for example, when the game being executed is a battle game. The "special move" is a move decided on the basis of a move possessed by a plurality of distributors, for example, in a case of distributing a game by collaborative distribution. The storage unit 210*x* stores, for example, the name of the move, the name of the special move, the condition for enabling the special move, and the like.

The "plant" includes at least any of roots, bark, seeds, stems, leaves, flowers, and fruits. The plant also includes a new plant that can be generated by performing collaborative distribution. The storage unit 210*x* may store the name of the plant, the name of the new plant, and the condition for generating the new plant. That is, the storage unit 210*x* stores information regarding, for example, a plant related to a plurality of distributors and a new plant generated based on a plant related to a plurality of distributors.

The "pet" is a game object that is an animal such as a dog and a cat and can appear in the game. The pet includes a child of a pet that can be generated by collaborative distribution. The storage unit 210*x* can store the name of the pet, the name of the child of the pet, and a condition for generating the child of the pet. That is, the storage unit 210*x* stores information regarding, for example, a pet related to a plurality of distributors and a child of a pet generated on the basis of a pet related to a plurality of distributors.

The "token data" is, for example, the number of tokens, the value of a token, the type of a token, the level of a token, and the like that are quantified in accordance with a predetermined table, and description of the total of the numerical values of tokens. For example, the "token data" can include at least any of the time, frequency, and number of times in which a token was given (sent) from the viewer terminal device 12X to the distributor terminal device 11X. The number of tokens is the number given to the first distributor by the viewer. Here, the "value of a token" corresponds to the price of the token, for example, in a case of a paid token, and the "value of a token" corresponds to the consumption point of the token in a case of a free token. The "value of a token" may be decided based on, for example, the usable time of the token, the display time of the token, the number of people who can use the token at the same time, and/or the total number of tokens available in the game. A short usable time of the token means that the token has a high value. A long usable time of the token means that the token has a low value. A long display time of the token means that the token has a high value. A short display time of the token means that the token has a low value. A small number of people who can use the token at the same time means that the token has a high value. A large number of people who can use the token at the same time means that the token has a low value. A small total number of tokens available in the game means that the token is rare and has a high value. A large total number of tokens available in the game means that the token is not rare and has a low value.

(3) Token Processing Unit 220*x*

The token processing unit 220*x* can process token data transmitted from each viewer to each distributor. When the server device 20 operates as the web server system 20B, the token processing unit 220*x* may be omitted. The token processing unit 220*x* can be implemented with a processor coupled to a memory storing computer-readable instructions executed by the processor to process token data.

(4) Determination Unit 230*x*

The determination unit 230*x* determines various conditions, for example, determines whether or not the start condition of the collaborative distribution has been satisfied (S314 described later), and determines whether or not the collaborative distribution has been ended (S326 described later). The determination unit 230*x* can be implemented with a processor coupled to a memory storing computer-readable instructions executed by the processor.

3-3. Function of Studio Unit 30

The studio unit 30 can perform the same function as that of the terminal device 10 and/or the server device 20 as described above. Therefore, the studio unit 30 can have the function of the terminal device 10 described with reference to FIG. 10 and/or the function of the server device 20 described with reference to FIG. 11.

4. Overall Operation of Video Distribution System 1

Figure 12A:
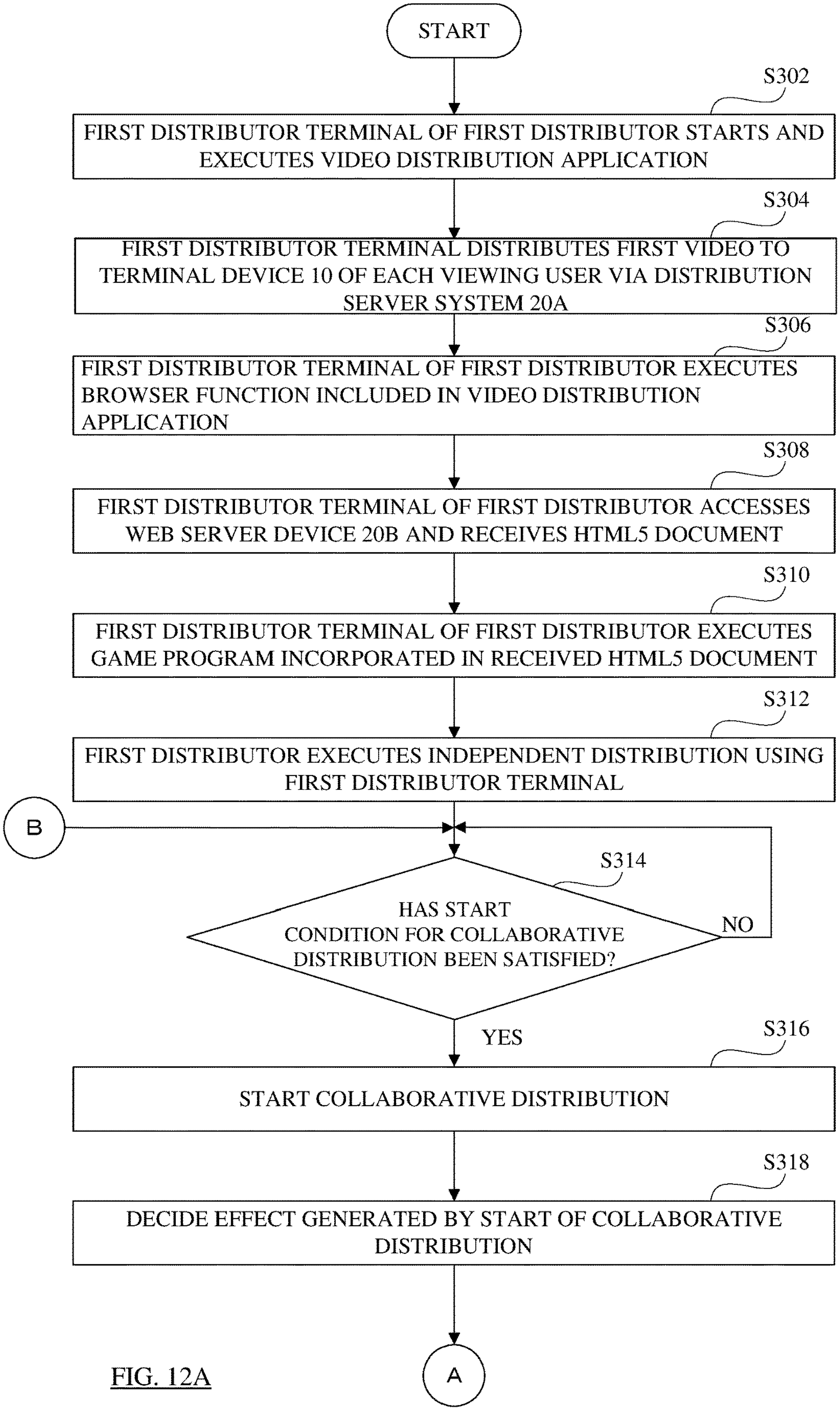
FIG. 12A is a flowchart showing an example of an operation performed in the video distribution system shown in FIG. 9.
Figure 12B:
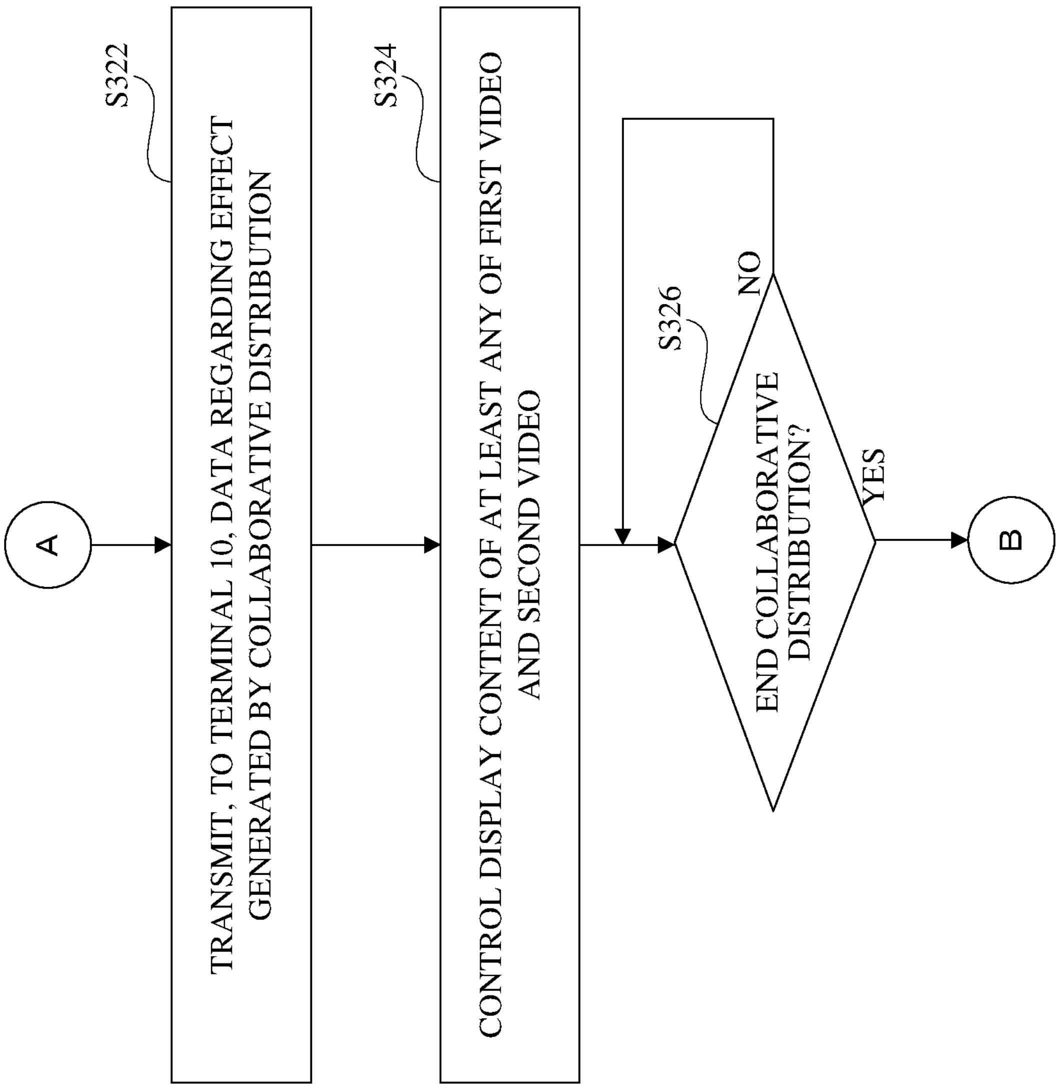
FIG. 12B is a flowchart showing an example of an operation performed in the video distribution system shown in FIG. 9.

Next, the overall operation performed in the video distribution system 1 having the above configuration will be described with reference to FIGS. 12A and 12B. FIGS. 12A and 12B are flowchart showing an example of the operation performed in the video distribution system 1 shown in FIG. 9. In the present embodiment, for example, the description will be made hereinafter on the assumption that the number of users performing collaborative distribution with the first distributor is singular (second distributor). However, the number of users performing the collaborative distribution with the first distributor may be not singular but plural.

First, referring to FIG. 12A, in S302, in accordance with the operation of the distributor (first distributor), the terminal device 10 (first distributor terminal device 11A) starts and executes the video distribution application.

In S304, the first distributor terminal device 11A generates the first video including the animation of the avatar object of the first distributor on the basis of the motion data regarding the motion of the first distributor. Thus, the display unit 130*x* of the first distributor terminal device 11A displays the first video including the animation of the avatar object of the first distributor. Then, the first distributor terminal device 11A transmits the generated first video to the distribution server device 20A1 of the distribution server system 20A. The distribution server device 20A1 distributes the first video received from the first distributor terminal 11A to each viewer terminal 12 executing the video viewing application. Thus, the display unit 130*x* of the viewer terminal device 12X of each viewer also displays the first video.

In S306, when the first distributor taps or the like an icon (not illustrated) called "game" displayed on the display unit 130*x* of the first distributor terminal device 11A, the first distributor terminal device 11A executes the browser function installed in the video distribution application. Thus, in S308, by accessing the web server system 20B in a state where the video distribution application is executed (e.g., the first video is distributed toward each viewer terminal device 12X), the first distributor terminal device 11A can receive an HTML5 document in which a game program is incorporated.

In S310, by executing the game program incorporated in the received HTML5 document, the first distributor terminal device 11A can generate a video (second video) regarding the game.

In S312, using the first distributor terminal device 11A, the first distributor independently distributes the game, and the processing in S314 is executed. In S312, the first distributor and the viewer operate their own terminal devices 10 to start the browser, receive game rendering data from the server device 20 (e.g., web server system 20B), and view the game via the game screen (Web View). At this time, the server device 20 transmits the game rendering data to the terminal device 10. In the case of distributing a game, data such as game operation data and calculation data are transmitted/received between the server device 20 (e.g., web server system 20B) and the terminal device 10.

In S314, the server device 20 determines whether or not the start condition of collaborative distribution has been satisfied. In S314, if the server device 20 determines that the start condition of collaborative distribution has been satisfied (YES in S314), the processing proceeds to S316. On the other hand, in S314, if the server device 20 determines that the start condition of collaborative distribution has not been satisfied (NO in S314), the processing of S314 is performed again.

The start conditions of collaborative distribution are satisfied, for example, when for the distribution distributed by the first distributor terminal device 11A in a state where the collaborative distribution mode displayed on the display unit 130*x* is enabled (ON), the other terminal device 10 transmits data regarding an application for collaborative distribution via the server device 20 to the first distributor terminal device 11A, and the first distributor operates the first distributor terminal device 11A to approve the application. By operating the first distributor terminal device 11A, the first distributor can switch the collaborative distribution mode between enabled (ON) and disabled (OFF).

The start condition of collaborative distribution executed in S314 is not limited to the example described above. For example, in S314, if the first distributor terminal device 11A of the first distributor transmits data indicating that the first distributor and at least one user request to perform distribution together, and the user terminal of at least one user transmits data indicating that the first distributor and at least one user agree to perform distribution together in response to the request, the server device 20 may decide that the first distributor performs distribution together with at least one user. Specifically, for example, if the first distributor terminal device 11A of the first distributor transmits data indicating that the first distributor and the second distributor request to perform distribution together, and the second distributor terminal device 11B of the second distributor transmits data indicating that the first distributor and the second distributor agree to perform distribution together in response to the request, the server device 20 decides that the first distributor performs distribution together with the second distributor.

In S316, the server device 20 starts collaborative distribution by the first distributor and the second distributor. In a case where the collaborative distribution is related to a joint performance of avatars, when the processing of S316 is executed, for example, the avatar of the first distributor and the avatar of the second distributor are displayed in the first video instead of only the avatar of the first distributor being displayed in the first video. If the collaborative distribution is related to the distribution of the game, after the processing of S316 is executed, the operation contents in the first distributor terminal device 11A and the second distributor terminal device 11B are transmitted to the web server system 20B. The first distributor, the second distributor, and each viewer can operate their own terminal device 10 to start a browser, and can view the game via the game screen (Web View). Of the server devices 20, for example, the web server system 20B includes a server device (e.g., game server device 20B1) that integrates game operation data of the user participating in the game. The server device integrates the operation data for operating each terminal device 10 and transmits the result of the calculation to the host distributor (first distributor). The calculation is performed on the game screen (Web View) of the terminal 10 of the host distributor (first distributor), and the result is transmitted to the server device 20 (e.g., web server system 20B), and subsequently transmitted to each terminal device 10. Each of the terminal devices 10 includes the first distributor terminal device 11A and terminal devices operated by the distributor (e.g., second distributor terminal device 11B) performing collaborative distribution with the first distributor and the game viewer. Voice data are transmitted/received between the collaboration server device 20A4 and the first distributor terminal device 11A and/or the second distributor terminal device IB.

In S318, the server device 20 decides the effect generated by the collaborative distribution. Here, the effect generated by the collaborative distribution is an effect decided on the basis of at least any of a distributor performing the collaborative distribution, a distribution content, and data stored in the server device 20. The effect generated by the collaborative distribution is decided based on, for example, data (second data) indicating the relationship between the first distributor and the second distributor. In the present disclosure, for example, data indicating the relationship between the first distributor and the second distributor is extracted, and based on the extracted data, the parameter of at least any of the avatar of the first distributor, the avatar of the second distributor, and the game object are changed, and the display content of at least any of the first video and the second video is controlled.

In a case where the effect generated by the collaborative distribution is to change at least any of the parameters of the avatar of the first distributor, the avatar of the second distributor, and the game object, the change of the parameter includes, for example, changing at least any of the current parameters of the avatar of the first distributor, the avatar of the second distributor, and the game object to a parameter advantageous for the progress of the game.

The data indicating the relationship between the first distributor and the second distributor is, for example, at least any of data regarding a team to which the avatar of the second distributor belongs, data regarding the type of the item associated with the avatar of the second distributor, data indicating whether or not the second distributor follows the first distributor, data indicating the number of times of viewing of the distribution the second distributor has viewed in the past, data indicating the number of times for which the second distributor has viewed the past distribution by the first distributor, data indicating at least any of the amount of the token and the content of the token the second distributor has given to the first distributor in the past distribution by the first distributor, and data indicating the total number of messages transmitted between the second distributor and the first distributor. The data indicating the relationship between the first distributor and the second distributor is, for example, at least any of data regarding the team to which the avatar of the first distributor belongs and data regarding the type of the item associated with the avatar of the first distributor. The data indicating the relationship between the first distributor and the second distributor is stored in, for example, the storage unit 210*x* of the server device 20. The item associated with the avatar of the first distributor and/or the item associated with the avatar of the second distributor includes at least any of, for example, clothing of the avatar, an accessory of the avatar, and parts (e.g., hair, eyes, nose, mouth, ears, hands, feet, etc.) of the avatar.

An example of the effect generated by the collaborative distribution based on the data indicating the relationship between the first distributor and the second distributor will be described below.

For example, in a case where the first distributor and the second distributor distribute a game by collaborative distribution, at least one item is given to the avatar of the first distributor and the second distributor, or the current parameter of at least any of the avatar of the first distributor and the avatar of the at least one user is changed to a parameter advantageous for the progress of the game. The change of at least any of the parameter of the avatar of the first distributor and the parameter of the avatar of the at least one user includes changing of at least any of the position and motion of the avatar of the first distributor and the avatar of the at least one user in the first video.

For example, in a case where the first distributor and the second distributor distribute an action game or a battle game by collaborative distribution, a game object such as a character operable by using the first distributor terminal device 11A and/or the second distributor terminal device 11B appearing in the action game or the battle game is made possible to use a special move such as a uniting move.

Here, the special move described above can be decided by the data of the move possessed by the character related to each distributor performing the collaborative distribution, for example. Here, the data of the move is stored in the storage unit 210*x*, for example, and includes data regarding body moves, moves using the weapons, and magic. The data of the move may be a normal attack move or a special skill.

For example, it is assumed that a move possessed by a character related to the first distributor (hereinafter, sometimes referred to as a first move) has been set, and a technique possessed by a character related to the second distributor (hereinafter, sometimes referred to as a second move) has been set. At this time, the special move that can be used when the first distributor and the second distributor perform collaborative distribution can be, for example, a move of combination of the first move and the second move.

The server device 20 reads, for example, the first move and the second move, and decides (generates) a special move based on the first move and the second move.

Specifically, for example, in a case where the first move is "jump" and the second move is "punch", the special move that can be used when the first distributor and the second distributor perform collaborative distribution can be, for example, a move of combination of "jump" and "punch". Thus, if the data of the moves possessed by two characters are data of moves belonging to different categories, the special moves based on the two characters can be, for example, those following (inheriting) the moves of the different categories. Therefore, when the special move is used in the game, the viewer can grasp a plurality of moves ("punch" and "jump" in the above example) that are the basis of the special move. Therefore, the viewer can intuitively understand that the special move is an effect of the collaborative distribution by the distributor related to the move of "jump" and the distributor related to the move of "punch".

Specifically, for example, in a case of "punch" possessed by a character related to the first distributor and "punch" possessed by a character related to the second distributor, the special move that can be used when the first distributor and the second distributor perform collaborative distribution may be "punch" with a higher attack power than the sum of the attack power of the "punch" possessed by a character related to the first distributor and the attack power of the "punch" possessed by a character related to the second distributor. Thus, if the data of the moves possessed by two characters are data of moves belonging to an identical category, the special moves based on the two characters may be, for example, those with enhanced power (parameter) of the moves of the identical category.

For example, in a case where the first distributor and the second distributor distribute a game by collaborative distribution, a parameter of a game object such as a plant and a pet appearing in the game is changed.

For example, in a case where the first distributor and the second distributor distribute a game by collaborative distribution, at least any of the position and motion of at least one game object is changed, or a game object other than at least one game object is displayed in the second video. This includes the effects that a rare plant can appear in the game and a rare pet can appear in the game. Here, "rare" means that the scarcity value in the game is high or that the number of items present in the game is small. A parameter regarding rarity regarding a game object may be introduced. The higher the numerical value of the parameter is, the rarer it may be, and the lower the numerical value of the parameter is, the less rare (less common) it may be.

For example, each of a plant related to the first distributor and a plant related to the second distributor may be given a parameter regarding rarity. In this manner, since the plant appearing by performing collaborative distribution is displayed on the game screen together with the parameter regarding the rarity, the user viewing the game screen can recognize how rare the plant appearing by performing the collaborative distribution is compared with a plant related to the first distributor and a plant related to the second distributor.

For example, each of the pet related to the first distributor and the pet related to the second distributor can be given a parameter related to rarity. In this manner, since the pet appearing by performing collaborative distribution is displayed on the game screen together with the parameter regarding the rarity, the user viewing the game screen can recognize how rare the pet appearing by performing the collaborative distribution is compared with a pet related to the first distributor and a pet related to the second distributor.

For example, a specific example of a case of causing a rare plant to appear in a game and a specific example of a case of causing a rare pet to appear in a game will be described below.

For example, a flower is assumed as an item (game object) associated with each of the first distributor and the second distributor. In such a case, by performing collaborative distribution, the first distributor and the second distributor can cross the flower associated with the first distributor with the flower associated with the second distributor, and can cause a new plant to appear in the game. Although an example in which the game object is a flower has been described in the above example, the present invention is not limited thereto, and the object may be, for example, a vegetable, a fruit, or the like.

The setting data on the plant appearing by performing collaborative distribution is generated based on, for example, data on the plant related to the first distributor (hereinafter sometimes referred to as the first plant) and data on the plant related to the second distributor (hereinafter sometimes referred to as the second plant). The plant data is data regarding, for example, at least any of the parameter related to the name, color, rarity, and the like of the plant.

If the first plant is, for example, a tulip with the rarity parameter of 1, and the second plant is, for example, a tulip with the rarity parameter of 3, the effect of the collaborative distribution enables a tulip with the rarity parameter of 5 to be obtained. Thus, if two plants belong to an identical category (same species), a plant based on the two plants can be, for example, a plant regarding the identical category. The plant obtained by the collaborative distribution is selected automatically (randomly) from among a plurality of plants having a rarity parameter higher than that of each of the first plant and the second plant. Thus, collaborative distribution provides a plant with a high rarity parameter, which is difficult to acquire by a single distributor.

The above example has been explained a case in which the plant related to each distributor is a plant belonging to the same category. However, the present invention is not limited thereto. That is, the plant related to each distributor may belong to different categories (different species). In this case, for example, if the first plant is a plant belonging to the first category and the second plant is a plant belonging to the second category, the effect of the collaborative distribution may be to cause the plant belonging to the first category to appear, to cause the plant belonging to the second category to appear, or to cause a plant belonging to the third category to appear. For example, a plant belonging to the third category can be one following (inheriting) the plant belonging to the first category and the plant belonging to the second category.

For example, a pet is assumed as an item (game object) associated with each of the first distributor and the second distributor. Here, the pet is a game object that is an animal such as a dog and a cat and can appear in the game. In such a case, by performing collaborative distribution, the first distributor and the second distributor can make a child of the pet associated with the first distributor with the pet associated with the second distributor in the game.

The setting data on the child of pets is generated based on, for example, data on the pet related to the first distributor (hereinafter sometimes referred to as the first pet) and data on the pet related to the second distributor (hereinafter sometimes referred to as the second pet). The pet data is, for example, data on at least any of the hair, eyes, nose, mouth, ears, hands, feet, and the like of the pet. Specifically, the pet data is data regarding, for example, at least any of the parameter related to the size, color, and shape of the part of the pet.

For example, the setting data on the child of the first pet and the second pet may be generated so as to extract a feature point regarding the data on the first pet and a feature point regarding the data on the second pet and to follow (inherit) at least any of the feature points. More specifically, for example, if the first pet has "golden hair" as a feature point and the second pet has "double eyelids" as a feature point, the setting data on the child of the first pet and the second pet may be "golden hair" and "double eyelids". Thus, by visually recognizing the child in the game, the user can intuitively recognize that the child has been made as a child of the first pet and the second pet by performing collaborative distribution by the first distributor and the second distributor.

For example, when the feature point regarding the data on the first pet and the feature point regarding the data on the second pet are extracted and the feature points of those pets belong to an identical category, setting data on the child of the first pet and the second pet may be generated so as to make the feature points more conspicuous. Thus, by performing collaborative distribution, a plurality of users associated with pets having an identical feature point in the game can make a child of the pet that further characterizes the feature point.

The above explanation has focused on an example in which the effect generated by performing the collaborative distribution is decided based on the data (e.g., move, plant, and pet) related to the first distributor and the data (e.g., move, plant, and pet) related to the second distributor. However, the present invention is not limited thereto. For example, the effect generated by performing collaborative distribution may be decided automatically (randomly) independently of the data associated with the first distributor and the data associated with the second distributor.

Thus, in S318, when the server device 20 decides the effect generated by collaborative distribution, the processing in S322 is executed.

In S322, the server device 20 transmits, to the terminal device 10, the data regarding the effect generated by the collaborative distribution decided in S318. When the terminal device 10 receives, from the server device 20, the data including the effect content generated by the collaborative distribution decided in S318, the processing in S324 is executed.

In S324, the terminal device 10 controls the display content of at least any of the first video and the second video displayed on the display unit 130*x* based on the data received from the server device 20 and including the effect content generated by the collaborative distribution.

Next, in S326, the server device 20 determines whether or not the collaborative distribution by the first distributor and the second distributor has been ended. In S326, if the server device 20 determines that the collaborative distribution by the first distributor and the second distributor has ended (YES in S326), the processing in S314 is executed. On the other hand, in S326, if the server device 20 determines that the collaborative distribution by the first distributor and the second distributor is not ended (NO in S326), the processing in S326 is repeated.

In the above description, "end of collaborative distribution" includes conditions such as that, in a case of distributing a game by collaborative distribution, any of a plurality of distributors performing collaborative distribution selects the end of the game, a character operated in the game dies, the number of playable times of the game becomes zero, knocking down a character (e.g., foe character) different from the character operated in a stage prepared in the game, acquiring a predetermined item in the stage, and moving the character operated in the stage to a predetermined position. Note that acquiring a predetermined item in the stage and moving the character operated in the stage to a predetermined position can correspond to clearing the stage.

In the above description, an example of sequentially executing S302 to S312 described in FIG. 12A has been described, but the present invention is not limited thereto. For example, a part of the processing in S302 to S312 described in FIG. 12A may be omitted. The processing of S312 to S326 can be performed by one or a plurality of components constituting the server device 20 within a range where the processing of S314 to S326 can be executed.

In the above description, an example in which the first distributor independently performs distribution has been described in S312, but the present invention is not limited thereto. In S312, the first distributor terminal device 11A may transmit the second video (game screen) to the distribution server device 20A1 of the distribution server system 20A. In this case, the distribution server device 20A 1 can distribute the second video received from the first distributor terminal device 11A to each viewer terminal device 12X executing the video viewing application.

As described above, according to the present disclosure, the first video including motion data regarding the motion of the first distributor or an animation of the avatar of the first distributor generated on the basis of the motion data and the second video regarding the game generated on the basis of the operation data regarding the operation of the first distributor by using a received webpage are distributed to a viewer terminal of at least one viewer via the communication line, whether or not first data indicating that the first distributor has started or ended a game that the first distributor executes together with at least one user has been transmitted is determined in a case where the first distributor executes the game together with at least one user, second data including data on at least one user is extracted in a case where it is determined that the first data has been transmitted, and a display content of at least of any of the first video and the second video is controlled based on the second data. Therefore, it is possible to improve the amusement.

5. Variations

In the above description, an example in which the processing of S318 for deciding the effect of collaborative distribution is performed after the processing of S316 has been described. However, the present invention is not limited thereto. For example, the processing of S318 may be performed when data indicating that a predetermined time (first time) has elapsed after the processing of S316 is transmitted to the server device 20. For example, the processing of S318 may be performed when data indicating that the first distributor terminal and the second distributor terminal have ended the collaborative distribution is transmitted to the server device 20, after the processing of S316. Thus, the processing of S318 can be performed, for example, when collaborative distribution is started, during execution of collaborative distribution, when collaborative distribution is ended, or while the first distributor is performing distribution after collaborative distribution is ended.

An example in which the processing of S324 for generating the effect of collaborative distribution is performed after the processing of S322 has been described, but the present invention is not limited thereto. For example, the processing of S324 is not limited to be performed while the collaborative distribution is being executed, but it can be performed after the effect of the collaborative distribution is decided, for example, when the collaborative distribution is started, when the collaborative distribution is ended, or when the collaborative distribution is ended and the first distributor is performing the distribution.

For example, the server device 20 may acquire data regarding the distributor performing the collaborative distribution at the start of the collaborative distribution and generate an effect based on the data of the distributor at the start of the collaborative distribution.

For example, the server device 20 may generate an effect based on the data of the first distributor and the second distributor at the end of the collaborative distribution. In this case, for example, an effect based on the data of the first distributor and the second distributor may be generated on condition that the data regarding end of the collaborative distribution is transmitted. Specifically, for example, if the first distributor and the first pet are associated and the second distributor and the second pet are associated and the server device 20 determines that the collaborative distribution had been ended (YES in S326), the server device 20 may generate the effect of making a child of the first pet and the second pet.

Thus, when the server device 20 generates an effect based on the data of the distributor performing the collaborative distribution at the end of the collaborative distribution, it is possible to suppress reduction in the number of viewers in a case of the collaborative distribution is ended. In particular, in a case where the first distributor and the second distributor distribute a game by collaborative distribution and in a case where the viewer's interest in the second distributor is significantly higher than the viewer's interest in the first distributor, it is expected that the number of viewers is reduced due to dropping the second distributor at the end of the collaborative distribution, but the viewer's interest can be drawn again by generating the effect based on the data on the first distributor and the second distributor at the end of the collaborative distribution. Therefore, it is possible to suppress reduction in the number of viewers in a case of the collaborative distribution is ended.

For example, by generating the effect based on the data of the first distributor and the second distributor of the collaborative distribution while the collaborative distribution is ended and the first distributor is distributing the game, the server device 20 can advantageously proceed with the game and/or it is possible to suppress reduction in the number of viewers in a case of the collaborative distribution is ended. For example, when there is a request from the terminal device 10 of the first distributor, the effect based on the data of the distributor may be generated. For example, the server device 20 may count the number of viewers at predetermined time intervals, and may generate the effect based on the data of the distributor when the number of viewers becomes smaller than a predetermined number. Specifically, for example, in a scene where the first distributor is associated with the first move, the second distributor is associated with the second move, the first distributor independently distributes a battle game after the end of collaborative distribution, and the character operated by the first distributor has difficulty in beating a foe character, the first distributor terminal device 11A may generate the effect based on the data of the first distributor and the second distributor of the collaborative distribution. For example, in a case where the effect based on the data of the first distributor and the second distributor of the collaborative distribution is an effect of activating a killer move stronger than the first move, the character operated by the first distributor can perform a killer move on the foe character. In a case where the effect based on the data of the first distributor and the second distributor of the collaborative distribution is an effect of activating a uniting move based on the first move and the second move, the character of the second distributor in addition to the character of the first distributor may be temporarily displayed on the game screen when the uniting move is performed to the foe character.

The above-mentioned scene of having difficulty in beating a foe character is, for example, when the vitality (HP/hit point) of the character operated by each of the first distributor and the second distributor is lower than a predetermined value, the timing at which the foe character activates a move and/or a killer move, and the like. The generation timing of the effect during execution of collaborative distribution may be based on an instruction by the server device 20 or may be based on an instruction (request) by an operation of the terminal device 10 (e.g., terminal operated by the distributor).

In the above description, an example in which the effect of the addition is generated by the first distributor performing collaborative distribution with the second distributor has been described. However, the present invention is not limited thereto. For example, in a case where a plurality of distributors are performing collaborative distribution, the effect of the addition may be generated by further adding the number of distributors. Specifically, for example, in a case where two distributors are performing collaborative distribution, the collaborative distribution is performed with one more distributor added, and the effect by adding one more distributor may be generated.

In a case where the effect by collaborative distribution is generated, on the game screen may clearly display which of the plurality of distributors' collaborative distribution the effect is due to. Here, the clear display on the game screen includes, for example, highlighting a display content and attaching a label regarding the display content. In a case where the effect by collaborative distribution is generated, the collaborative distribution may be reproducible. Thus, it is possible to provide the viewer with an opportunity to view distribution of a new distributor.

For example, in a case where by performing collaborative distribution, the first distributor and the second distributor exert the effect regarding a special move based on the first move and the second move, the screen of the game may display how the effect has been exerted. For example, in a case where the effect regarding the special move based on the first move and the second move is exerted, the screen of the game may display at least one of the name of the special move, the name of the first distributor, the name of the second distributor, the name of the first move, and the name of the second move. Thus, the user who visually recognizes the special move displayed on the game screen can grasp details for exerting the special move. Here, in a case where the name of the first distributor and/or the name of the second distributor is displayed on the screen of the game, the viewer can follow the first distributor and/or the second distributor by referring to the profile screen of the first distributor and/or the second distributor by operating the viewer terminal device 12X, and can view the distribution when the first distributor and/or the second distributor is distributing by operating the viewer terminal device 12X.

For example, in a case where by the first distributor and the second distributor performing collaborative distribution, a new plant is displayed on the game screen based on the first plant and the second plant, the screen of the game may display how the effect has been exerted. For example, in a case where a new plant is displayed on the game screen based on the first plant and the second plant, the screen of the game may display at least one of the name of the new plant, the name of the first distributor, the name of the second distributor, the name of the first plant, and the name of the second plant. Thus, the user who visually recognizes a new plant displayed on the game screen can grasp details for the new plant.

For example, in a case where by the first distributor and the second distributor performing collaborative distribution, a new pet is displayed on the game screen based on the first pet and the second pet, the screen of the game may display how the effect has been exerted. For example, in a case where a new pet is displayed on the game screen based on the first pet and the second pet, the screen of the game may display at least one of the name of the new pet, the name of the first distributor, the name of the second distributor, the name of the first pet, and the name of the second pet. Thus, the user who visually recognizes a new pet displayed on the game screen can grasp details for the new pet.

The scene in which the effect by collaborative distribution is exerted may be limited to during the collaborative distribution in the case of the second video. That is, the scene in which the effect by collaborative distribution is exerted may be limited to after the processing of S316 and before the processing of S326. This has an effect of promoting collaborative distribution.

A case in which the scene in which the effect by collaborative distribution is exerted may be limited to during the collaborative distribution in the case of the second video has been explained. However, the present invention is not limited thereto. The scene in which the effect by collaborative distribution is exerted may be limited to during the collaborative distribution in the case of the second video, and during the collaborative distribution being performed by the first distributor and the second distributor. This has an effect of promoting collaborative distribution, and an effect of being capable of strengthening the relationship between specific distributors.

The effect generated by collaborative distribution may be decided in accordance with the number of people who perform collaborative distribution with the first distributor, for example. Specifically, for example, an effect by which the larger the number of people who perform collaborative distribution with the first distributor, the more advantageously the first distributor can proceed with the game may be generated. In this regard, for example, in a case where the number of people who perform collaborative distribution with the first distributor is five and in a case where the game is a battle game, the uniting move that can be used in a case of performing collaborative distribution becomes stronger than that in a case where the number of people who perform collaborative distribution with the first distributor is one, and it is possible to proceed with the battle game advantageously.

In the various embodiments described above, the case in which in order to generate a video (second video) regarding the game, the distributor terminal device 11X receives, from the web server device 20B, an HTML (HTML5, in particular) document in which a game program is incorporated has been described. However, instead of the configuration of receiving, from the web server device 20B, an HTML document in which a game program is incorporated, the distributor terminal device 11X can also generate the second video including a screen regarding the game by executing the installed video distribution application and receiving necessary information from a data server device not illustrated (or a certain server device not illustrated included in the distribution server system 20A).

In the various embodiments described above, the distributor terminal device 11X may be a smartphone or the like used by a general user, or may be a dedicated terminal installed in a studio or the like. In this case, at least one server device of the distribution server device 20*a*, the DB server device 20*b*, and the game API server device 20*c* that are included in the distribution server system 20A (as well as the web server device 20B) may be provided together with the dedicated terminal in the studio or the like.

In the various embodiments described above, the case in which, on the basis of motion data regarding the motion of the distributor and voice data regarding the voice of the distributor, the distributor terminal device 11X generates a video including the animation including the avatar object of this distributor, and transmits the video to the server device 20 has been described. However, the distributor terminal device 11X may transmit the motion data regarding the motion of the distributor and the voice data regarding the voice of the distributor to the server device 20, and the server device 20 may generate a video based on this motion data and the voice data and distribute the video to each viewer terminal device 12X. This can reduce the amount of information transmitted from the distributor terminal device 11X to the server device 20.

The distributor terminal device 11X may transmit the motion data regarding the motion of the distributor and the voice data regarding the voice of the distributor to a separately provided server device, this separate server device may generate a video based on the motion data and the voice data and return it to the distributor terminal device 11X, and the distributor terminal device 11X may transmit the received video to the server device 20. This can reduce the amount of information transmitted from the distributor terminal device 11X to the separately provided server device 20.

The distributor terminal device 11X may transmit the motion data regarding the motion of the distributor and the voice data regarding the voice of the distributor to each viewer terminal device 12X via the server device 20 or the separately provided server device, and each viewer terminal device 12X may generate (render) and display a video based on the received motion data and voice data. This can reduce the amount of information transmitted from the server device 20 or the separately provided server device to each viewer terminal device 12X.

In any of the above cases, the generation of the video based on the motion data and the voice data transmitted by the distributor terminal device 11X may be shared by at least two devices from among the server device 20, the separate server device, and each viewer terminal device 12X. In either case, the device responsible for generation of the video can receive and store, from, for example, the server device 20 or the like, information (image and the like) regarding the avatar object to move.

In the various embodiments described above, the motion of each of the terminal devices 10 described above can be executed similarly by the studio unit 30 having a similar configuration to that of the terminal device 10. In this case, the studio unit 30A illustrated in FIG. 9 can have a similar function to that of the terminal device 10 for distributing a video. Similarly, the studio unit 30B illustrated in FIG. 9 can have a similar function to that of the terminal device 10 for viewing a video. The motion of each of the server devices 20 described above can be executed also by the studio unit 30 having the similar configuration to that of the server device 20.

The various embodiments described above can be used in combination with one another as long as no contradiction or inconvenience occurs.

In general, if a game program has been installed in the terminal device 10, or if a game program has been incorporated in a video distribution application installed in the terminal device 10, execution of a new game requires the terminal device 10 to have a new game program or video distribution application incorporating the new game program installed. In this case, from the point of view of the creator of the game program, it is necessary to prepare a game program corresponding to each of a plurality of operating systems, and thus there is a problem of an increase in the man-hour required for the creation of the game program. On the other hand, from the point of view of the user, it is necessary to download a new game program and/or to update an existing game program in order to obtain a new game, and thus there is a problem of requiring communication load, communication cost, time, and labor.

The technique of the present disclosure is applicable to, for example, a role-playing game, a social simulation game, a shooter game, an action game, a card game, Mahjong, Go, Othello, a puzzle game, a quiz game, a sports game, and/or a board game. For example, in a case of playing a role-playing game, a shooter game, and an action game, the effect decided in S318 is to change the parameter of a game object such as a character to be operated in these games to a parameter advantageous for the progress of the game, and the like.

In the second example, by executing the installed game application and accessing the distribution server system 20A also functioning as a game server device, the first distributor terminal device 11A of the first distributor can also distribute the screen of the game being executed to each viewer terminal device 10 via the distribution server system 20A. Also in these first and second examples, the first distributor terminal device 11A of the first distributor can generate the second video by using the viewing parameter received from the distribution server system 20A similarly to the various embodiments described above.

Furthermore, in the third example, the first distributor terminal device 11A of the first distributor in the first example or the second example can transmit the operation data of the first distributor to the web server device 20B or the distribution server system 20A without generating a game screen. In this case, the web server device 20B or the distribution server system 20A can generate a game screen using the operation data, and the distribution server system 20A can distribute the second video including the generated game screen to each viewer terminal device 10. In this third example, when the web server device 20B generates a game screen, the web server device 20B can use the viewing parameter received from the distribution server system 20A. When the distribution server system 20A generates a game screen, the distribution server system 20A can use a viewing parameter managed by the distribution server system 20A itself.

Thus, the technique of the present disclosure can provide a computer program, a method, and a server device that improve the amusement by extending the mode of game distribution more than ever.

Also, according to the technology disclosed in the present application, there is no need to create or draw an additional game object to be the selected game object in order to calculate the control parameter, because calculating the control parameter related to the selected game object is automatically executed on the basis of actual actions, including but not limited to distribution of the first video and/or the second video, by the distributor. Therefore, that enables decreasing loads on the video distribution system, specifically decreasing CPU/memory loads in the server device or the terminal device of the distributor or the viewer. Also, that enables all users of the video distribution system to easily view the game through a small display of a smart phone or the like.

Further, according to the technology disclosed in the present application, a viewer is able to view the first video and/or the second video distributed by a distributor (or distributors) which is/are the viewer's favorite at any time the viewer wants, because the distributor (or the distributors) is/are motivated to frequently distribute the first video and/or the second video. Therefore, that enables decreasing communication network loads and decreasing CPU/memory loads in the server device or the terminal device of the distributor by eliminating access concentration to the server device or the terminal device of the distributor(s) by many viewers, who are trying to view the first video and/or the second video at the same time.

6. Various Aspects

The computer program according to the first aspect "causes, by being executed by at least one processor, the processor to function so as to distribute, to a viewer terminal device of at least one viewer via a communication line, the first video including motion data regarding the motion of the first distributor or an animation of the avatar of the first distributor generated on the basis of the motion data and the second video regarding the game generated on the basis of the operation data regarding the operation of the first distributor by using a received webpage, determine whether or not first data indicating that the first distributor has started or ended a game that the first distributor executes together with at least one user has been transmitted in a case where the first distributor executes the game together with at least one user, extract second data including data on at least one user in a case where it is determined that the first data has been transmitted, and control a display content of at least any of the first video and the second video".

The computer program according to the second aspect, in which in the first aspect, "the first data includes either data regarding a request to control the display content of at least of any of the first video and the second video transmitted by the first distributor terminal device of the first distributor or by a terminal device of any of the user among the at least one user, or data indicating that first time has elapsed".

The computer program according to the third aspect, in which in the first or second aspect, "the second data includes data indicating the relationship or relativity between the first distributor and the at least one user".

The computer program according to the fourth aspect, in which in the third aspect, "the second data includes at least any of data regarding a team to which the avatar of the at least one user belongs, data regarding the type of the item associated with the avatar of the at least one user, data indicating whether or not the at least one user follows the first distributor, data indicating the number of times of viewing of the distribution the at least one user has viewed in the past, data indicating the number of times for which the at least one user has viewed the past distribution by the first distributor, data indicating at least any of the amount of the token and the content of the token the at least one user has given to the first distributor in the past distribution by the first distributor, and data indicating the total number of messages transmitted between the at least one user and the first distributor".

The computer program according to the fifth aspect, in which in the fourth aspect, "the second data includes at least any of data regarding a team to which the avatar of the first distributor belongs, and data regarding the type of the item associated with the avatar of the first distributor, the processor to further function so as to give, to at least any of the avatar of the first distributor and the avatar of the at least one user, at least one item or change at least any of a current parameters of at least any of the avatar of the first distributor and the avatar of the at least one user to a parameter advantageous for the progress of the game on the basis of the second data, in a case where the first distributor belongs to the team to which the avatar of the at least one user belongs or where the first distributor belongs to the team to which is related to the one the avatar of the at least one user belongs, or in a case where the first distributor wears an item which is associated with the avatar of the at least one user or an item related to the item which is associated with the avatar of the at least one user".

The computer program according to the sixth aspect, in which in any of the first to fifth aspects, "the processor to further function so as to allow the first distributor to execute the game together with at least any of the user, and determine whether or not the first data has been transmitted, in a case where the terminal device of the at least any of the user in the at least one user transmits data regarding request to execute the game by both the first distributor and the at least any of the user, and the first distributor terminal device of the first distributor transmits data regarding approval, in response to the request, of executing the game by both the first distributor and the at least any of the user".

The computer program according to the seventh aspect, in which in any of the first to fifth aspects, "the processor to further function so as to execute the game by the first distributor together with the at least one user, and determine whether or not the first data has been transmitted, in a case where the first distributor terminal device of the first distributor transmits data regarding request to execute the game by both the first distributor and the at least one user collaboratively, and the terminal device of the at least one user transmits data regarding approval, in response to the request, of executing the game by both the first distribution and the at least one user collaboratively".

The computer program according to the eighth aspect, in which in any of the first to fifth aspects, "the at least one user includes a second distributor, the processor to further function so as to allow the first distributor to execute the game together with the second distributor, and determine whether or not the first data has been transmitted, in a case where the first distributor terminal device of the first distributor transmits data regarding request to execute the game by both the first distributor and the second distributor collaboratively, and a second distributor terminal device of the second distributor transmits data regarding approval, in response to the request, of executing the game by both the first distribution and the second distributor collaboratively".

The computer program according to the ninth aspect, in which in any of the first to eighth aspects, "the processor to further function so as to change at least any of location and motion of the avatar of the first distributor and the avatar of the at least one user in the first video by controlling at least any of a parameter of the avatar of the first distributor and a parameter of the avatar of the at least one user, in controlling the display content of the first video".

The computer program according to the tenth aspect, in which in any of the first to eighth aspects, "the processor to further function so as to change at least any of location and motion of at least one of game objects, or display a game object other than the at least one of game objects in the second video, by controlling a parameter of the at least one of game objects in the game, in controlling the display content of the second video".

The computer program according to the eleventh aspect "causes, by being executed by at least one processor, the processor to function so as to receive the first video including motion data regarding the motion of the first distributor or an animation of each avatar of the first distributor generated on the basis of the motion data and the second video regarding the game generated on the basis of the operation data regarding the operation of the first distributor by using a received webpage, and receive at least any of the first video and the second video including a controlled display content on the basis of a extracted second data including data on at least one user, in a case where the first distributor executes the game together with at least one user, whether or not first data indicating that the first distributor has started or ended a game has been determined, and when determined that the first data has been transmitted".

The computer program according to the twelfth aspect, in which in any of the first to eleventh aspects, "the communication line includes the Internet".

The computer program according to the thirteenth aspect, in which in any of the first to twelfth aspects, "the processor includes a central processing unit (CPU), a microprocessor, and/or a graphics processing unit (GPU)".

The computer program according to the fourteenth aspect, in which in any of the first to thirteenth aspects, "the processor is mounted in a server device, smart phone, tablet, cell phone, or personal computer".

The method according to the fifteenth aspect is "a method executed by at least one processor that executes a computer-readable instruction, the method including a step in which by executing the instruction, the processor distributes, to a viewer terminal device of at least one viewer via a communication line, a first video including an animation of each avatar of a first distributor generated on the basis of motion data regarding a motion of the first distributor or the motion data, and a second video regarding a game generated on the basis of operation data regarding an operation of the first distributor using a received web page, a step of determining whether or not first data indicating that the first distributor has started or ended a game that the first distributor executes together with at least one user has been transmitted in a case where the first distributor executes the game together with at least one user, a step of extracting second data including data on at least one user in a case where it is determined that the first data has been transmitted, and a step of controlling a display content of at least any of the first video and the second video".

The method according to the sixteenth aspect is "a method executed by at least one processor that executes a computer-readable instruction, the method including a step in which by executing the instruction, the processor receives a first video including an animation of each avatar of a first distributor generated on the basis of motion data regarding a motion of the first distributor or the motion data, and a second video regarding a game generated on the basis of operation data regarding an operation of the first distributor using a received web page, and a step of receiving at least any of the first video and the second video including a controlled display content on the basis of a extracted second data including data on at least one user, in a case where the first distributor executes the game together with at least one user, whether or not first data indicating that the first distributor has started or ended a game has been determined, and when determined that the first data has been transmitted".

The method according to the seventeenth aspect, in which in any of the fifteenth and sixteenth aspects, "the communication line includes the Internet".

The method according to the eighteenth aspect, in which in any of the fifteenth to seventeenth aspects, "the processor includes a central processing unit (CPU), a microprocessor, and/or a graphics processing unit (GPU)".

The server device according to the nineteenth aspect is "a server device including at least one processor and causing the at least one processor to function so as to distribute, to a viewer terminal device of at least one viewer via the communication line, the first video including motion data regarding the motion of the first distributor or an animation of the avatar of the first distributor generated on the basis of the motion data and the second video regarding the game generated on the basis of the operation data regarding the operation of the first distributor by using a received webpage, determine whether or not first data indicating that the first distributor has started or ended a game that the first distributor executes together with at least one user has been transmitted in a case where the first distributor executes the game together with at least one user, extract second data including data on at least one user in a case where it is determined that the first data has been transmitted, and control a display content of at least any of the first video and the second video".

The server device according to the twentieth aspect is "a server device including at least one processor and causing the at least one processor to function so as to transmit, via a communication line, a web page containing a computer program to a first distributor terminal device of a first distributor, which distributes, to a viewer terminal device of at least one viewer via the communication line, the first video including motion data regarding the motion of the first distributor or an animation of the avatar of the first distributor generated on the basis of the motion data and the second video regarding the game generated on the basis of the operation data regarding the operation of the first distributor by using a received webpage, wherein the computer program causes the at least one processor to function so as to determine whether or not first data indicating that the first distributor has started or ended a game that the first distributor executes together with at least one user has been transmitted in a case where the first distributor executes the game together with at least one user, extract second data including data on at least one user in a case where it is determined that the first data has been transmitted, and control a display content of at least any of the first video and the second video".

The server device according to the twenty-first aspect, in which in any of the nineteenth and twentieth aspects, "the communication line includes the Internet".

The server device according to the twenty-second aspect, in which in any of the nineteenth to twenty-first aspects, "the processor includes a central processing unit (CPU), a microprocessor, and/or a graphics processing unit (GPU)".

III. Notes

1. Numbers in Front of Two Types of Video

In the present application, the numbers such as "first", "second", etc. can be used to identify two types of videos distributed by each user. A first type of video is the one which includes an animation of an avatar of a user generated on the basis of the motion data related to the user, whereas a second type of video is the one related to a computer-implemented game generated on the basis of the operation data related to the same user.

Focusing on a case where a certain distributor (respective distributor among a plurality of distributors) distributes the two types of videos, the first type of video distributed by the first distributor can be called a "first video", whereas the second type of video distributed by the first distributor can be called a "second video".

In this connection, the numbers such as "first", "second", etc. are just examples. The other numbers and/or letters can be used to identify the two types of videos distributed by each user.

2. Combination of First and Second Embodiments

The above-mentioned first and second embodiments can be combined with one another. In this case, for example, any distributor in the first embodiment can play the game together with another distributor as "collaboration", then distribute the second video (game) as "collaborative distribution" explained in the second embodiment.

In this context, data associated with collaborative distribution mentioned in the second embodiment can be distribution related data. For example, data associated with the number of times of performing together with another distributor (the number of performing collaboration), and data associated with relativity between the distributor and another distributor, in a case where the distributor implements the game collaborated with said another distributor, and the distributor distributes the second video as "collaborative distribution", can be distribution related data.

Figure 13:
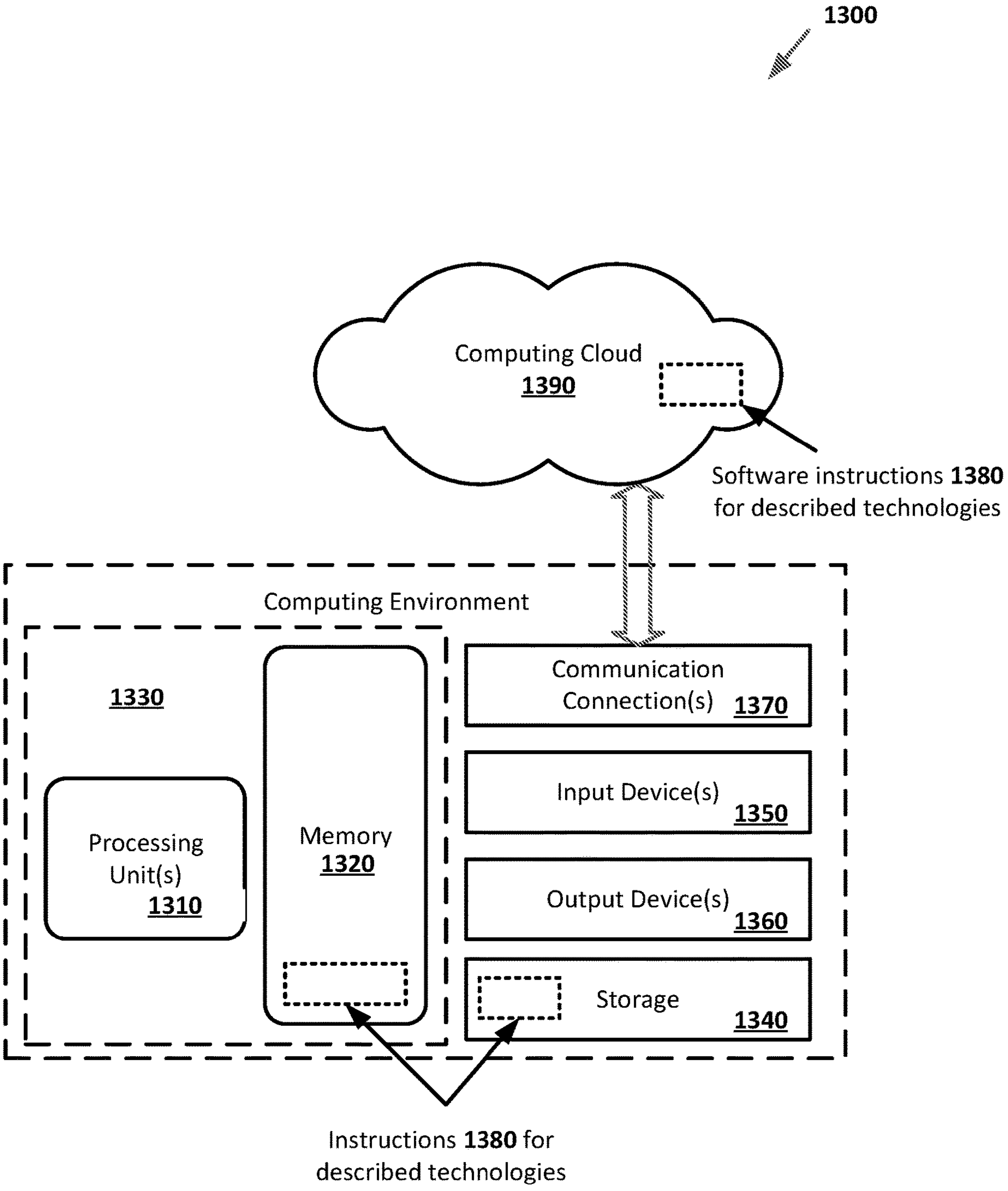
FIG. 13 illustrates a generalized example of a suitable computing environment in which described embodiments, techniques, and technologies can be implemented.

FIG. 13 illustrates a generalized example of a suitable computing environment 1300 in which described embodiments, techniques, and technologies can be implemented. For example, the computing environment 1300 can implement any of the terminal devices or servers, as described herein.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one processing unit 1310 and memory 1320. In FIG. 13, this most basic configuration 1330 is included within a dashed line. The processing unit 1310 executes computer-executable instructions and may be a real or a virtual processor. The processing unit 1310 can be a general purpose central processing unit, a graphics processing unit or other specialized processing unit, or a combination of general purpose and specialized processing units. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a camera, an image sensor, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed terminal devices and servers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, terminal servers can be processing motion data and video in the computing environment while web pages and operation data processing can be performed on servers located in the computing cloud 1390.

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. Computer-readable storage media storing computer-readable instructions, which when executed by a computer having at least one processor, cause the computer to:

- generate motion data;
- distribute, toward terminal devices of a plurality of viewers via a communication line, the motion data or a first video including an animation of an avatar of a distributor generated on the basis of the motion data;
- receive a web page via the communication line;
- receive operation data from a user interface;
- generate a second video related to a computer-implemented game on the basis of the operation data by using the received web page;
- distribute the second video toward the terminal devices of the plurality of viewers via the communication line;
- receive, via the communication line, at least one of distribution related data regarding the previously-distributed motion data or distribution related data regarding the previously-distributed first video, the distribution related data not comprising the previously-distributed motion data or the previously-distributed first video, the distribution related data comprising at least one of:
  - distributor action data regarding a distribution action by the distributor, or
  - distributor status data regarding a distribution status of the distributor;
- extract a selected game object out of a plurality of game objects to be used in the game;
- calculate a control parameter related to the selected game object on the basis of the distribution related data;
- generate the second video including the selected game object; and
- distribute, via the communication line, the second video toward the terminal devices of the plurality of viewers.

2. The computer-readable storage media according to claim 1, wherein the distribution action data includes:

- data related to distribution frequency in the case of distributing by the distributor; and
- data related to distribution time slot in the case of distributing by the distributor.

3. The computer-readable storage media according to claim 2, wherein the distribution frequency includes:

- number of distribution days for a predetermined number of days in the case of distributing by the distributor; and
- total distribution time for a predetermined number of days in the case of distributing by the distributor.

4. The computer-readable storage media according to claim 2, wherein the distribution frequency includes:

- number of consecutive distribution days in the case of distributing by the distributor in consecutive days.

5. The computer-readable storage media according to claim 4, wherein the distribution frequency includes:

- the number of consecutive distribution days in the case of distributing by the distributor in the same time slot in consecutive days.

6. The computer-readable storage media according to claim 2, wherein the distribution time slot is plurally predetermined in the same day.

7. The computer-readable storage media according to claim 1, wherein the distributor status data includes a status data associated with the distributor, calculated on the basis of first transmission data transmitted, via the communication line, from a terminal device of the distributor to at least one of the terminal devices of the plurality of viewers, and/or received data received on the terminal device of the distributor from at least one of the terminal devices of the plurality of viewers via the communication line.

8. The computer-readable storage media according to claim 1, wherein the distributor status data includes a status data associated with the distributor, calculated on the basis of second transmission data transmitted, via the communication line, from a terminal device of the distributor to a terminal device of another distributor, when the terminal device of the distributor is used as one of the terminal device of viewers receiving, from the terminal device of said another distributor, a first video including an animation of an avatar of said another distributor generated on the basis of a motion data of said another distributor or the motion data of said another distributor and a second video related to a computer-implemented game on the basis of the operation data of said another distributor, which said another distributor distributes.

9. The computer-readable storage media according to claim 1, wherein the distributor status data includes game progress data of the distributor.

10. The computer-readable storage media according to claim 1, wherein the distribution related data is on the basis of the second video distributed.

11. The computer-readable storage media according to claim 1, wherein the distribution related data is data related to past distribution prior to present distributing.

12. The computer-readable storage media according to claim 1, wherein the distribution related data includes data associated with relativity between the distributor and another distributor, in a case where the distributor implements the game collaborated with said another distributor, and the distributor distributes the second video describing such collaboration.

13. The computer-readable storage media according to claim 12, wherein the relativity includes:

- the number of said another distributor's view of the second video distributed by the distributor, when the terminal device of said another distributor is used as one of the terminal device of viewers receiving, from the terminal device of the distributor, the second video which the distributor distributes;
- the number or kind of a token given by said another distributor to the distributor in the game as the second video distributed by the distributor, when the terminal device of said another distributor is used as one of the terminal device of viewers receiving, from the terminal device of the distributor, the second video which the distributor distributes; and the total number of a message between the distributor and said another distributor via the communication line.

14. The computer-readable storage media according to claim 1, wherein the selected game object is a game object acquired or operated by the distributor in the game played by the distributor.

15. The computer-readable storage media according to claim 14, wherein the selected game object includes an item, equipment, a point, a reward, a coin, a card, a character, and/or an avatar.

16. The computer-readable storage media according to claim 1, wherein the instructions further cause the computer to;

change location or motion of the selected game object on the basis of the controlled parameter; or display the selected game object newly characterized on the basis of the controlled parameter.

17. A computer-implemented method for automatically generating customized video in an interactive network application, the method comprising: with at least one processor:

generating motion data by using a sensor;

distributing, toward terminal devices of a plurality of viewers via a communication line, the motion data or a first video including an animation of an avatar of a distributor generated on the basis of the motion data;

receiving a web page via the communication line;

receiving operation data from a user interface;

generating a second video related to a computer-implemented game on the basis of the operation data by using the received web page;

distributing the second video toward the terminal devices of the plurality of viewers via the communication line;

receiving, via the communication line, at least one of distribution related data regarding the previously-distributed motion data or distribution related data regarding the previously-distributed first video, the distribution related data not comprising the previously-distributed motion data or the previously-distributed first video, the distribution related data comprising at least one of:

distributor action data regarding a distribution action by the distributor, or distributor status data regarding a distribution status of the distributor;

extracting a selected game object out of a plurality of game objects to be used in the game;

calculating a control parameter related to the selected game object on the basis of the distribution related data;

generating the second video including the selected game object; and distributing, via the communication line, the second video toward the terminal devices of the plurality of viewers.

18. A terminal device, comprising:

at least one processor coupled to a communication line, wherein the at least one processor is configured to:

generate motion data by using a sensor;

distribute, toward terminal devices of a plurality of viewers via the communication line, the motion data or a first video including an animation of an avatar of a distributor generated on the basis of the motion data;

receive a web page via the communication line;

receive operation data from a user interface;

generate a second video related to a computer-implemented game on the basis of the operation data by using the received web page;

distribute the second video toward the terminal devices of the plurality of viewers via the communication line;

receive, via the communication line, at least one of distribution related data regarding the previously-distributed motion data or distribution related data regarding the previously-distributed first video, the distribution related data not comprising the previously-distributed motion data or the previously-distributed first video, the distribution related data comprising at least one of:

distributor action data regarding a distribution action by the distributor, or distributor status data regarding a distribution status of the distributor;

extract a selected game object out of a plurality of game objects to be used in the game;

calculate a control parameter related to the selected game object on the basis of the distribution related data;

generate the second video including the selected game object; and distribute, via the communication line, the second video toward the terminal devices of the plurality of viewers.

19. A system, comprising:

the terminal device of claim 18, and a server device coupled to the terminal device via the communication line, wherein the server device is configured to send the second video to the terminal devices of the plurality of viewers.

* * * * *